United States Patent
Song et al.

(10) Patent No.: US 11,687,235 B2
(45) Date of Patent: Jun. 27, 2023

(54) SPLIT-SCREEN METHOD AND ELECTRONIC DEVICE

(71) Applicant: Huawei Technologies Co., Ltd., Shenzhen (CN)

(72) Inventors: Ping Song, Shanghai (CN); Xue Sun, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/597,174

(22) PCT Filed: Jun. 29, 2020

(86) PCT No.: PCT/CN2020/098918
§ 371 (c)(1),
(2) Date: Dec. 28, 2021

(87) PCT Pub. No.: WO2021/000839
PCT Pub. Date: Jan. 7, 2021

(65) Prior Publication Data
US 2022/0308753 A1 Sep. 29, 2022

(30) Foreign Application Priority Data
Jun. 30, 2019 (CN) .......................... 201910583873.2

(51) Int. Cl.
*G06F 3/04845* (2022.01)
*G06F 3/04886* (2022.01)
(Continued)

(52) U.S. Cl.
CPC ...... *G06F 3/04886* (2013.01); *G06F 3/04817* (2013.01); *G06F 3/04845* (2013.01); *H04M 1/72469* (2021.01); *G06F 2203/04803* (2013.01)

(58) Field of Classification Search
None
See application file for complete search history.

(56) References Cited

U.S. PATENT DOCUMENTS 8,656,292 B2   2/2014  Sharma
10,126,914 B2 * 11/2018 Hiroura ................ G06F 3/0488
(Continued)

FOREIGN PATENT DOCUMENTS

CN      103135880 A     6/2013
CN      104049866 A     9/2014
(Continued)

OTHER PUBLICATIONS

CN108279950A (ENG Translation) Published on Jul. 13, 2018 by Lin, Songjie.*

(Continued)

*Primary Examiner* — Rinna Yi
(74) *Attorney, Agent, or Firm* — Slater Matsil, LLP

(57) ABSTRACT

An electronic device displays icons of a plurality of applications on a home screen, displays a plurality of first prompts around one or more icons of one or more second-type applications in response to the at least one of the touch-and-hold operation or the force touch operation on an icon of a first application, and a first prompt indicates that the one or more second-type applications support split screen, receives a first operation performed by the user of dragging an icon of the first application to contact a first prompt corresponding to an icon of a third application, and, in response, switches from displaying the home screen to displaying a first split-screen interface, where the first split-screen interface comprises an interface of the first application and an interface of the third application being displayed at a same time.

20 Claims, 49 Drawing Sheets

(51) Int. Cl.
*H04M 1/72469* (2021.01)
*G06F 3/04817* (2022.01)

(56) References Cited

U.S. PATENT DOCUMENTS

| | | | |
|---|---|---|---|
| 10,162,494 | B2 | 12/2018 | Kang et al. |
| 10,180,767 | B2 | 1/2019 | Lee et al. |
| 10,185,459 | B2 | 1/2019 | Gao et al. |
| 2010/0058182 | A1 | 3/2010 | Jung |
| 2011/0035691 | A1* | 2/2011 | Kim ............... G06F 3/0486 715/765 |
| 2011/0312389 | A1 | 12/2011 | Hyun et al. |
| 2013/0145315 | A1 | 6/2013 | Zhou et al. |
| 2014/0089833 | A1* | 3/2014 | Hwang ........... G06F 3/04817 715/780 |
| 2014/0164957 | A1* | 6/2014 | Shin ............... G06F 3/04817 715/806 |
| 2014/0245203 | A1* | 8/2014 | Lee ................. G06F 3/04845 715/765 |
| 2014/0351748 | A1* | 11/2014 | Xia ................. G06F 3/0481 715/798 |
| 2015/0169216 | A1* | 6/2015 | Cho ................ G06F 3/0486 715/764 |
| 2019/0243516 | A1* | 8/2019 | Shim ............. G06F 3/04886 |
| 2022/0308753 | A1 | 9/2022 | Song et al. |

FOREIGN PATENT DOCUMENTS

| | | |
|---|---|---|
| CN | 104978123 A | 10/2015 |
| CN | 105224273 A | 1/2016 |
| CN | 106648314 A | 5/2017 |
| CN | 108279950 A | 7/2018 |
| CN | 109800045 A | 5/2019 |
| CN | 109885249 A | 6/2019 |
| CN | 110362244 A | 10/2019 |
| KR | 20140106193 A | 9/2014 |

OTHER PUBLICATIONS

CN109885249A (ENG Translation) Published on Jun. 14, 2019 by Lan et al.*

* cited by examiner

SPLIT-SCREEN METHOD AND ELECTRONIC DEVICE

CROSS REFERENCE TO RELATED APPLICATIONS

This application is a National Stage of International Patent Application No. PCT/CN2020/098918 filed on Jun. 29, 2020, which claims the priority of Chinese Patent Application No. 201910583873.2 filed on Jun. 30, 2019. Both of the aforementioned applications are hereby incorporated by reference in their entireties. This application claims priority to Chinese Patent Application No. 201910583873.2, filed with the China National Intellectual Property Administration on Jun. 30, 2019 and entitled "SPLIT-SCREEN METHOD AND ELECTRONIC DEVICE", which is incorporated herein by reference in its entirety.

TECHNICAL FIELD

This application relates to the field of human-machine interaction, and in particular, to a split-screen method, a graphical user interface, and an electronic device.

BACKGROUND

As large screens, foldable screens, and flexible screens continuously develop, a size of a screen on a smart device is increasingly larger, and content that can be displayed on one screen gradually increases. A user may use a split-screen technology to display a plurality of windows on one screen, to perform operations on a plurality of applications. For example, if the user sets split-screen display corresponding to two applications "WeChat" and "QQ", the user may view information in the two applications "WeChat" and "QQ" at the same time.

In the conventional technology, in order to display the two applications on the screen, the user needs to enter a split-screen instruction (for example, slide upward from the bottom of the screen by using two fingers) in a display interface of one application; and the smart device displays two windows in response to the split-screen instruction, displays the application in one window, and displays a home screen (Home screen) of the smart device in the other window. Then, the user needs to search on the home screen for an application icon that needs to be displayed in the split screen mode; and in response to an operation (for example, a tap operation) performed by the user on the application icon, the smart device displays the two applications in a split-screen manner. In the process of triggering the smart device to display the applications in the split-screen manner, the user needs to perform a plurality of operations. Consequently, efficiency of triggering the split-screen display is relatively low.

SUMMARY

Embodiments of this application provide a split-screen method and an electronic device, to improve split-screen display efficiency.

According to a first aspect, an embodiment of this application provides a split-screen method. The method includes: An electronic device displays icons of a plurality of applications on a home screen. The electronic device receives a touch-and-hold operation or a force touch operation performed by a user on an icon of a first application, where the first application belongs to the plurality of applications. The electronic device displays a plurality of first prompts around an icon or icons of one or more second-type applications in response to the touch-and-hold operation or the force touch operation, where the one or more second-type applications are applications that support split screen in the plurality of applications, and the first prompt is used to indicate that the one or more second-type applications support split screen. The electronic device receives a first operation performed by the user on the icon of the first application, where the first operation is dragging the icon of the first application to be in contact with a first prompt corresponding to an icon of a third application. The electronic device switches from displaying the home screen to displaying a first split-screen interface in response to contact between the icon of the first application and the first prompt corresponding to the icon of the third application or in response to release of the first operation, where the first split-screen interface includes an interface of the first application and an interface of the third application at the same time. In this manner, the user can conveniently enter the split-screen interface corresponding to the first application and the third application. This improves split-screen efficiency.

In a possible implementation, that the electronic device switches from displaying the home screen to displaying a first split-screen interface in response to release of the first operation includes: Before release of the first operation, the electronic device detects that duration of contact between the icon of the first application and the first prompt corresponding to the icon of the third application is not less than a preset value. The electronic device switches from displaying the home screen to displaying the first split-screen interface in response to release of the first operation. In this manner, the user can keep contact between the icon of the first application and the first prompt corresponding to the third application for a period of time (not less than the preset value). After the user releases the first operation, the electronic device switches from displaying the home screen to displaying the split-screen interface. In this manner, split-screen intention of the user can be better determined, and split-screen accuracy can be improved.

In a possible implementation, the method further includes: The electronic device determines a second location of the interface of the first application relative to the interface of the third application in the first split-screen interface based on a first location of the icon of the third application relative to the first prompt that is in contact with the icon of the first application, where the first location includes one of a left side, a right side, a top side, and a bottom side, and the second location is the same as the first location. In this manner, the user can control the location relationship between the icon of the third application and the icon of the first application, to determine the location relationship between the interface of the third application and the interface of the first application in the split-screen interface. This further improves split-screen operation efficiency.

In a possible implementation, that the electronic device displays a plurality of first prompts around an icon or icons of one or more second-type applications includes: The electronic device detects that a split-screen direction supported by the electronic device is a left-right direction, and separately displays one first prompt on a left side and a right side of each of the icon or the icons of the one or more second-type applications.

In a possible implementation, that the electronic device displays a plurality of first prompts around an icon or icons of one or more second-type applications includes: The electronic device detects that a split-screen direction supported by the electronic device is an up-down direction, and separately displays one first prompt on a top side and a bottom side of each of the icon or the icons of the one or more second-type applications.

In a possible implementation, that the electronic device displays a plurality of first prompts around an icon or icons of one or more second-type applications includes: The electronic device detects that split-screen directions supported by the electronic device are a left-right direction and an up-down direction, and separately displays one first prompt on a left side, a right side, a top side, and a bottom side of each of the icon or the icons of the one or more second-type applications. In the foregoing three manners, the user can conveniently learn the split-screen direction supported by the electronic device.

In a possible implementation, after the electronic device receives the first operation, and before the first operation is released, the method further includes: The icon of the third application absorbs the icon of the first application, so that one edge of the icon of the first application is in contact with one edge of the icon of the third application.

In a possible implementation, the method further includes: The electronic device receives a second operation, and the electronic device switches from displaying the first split-screen interface to displaying the home screen in response to the second operation, where the home screen further includes a first fused icon, the home screen does not include the icon of the first application and the icon of the third application, the first fused icon does not belong to the icons of the plurality of applications, and the first fused icon is an icon obtained after the icon of the third application is fused with the icon of the first application; and receives a third operation performed on the first fused icon located on the home screen, and the electronic device displays the first split-screen interface in response to the third operation.

In a possible implementation, the method further includes: The electronic device receives a fourth operation, and the electronic device switches from displaying the first split-screen interface to displaying the home screen in response to the fourth operation, where the home screen further includes a first fused icon, the first fused icon does not belong to the icons of the plurality of applications, and the first fused icon is an icon obtained after the icon of the third application is fused with the icon of the first application; and receives a fifth operation performed on the first fused icon located on the home screen, and the electronic device displays the first split-screen interface in response to the fifth operation.

In a possible implementation, a location of the icon of the first application relative to the icon of the third application in the first fused icon is the same as the location of the interface of the first application relative to the interface of the third application in the first split-screen interface. In this manner, the user can conveniently learn display locations of interfaces of applications in the split-screen interface by using icons.

In a possible implementation, the method further includes: The electronic device receives a sixth operation performed by the user on the first fused icon, and the electronic device displays the icon of the first application, the icon of the third application, and a second prompt in response to the sixth operation. The electronic device receives a seventh operation performed by the user on the second prompt, and in response to the seventh operation, the electronic device deletes the first fused icon on the home screen, and displays the icon of the first application and the icon of the third application on the home screen.

In a possible implementation, the method further includes: The electronic device receives an eighth operation performed by the user on the first fused icon, and the electronic device displays a third prompt for the first fused icon in response to the eighth operation. The electronic device receives a ninth operation performed by the user on the third prompt, and the electronic device deletes the first fused icon on the home screen. In this split-screen disabling manner, the user can conveniently delete all formed split-screen interfaces.

In a possible implementation, the home screen further includes an icon of a fourth application, the fourth application belongs to the one or more second-type applications, and the method further includes: The electronic device receives a touch-and-hold operation or a force touch operation performed by the user on the icon of the fourth application. In response to the touch-and-hold operation or the force touch operation, the electronic device displays the plurality of first prompts around a remaining icon or remaining icons of the one or more second-type applications except the icon of the first application and the icon of the third application, and displays a plurality of fourth prompts around the first fused icon, where the fourth prompt is used to indicate that an interface of another application may be added to the split-screen interface corresponding to the first fused icon. The electronic device receives a tenth operation performed by the user on the icon of the fourth application, where the tenth operation is dragging the icon of the fourth application to be in contact with the fourth prompt corresponding to the first fused icon. The electronic device switches from displaying the home screen to displaying a second split-screen interface in response to contact between the icon of the fourth application and the fourth prompt corresponding to the first fused icon or in response to release of the tenth operation, where the second split-screen interface includes an interface of the fourth application, the interface of the first application, and the interface of the third application at the same time.

In a possible implementation, the home screen further includes an icon of a fourth application, the fourth application belongs to the one or more second-type applications, and the method further includes: The electronic device receives a touch-and-hold operation or a force touch operation performed by the user on the icon of the fourth application. In response to the touch-and-hold operation or the force touch operation, the electronic device displays the plurality of first prompts around the icon or the icons of the one or more second-type applications, and displays a plurality of fourth prompts around the first fused icon, where the fourth prompt is used to indicate that an interface of another application may be added to the split-screen interface corresponding to the first fused icon. The electronic device receives an eleventh operation performed by the user on the icon of the fourth application, where the eleventh operation is dragging the icon of the fourth application to be in contact with a fourth prompt corresponding to the first fused icon. The electronic device switches from displaying the home screen to displaying a second split-screen interface in response to contact between the icon of the fourth application and the fourth prompt corresponding to the first fused icon or in response to release of the eleventh operation, where the second split-screen interface includes an interface of the fourth application, the interface of the first application, and the interface of the third application at the same time.

In a possible implementation, the method further includes: The electronic device determines a fourth location of the interface of the fourth application in the second split-screen interface based on a third location of the first fused icon relative to the fourth prompt that is in contact with the icon of the fourth application, where the third location includes one of a left side, a right side, a top side, a bottom side, a top left side, a top right side, a bottom left side, or a bottom right side, and the fourth location is the same as the third location.

In a possible implementation, that the electronic device displays a plurality of fourth prompts around the first fused icon includes: If detecting that split-screen directions supported by the electronic device are an up-down direction and a left-right direction, and a same direction supports to display only two split-screen interfaces, the electronic device separately displays one fourth prompt on a top left side, a top right side, a bottom left side, and a bottom right side of the first fused icon. In this manner, the user can conveniently learn directions in which interfaces of new applications can be added to a formed split-screen interface.

In a possible implementation, the method further includes: The electronic device receives a twelfth operation, and the electronic device switches from displaying the second split-screen interface to displaying the home screen in response to the twelfth operation, where the home screen further includes a second fused icon, the home screen does not include the icon of the first application, the icon of the third application, and the first fused icon, the second fused icon does not belong to the icons of the plurality of applications, and the second fused icon is an icon obtained after the icon of the third application and the icon of the first application are fused with the icon of the fourth application; and receives a thirteenth operation performed on the second fused icon located on the home screen, and the electronic device displays the second split-screen interface in response to the thirteenth operation.

In a possible implementation, the method further includes: The electronic device receives a fourteenth operation, and the electronic device switches from displaying the second split-screen interface to displaying the home screen in response to the fourteenth operation, where the home screen further includes a second fused icon, the first fused icon does not belong to the icons of the plurality of applications, and the second fused icon is an icon obtained after the icon of the third application and the icon of the first application are fused with the icon of the fourth application; and receives a fifteenth operation performed on the second fused icon located on the home screen, and the electronic device displays the second split-screen interface in response to the fifteenth operation.

In a possible implementation, a location of the icon of the fourth application in the second fused icon is the same as the location of the interface of the fourth application in the second split-screen interface.

In a possible implementation, the method further includes: The electronic device receives a sixteenth operation performed by the user on the second fused icon, and the electronic device displays the icon of the first application, the icon of the third application, the icon of the fourth application, and three fifth prompts in response to the sixteenth operation, where one fifth prompt corresponds to an icon of one application; the electronic device receives a seventeenth operation performed by the user on a fifth prompt corresponding to the icon of the third application, and the electronic device deletes the second fused icon on the home screen, and displays the icon of the third application and a third fused icon on the home screen, where the third fused icon does not belong to the icons of the plurality of applications, and the third fused icon is an icon obtained after the icon of the first application is fused with the icon of the fourth application; and receives an eighteenth operation performed on the third fused icon located on the home screen, and the electronic device displays a third split-screen interface in response to the eighteenth operation, where the third split-screen interface includes the interface of the first application and the interface of the fourth application at the same time.

In a possible implementation, the method further includes: The electronic device receives a nineteenth operation performed by the user on the second fused icon, and the electronic device displays one sixth prompt for each of the first fused icon and the second fused icon in response to the nineteenth operation, where one sixth prompt corresponds to one fused icon. The electronic device receives a twentieth operation performed by the user on a sixth prompt corresponding to the second fused icon, and the electronic device deletes the second fused icon on the home screen. In this manner, the user can conveniently delete a plurality of fused icons included in the home screen.

In a possible implementation, the home screen further includes an icon of a fifth application and an icon of a sixth application, and the method further includes: The electronic device receives a touch-and-hold operation or a force touch operation performed by the user on the icon of the fifth application. The electronic device displays the plurality of first prompts around the icon or the icons of the one or more second-type applications in response to the touch-and-hold operation or the force touch operation. The electronic device detects a shaking operation performed by the user on the icon of the fifth application, and the electronic device skips displaying the plurality of first prompts in response to the shaking operation. The electronic device detects that the user drags the icon of the fifth application in a preset area of the icon of the sixth application, and the electronic device generates a folder, where the icon of the fifth application and the icon of the sixth application are displayed in the folder. In this manner, the electronic device can more accurately determine an intention of the user, thereby improving split-screen display accuracy.

According to a second aspect, an embodiment of this application provides a split-screen method. The method includes: An electronic device displays icons of a plurality of applications on a home screen. The electronic device receives a first operation performed by a user on an icon of a first application, where the first operation is moving the first application to a nearby area of a second application, and the first application and the second application belong to the plurality of applications. The electronic device displays a plurality of first prompts around an icon of the second application in response to the first operation, where the first prompt is used to indicate that the second application supports split screen. The electronic device receives a second operation performed by the user on the icon of the first application, where the second operation is dragging the icon of the first application to be in contact with a first prompt corresponding to the second application. The electronic device switches from displaying the home screen to displaying a first split-screen interface in response to contact between the icon of the first application and the first prompt corresponding to the icon of the second application or in response to release of the second operation, where the first split-screen interface includes an interface of the first application and an interface of the second application at the same time. In this manner, the user can conveniently enter the split-screen interface corresponding to the first application and the third application. This improves split-screen efficiency.

In a possible implementation, that the electronic device switches from displaying the home screen to displaying a first split-screen interface in response to release of the second operation includes: Before release of the second operation, the electronic device detects that duration of contact between the icon of the first application and the first prompt corresponding to the icon of the second application is not less than a preset value, and the electronic device switches from displaying the home screen to displaying the first split-screen interface in response to release of the second operation.

In a possible implementation, the method further includes: The electronic device determines a second location of the interface of the first application relative to the interface of the second application in the first split-screen interface based on a first location of the icon of the second application relative to the first prompt that is in contact with the icon of the first application, where the first location includes one of a left side, a right side, a top side, and a bottom side, and the second location is the same as the first location. In this manner, the user can control the location relationship between the icon of the second application and the icon of the first application, to determine the location relationship between the interface of the second application and the interface of the first application in the split-screen interface. This further improves split-screen operation efficiency.

In a possible implementation, the method further includes: The electronic device receives a third operation, and the electronic device switches from displaying the first split-screen interface to displaying the home screen in response to the third operation, where the home screen further includes a first fused icon, the home screen does not include the icon of the first application and the icon of the second application, the first fused icon does not belong to the icons of the plurality of applications, and the first fused icon is an icon obtained after the icon of the second application is fused with the first application. The electronic device receives a fourth operation performed on the first fused icon located on the home screen, and the electronic device displays the first split-screen interface in response to the fourth operation.

In a possible implementation, the method further includes: The electronic device receives a fifth operation performed by the user on the first fused icon, and the electronic device displays the icon of the first application, the icon of the second application, and a second prompt in response to the fifth operation. The electronic device receives a sixth operation performed by the user on the second prompt, and in response to the sixth operation, the electronic device deletes the first fused icon on the home screen, and displays the icon of the first application and the icon of the second application on the home screen.

In a possible implementation, the home screen further includes an icon of a fifth application and an icon of a sixth application, and the method further includes: The electronic device receives a sixth operation performed by the user on the icon of the fifth application, where the sixth operation is moving the fifth application to a nearby area of the sixth application. The electronic device displays a plurality of third prompts around the icon of the sixth application in response to the sixth operation, where the third prompt is used to indicate that the sixth application supports split screen. The electronic device detects a shaking operation performed by the user on the icon of the fifth application, and the electronic device skips displaying the plurality of third prompts in response to the shaking operation. The electronic device detects that the user drags the icon of the fifth application in a preset area of the icon of the sixth application, and the electronic device generates a folder, where the icon of the fifth application and the icon of the sixth application are displayed in the folder.

It should be noted that on a premise that the method in the first aspect does not conflict with the method in the second aspect, the foregoing possible implementations in the first aspect are applicable to the split-screen method in any one of the second aspect or the possible implementations of the second aspect.

According to a third aspect, this application provides an electronic device, including one or more memories, a foldable display, and one or more memories. The one or more memories are coupled to the one or more processors. The foldable display communicates with the one or more processors. The one or more memories are configured to store computer program code, and the computer program code includes computer instructions. When the one or more processors execute the computer instructions, the electronic device is enabled to perform the split-screen method in any one of the first aspect or the possible implementations of the first aspect.

According to a fourth aspect, this application provides an electronic device, including one or more memories, a foldable display, and one or more memories. The one or more memories are coupled to the one or more processors. The foldable display communicates with the one or more processors. The one or more memories are configured to store computer program code, and the computer program code includes computer instructions. When the one or more processors execute the computer instructions, the electronic device is enabled to perform the split-screen method in any one of the second aspect or the possible implementations of the second aspect.

According to a fifth aspect, an embodiment of this application provides a computer storage medium, including computer instructions. When the computer instructions are run on an electronic device, the electronic device is enabled to perform the split-screen method in any one of the first aspect or the possible implementations of the first aspect.

According to a sixth aspect, an embodiment of this application provides a computer storage medium, including computer instructions. When the computer instructions are run on an electronic device, the electronic device is enabled to perform the split-screen method in any one of the second aspect or the possible implementations of the second aspect.

According to a seventh aspect, an embodiment of this application provides a computer program product. When the computer program product runs on a computer, the computer is enabled to perform the split-screen method in any one of the first aspect or the possible implementations of the first aspect.

According to an eighth aspect, an embodiment of this application provides a computer program product. When the computer program product runs on a computer, the computer is enabled to perform the split-screen method in any one of the second aspect or the possible implementations of the second aspect.

In the embodiments of this application, icons of a plurality of applications are displayed on a home screen of an electronic device. If receiving an input operation performed by a user on an icon of a first application, the electronic device displays first prompts around icons of a plurality of applications that support split screen in the user interface, where the first prompt is used to indicate that the applications support split screen. Then, if detecting that the user enables the icon of the first application to be in contact with a first prompt corresponding to an icon of a third application, the electronic device switches from displaying the home screen to displaying a split-screen interface including an interface of the first application and an interface of the third application at the same time, where the third application is one of the plurality of applications that support split screen. In this manner, the user can conveniently enter the split-screen interface corresponding to the first application and the third application. This improves split-screen efficiency.

BRIEF DESCRIPTION OF THE DRAWINGS

To describe the technical solutions in the embodiments of this application or in the prior art more clearly, the following briefly describes the accompanying drawings for describing the embodiments or the prior art.

DETAILED DESCRIPTION OF ILLUSTRATIVE EMBODIMENTS

Figure 1A:
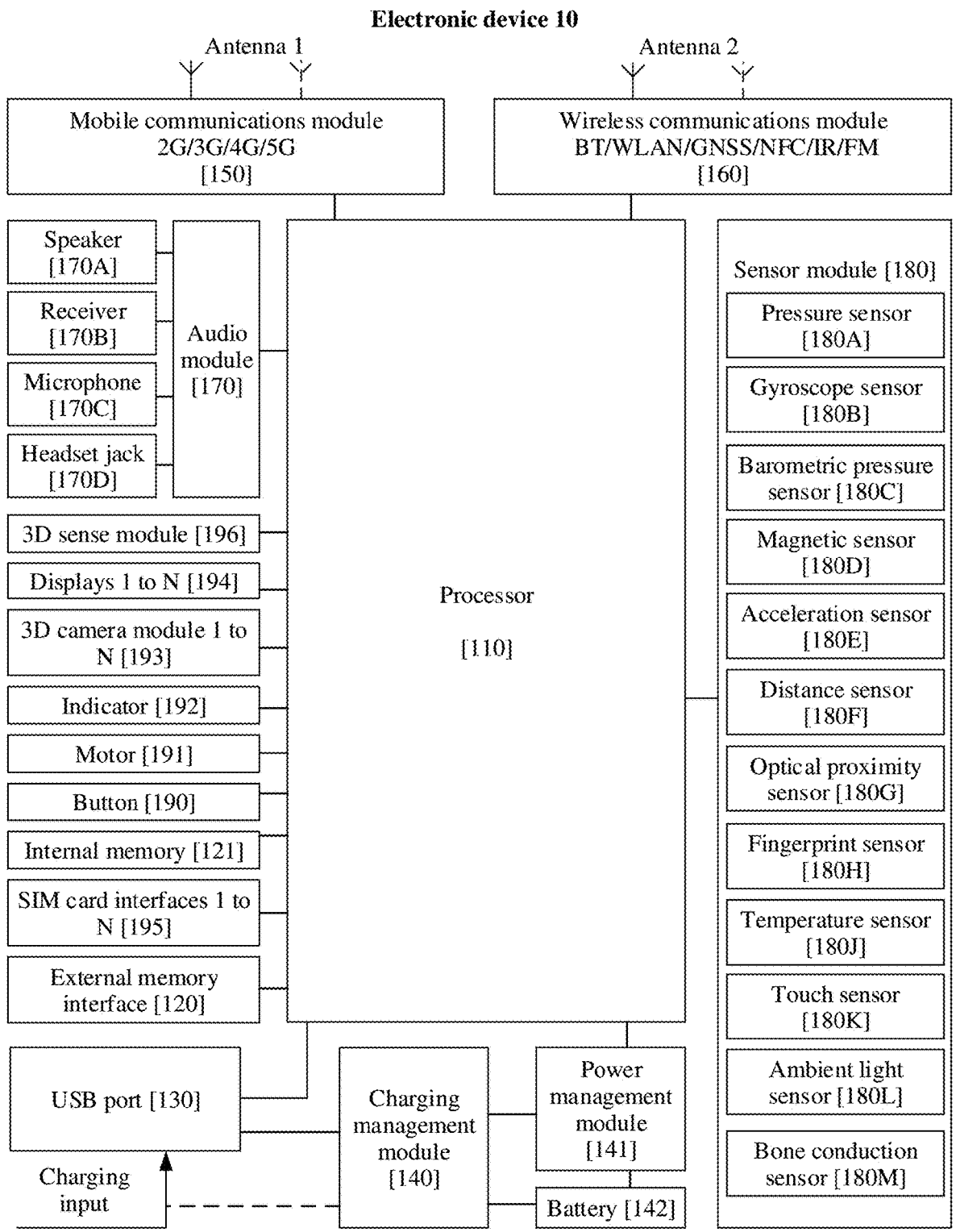
FIG. 1A is a schematic diagram of a structure of an electronic device according to an embodiment of this application.

The technical solutions in the embodiments of this application are described in more detail below.

Terms used in the following embodiments of this application are merely for the purpose of describing specific embodiments, but are not intended to limit this application. The terms "one", "a", "the", "the foregoing", "this", and "the one" of singular forms used in this specification and the appended claims of this application are also intended to include plural forms, unless otherwise specified in the context clearly. It should be further understood that the term "and/or" used in this application indicates and includes any or all possible combinations of one or more listed items. The following describes an electronic device, a user interface used for such an electronic device, and embodiments used for using such an electronic device. In some embodiments, the electronic device may be a portable electronic device that further includes other functions such as a personal digital assistant function and/or a music player function, for example, a mobile phone, a tablet computer, or a wearable electronic device having a wireless communication function (for example, a smartwatch). An example embodiment of the portable electronic device includes but is not limited to a portable electronic device using iOS®, Android®, Microsoft®, or another operating system. The portable electronic device may alternatively be another portable electronic device, for example, a laptop (Laptop) computer having a touch-sensitive surface or a touch panel. It should be further understood that in some other embodiments, the electronic device may not be a portable electronic device, but a desktop computer having a touch-sensitive surface or a touch panel.

The term "user interface (user interface, UI)" in the specification, claims, and accompanying drawings of this application is a medium interface for interaction and information exchange between a user and an application or an operating system, and the user interface implements conversion between an internal form of information and a form that can be accepted by the user. A user interface of an application is source code written in a specific computer language such as Java or an extensible markup language (extensible markup language, XML). The interface source code is parsed and rendered on an electronic device 300, and is finally presented as content that can be identified by the user, for example, a control such as a picture, a text, or a button. A control (control) is a basic element of a user interface. Typical controls include a button (button), a widget (widget), a toolbar (toolbar), a menu bar (menu bar), a text box (text box), a scrollbar (scrollbar), a picture, and a text. Attributes and content of controls on an interface are defined by tags or nodes. For example, controls included in an interface are defined by nodes such as <Textview>, <ImgView>, and <VideoView> in the XML. One node corresponds to one control or one attribute in an interface. After parsing and rendering, the node is presented as user-visible content. In addition, interfaces of many applications, such as a hybrid application (hybrid application), usually further include web pages. A web page, also referred to as a page, may be understood as a special control embedded in an interface of an application. A web page is source code written in a specific computer language, such as a hypertext markup language (hypertext markup language, HTML), cascading style sheets (cascading style sheets, CSS), or JavaScript (JavaScript, JS). Web page source code may be loaded and displayed as user-recognizable content by a browser or a web page display component with a function similar to a function of the browser. Specific content included in the web page is also defined by tags or nodes in the web page source code. For example, elements and attributes of a web page are defined by <p>, <img>, <video>, and <canvas> in the HTML.

The user interface is usually in a representation form of a graphical user interface (graphic user interface, GUI), which is a user interface that is related to a computer operation and that is displayed in a graphical manner. The graphical user interface may be an interface element such as an icon, a window, or a control displayed on a display of an electronic device.

The following embodiments of this application provide a split-screen method, a graphical user interface, and an electronic device, so that a user can quickly enter a split-screen interface for applications through operations on application icons that need to be displayed in a split-screen manner. The operation is intuitive, simple, and effective, and can improve split-screen display efficiency.

In the following embodiments of this application, an electronic device such as a smartphone or a tablet computer may receive a touch-and-hold operation or a force touch (force touch) operation performed by a user on an icon of a first application. The electronic device displays a plurality (the plurality means that a positive integer is greater than 1) of first prompts around an icon or icons of one or more second applications in response to the touch-and-hold operation or the force touch operation, where the first prompt is used to indicate that the one or more second applications may support a split-screen operation. Then, the user may drag the icon of the first application to be in contact with a first prompt corresponding to an icon of a second application. In response to contact between the icon of the first application and the first prompt corresponding to the icon of the second application, the electronic device may display a split-screen interface including an interface of the second application and an interface of the first application at the same time.

In still another possible implementation, an electronic device may receive an operation that a user moves an icon of a first application to a location near an icon of a second application. The electronic device displays a plurality of (the plurality means that a positive integer is greater than 1) first prompts around the icon of the second application in response to the user operation, where the first prompt is used to indicate that the second application may support a split-screen operation. Then, the user may continue dragging the icon of the first application to be in contact with the first prompt corresponding to the icon of the second application. In response to contact between the icon of the first application and the first prompt corresponding to the icon of the second application, the electronic device may display a split-screen interface including an interface of the second application and an interface of the first application at the same time.

First, an example of an electronic device 10 provided in the following embodiments of this application is described.

FIG. 1A is a schematic diagram of a structure of an electronic device 10.

The electronic device 10 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a 3D camera module 193, a display 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180G, a temperature sensor 180J, a touch sensor 180K, an ambient light sensor 180L, a bone conduction sensor 180M, and the like.

It may be understood that the structure shown in the embodiments of the present invention does not constitute a specific limitation on the electronic device 10. In some other embodiments of this application, the electronic device 10 may include more or fewer components than those shown in the figure, or some components may be combined, or some components may be split, or there may be a different component layout. The components shown in the figure may be implemented by using hardware, software, or a combination of software and hardware.

The processor 110 may include one or more processing units. For example, the processor 110 may include an application processor (application processor, AP), a central processing unit (central processing unit, CPU), a graphics processing unit (graphics processing unit, GPU), a neural-network processing unit (neural-network processing unit, NPU), a modem processor, an image signal processor (image signal processor, ISP), a controller, a memory, a video codec, a digital signal processor (digital signal processor, DSP), a baseband processor, and the like. Different processing units may be independent components, or may be integrated into one or more processors. In some embodiments, the electronic device 10 may alternatively include one or more processors 110.

The controller may be a nerve center and a command center of the electronic device 10. The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data that has been used or is cyclically used by the processor 110. If the processor 110 needs to use the instructions or the data again, the processor may directly invoke the instruction or the data from the memory. This avoids repeated access and reduces a waiting time of the processor 110, so that efficiency of the electronic device 10 is improved.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) port, and/or the like.

The I2C interface is a two-way synchronization serial bus, and includes a serial data line (serial data line, SDA) and a serial clock line (serial clock line, SCL). In some embodiments, the processor 110 may include a plurality of groups of I2C buses. The processor no may be separately coupled to the touch sensor 180K, a charger, a flash, the 3D camera module 193, and the like by using different I2C bus interfaces. For example, the processor 110 may be coupled to the touch sensor 180K through the I2C interface, so that the processor 110 communicates with the touch sensor 180K through the I2C bus interface, to implement a touch function of the electronic device 10.

The I2S interface may be used to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be used to perform audio communication, and sample, quantize, and code an analog signal. In some embodiments, the audio module 170 may be coupled to the wireless communications module 160 through a PCM bus interface. In some embodiments, the audio module 170 may alternatively transmit an audio signal to the wireless communications module 160 through the PCM interface, to implement a function of answering a call by using a Bluetooth headset. Both the I2S interface and the PCM interface may be used to perform audio communication.

The UART interface is a universal serial data bus, and is used to perform asynchronous communication. The bus may be a two-way communications bus. The bus converts to-be-transmitted data between serial communication and parallel communication. In some embodiments, the UART interface is usually used to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using the Bluetooth headset.

The MIPI interface may be used to connect the processor 110 to a peripheral component such as the display 194 or the 3D camera module 193. The MIPI interface includes a camera serial interface (camera serial interface, CSI), a display serial interface (display serial interface, DSI), and the like. In some embodiments, the processor 110 communicates with the 3D camera module 193 through the CSI interface, to implement a photographing function of the electronic device 10. The processor 110 communicates with the display 194 through the DSI interface, to implement a display function of the electronic device 10.

The GPIO interface may be configured by using software. The GPIO interface may be configured as a control signal or a data signal. In some embodiments, the GPIO interface may be configured to connect the processor 110 to the 3D camera module 193, the display 194, the wireless communications module 160, the audio module 170, the sensor module 180, and the like. The GPIO interface may alternatively be configured as the I2C interface, the I2S interface, the UART interface, the MIPI interface, or the like.

The USB port 130 is a port that conforms to a USB standard specification, and may be specifically a mini USB port, a micro USB port, a USB type-C port, or the like. The USB port 130 may be used to connect to a charger for charging the electronic device 10, may be used to transmit data between the electronic device 10 and a peripheral device, or may be used to connect to a headset for playing audio through the headset. Alternatively, the port may be used to connect to another electronic device, for example, an AR device.

It may be understood that an interface connection relationship between the modules that is shown in this embodiment of the present invention is merely an example for description, and does not constitute a limitation on the structure of the electronic device 10. In some other embodiments, the electronic device 10 may alternatively use an interface connection manner different from the interface connection manner in this embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input from a wired charger through the USB port 130. In some embodiments of wireless charging, the charging management module 140 may receive a wireless charging input through a wireless charging coil of the electronic device 10. The charging management module 140 may further supply power to the electronic device by using the power management module 141 while charging the battery 142.

The power management module 141 is configured to connect the battery 142 and the charging management module 140 to the processor 110. The power management module 141 receives an input of the battery 142 and/or an input of the charging management module 140, and supplies power to the processor 110, the internal memory 121, an external memory, the display 194, the 3D camera module 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 10 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 10 may be configured to cover one or more communications frequency bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 150 may provide a solution that is applied to the electronic device 10 and that includes wireless communication such as 2G, 3G, 4G, and 5G. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert the signal into an electromagnetic wave by using the antenna 1 for radiation. In some embodiments, at least some function modules of the mobile communications module 150 may be disposed in the processor 110. In some embodiments, at least some function modules of the mobile communications module 150 and at least some modules of the processor no may be disposed in a same device.

The modem processor may include a modulator and a demodulator. The modulator is configured to modulate a to-be-sent low-frequency baseband signal into a medium/high-frequency signal. The demodulator is configured to demodulate a received electromagnetic wave signal into a low-frequency baseband signal. Then, the demodulator transfers the low-frequency baseband signal obtained through demodulation to the baseband processor for processing. The low-frequency baseband signal is processed by the baseband processor, and then a processed low-frequency baseband signal is transferred to the application processor. The application processor outputs a sound signal by using an audio device (which is not limited to the speaker 170A, the receiver 170B, or the like), or displays an image or a video on the display 194. In some embodiments, the modem processor may be an independent device. In some other embodiments, the modem processor may be independent of the processor no, and is disposed in a same device with the mobile communication module 150 or another function module.

The wireless communications module 160 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, and the like and that is applied to the electronic device 10. The wireless communications module 160 may be one or more components integrating at least one communications processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave through the antenna 2 for radiation. For example, the wireless communications module 160 may include a Bluetooth module, a Wi-Fi module, and the like.

In some embodiments, the antenna 1 of the electronic device 10 is coupled to the mobile communications module 150, and the antenna 2 is coupled to the wireless communications module 160, so that the electronic device 10 may communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device 10 may implement a display function by using the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs, which execute instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a Mini-LED, a Micro-LED, a Micro-OLED, quantum dot light emitting diodes (quantum dot light emitting diodes, QLED), or the like. In some embodiments, the electronic device 10 may include one or N displays 194, where N is a positive integer greater than 1.

The electronic device 10 may implement a photographing function by using the camera module 193, the ISP, the video codec, the GPU, the display 194, the application processor AP, the neural processing unit NPU, and the like.

The camera module 193 may be configured to collect color image data of a photographed object. The ISP may be configured to process the color image data collected by the camera module 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera module 193.

The digital signal processor is configured to process a digital signal, and may process another digital signal in addition to the digital image signal. For example, when the electronic device 10 selects a frequency, the digital signal processor is configured to perform Fourier transformation and the like on frequency energy.

The video codec is configured to compress or decompress a digital video. The electronic device 10 may support one or more video codecs. In this way, the electronic device 10 can play or record videos in a plurality of encoding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transmission between human brain neurons, and may further continuously perform self-learning. The NPU can implement applications such as intelligent cognition of the electronic device 10, such as image recognition, facial recognition, speech recognition, and text understanding.

The external memory interface 120 may be used to connect to an external memory card, for example, a micro SD card, to extend a storage capability of the electronic device 10. The external memory card communicates with the processor 110 through the external memory interface 120, to implement a data storage function. For example, data such as music, a picture, and a video is stored in the external memory card.

The internal memory 121 may be configured to store one or more computer programs, and the one or more computer programs include instructions. The processor 110 may run the foregoing instructions stored in the internal memory 121, so that the electronic device 10 performs a photographing preview method of an electronic device, various function applications, data processing, and the like provided in some embodiments of this application. The internal memory 121 may include a program storage area and a data storage area. The program storage area may store an operating system. The program storage area may further store one or more applications (such as "Gallery" and "Contacts"). The data storage area may store data (for example, a picture and a contact) created during use of the electronic device 10, and the like. In addition, the internal memory 121 may include a high-speed random access memory, and may further include a nonvolatile memory, for example, at least one magnetic disk storage device, a flash memory, and a universal flash storage (universal flash storage, UFS).

The electronic device 10 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to code and decode an audio signal. In some embodiments, the audio module 170 may be disposed in the processor 110, or some function modules of the audio module 170 are disposed in the processor 110.

The speaker 170A, also referred to as a "horn", is configured to convert an audio electrical signal into a sound signal. The electronic device 10 may be used to listen to music or answer a call in a hands-free mode over the speaker 170A.

The receiver 170B, also referred to as an "earpiece", is configured to convert an audio electrical signal into a sound signal. When a call is answered or audio information is listened to by using the electronic device 10, the receiver 170B may be put close to a human ear to listen to a voice.

The microphone 170C, also referred to as a "mike" or a "microphone", is configured to convert a sound signal into an electrical signal. When making a call or sending voice information, a user may make a sound by moving a human mouth close to the microphone 170C to input a sound signal to the microphone 170C. At least one microphone 170C may be disposed in the electronic device 10. In some other embodiments, two microphones 170C may be disposed in the electronic device 10, to collect a sound signal and implement a noise reduction function. In some other embodiments, three, four, or more microphones 170C may alternatively be disposed in the electronic device 10, to collect a sound signal, implement noise reduction, and identify a sound source, to implement a directional recording function and the like.

The headset jack 170D is configured to connect to a wired headset. The headset jack 170D may be a USB port 130, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 10 determines pressure intensity based on a capacitance change. When a touch operation is performed on the display 194, the electronic device 10 detects intensity of the touch operation by using the pressure sensor 180A. The electronic device 10 may calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on an application icon "Messages", an instruction for viewing an SMS message is executed. When a touch operation whose touch operation intensity is greater than or equal to the first pressure threshold is performed on an application icon "Messages", an instruction for creating an SMS message is executed.

The gyroscope sensor 180B may be configured to determine a motion posture of the electronic device 10. In some embodiments, an angular velocity of the electronic device 10 around three axes (namely, axes X, Y, and Z) may be determined by using the gyroscope sensor 180B. The gyroscope sensor 180B may be configured to implement image stabilization during photographing. For example, when a shutter is pressed, the gyroscope sensor 180B detects an angle at which the electronic device 10 jitters, obtains, through calculation based on the angle, a distance for which a lens module needs to compensate, and allows the lens to cancel the jitter of the electronic device 10 through reverse motion, to implement image stabilization. The gyroscope sensor 180B may be further used in a navigation scenario and a motion-sensing game scenario.

The barometric pressure sensor 180C is configured to measure barometric pressure. In some embodiments, the electronic device 10 calculates an altitude based on a barometric pressure value measured by the barometric pressure sensor 180C, to assist in positioning and navigation.

The magnetic sensor 180D includes a Hall effect sensor. The electronic device 10 may detect opening and closing of a flip cover by using the magnetic sensor 180D. In some embodiments, when the electronic device 10 is a clamshell phone, the electronic device 10 may detect opening and closing of a flip cover by using the magnetic sensor 180D. Further, a feature such as automatic unlocking upon opening of the flip cover is set based on a detected opening or closing state of the leather case or a detected opening or closing state of the flip cover.

The acceleration sensor 180E may detect accelerations in various directions (usually on three axes) of the electronic device 10; and may detect magnitude and a direction of gravity when the electronic device 10 is still. The acceleration sensor may be further configured to recognize a posture of the electronic device, and is used in screen switching between a landscape mode and a portrait mode, a pedometer, or another application.

The distance sensor 180F is configured to measure a distance. The electronic device 10 may measure the distance in an infrared or a laser manner. In some embodiments, in a photographing scenario, the electronic device 10 may measure a distance by using the distance sensor 180F to implement quick focusing.

The optical proximity sensor 180G may include, for example, a light-emitting diode (LED) and an optical detector such as a photodiode. The light-emitting diode may be an infrared light-emitting diode. The electronic device 10 emits infrared light by using the light-emitting diode. The electronic device 10 detects infrared reflected light from a nearby object by using the photodiode. When sufficient reflected light is detected, the electronic device 10 may determine that there is an object near the electronic device 10. When insufficient reflected light is detected, the electronic device 10 may determine that there is no object near the electronic device 10. The electronic device 10 may detect, by using the optical proximity sensor 180G, that a user holds the electronic device 10 close to an ear for a call, to automatically turn off a screen for power saving. The optical proximity sensor 180G may also be used in a leather case mode or a pocket mode to automatically unlock or lock the screen.

The ambient light sensor 180L is configured to sense ambient light brightness. The electronic device 10 may adaptively adjust brightness of the display 194 based on the sensed ambient light brightness. The ambient light sensor 180L may also be configured to automatically adjust a white balance during photographing. The ambient light sensor 180L may further cooperate with the optical proximity sensor 180G to detect whether the electronic device 10 is in a pocket, to prevent an accidental touch.

The fingerprint sensor 180G is configured to collect a fingerprint. The electronic device 10 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 10 executes a temperature processing policy based on the temperature detected by the temperature sensor 18J. For example, when the temperature reported by the temperature sensor 180J exceeds a threshold, the electronic device 10 lowers performance of a processor located near the temperature sensor 180J, to reduce power consumption to implement thermal protection. In some other embodiments, when the temperature is less than another threshold, the electronic device 10 heats the battery 142 to prevent the electronic device 10 from being shut down abnormally due to a low temperature. In some other embodiments, when the temperature is less than still another threshold, the electronic device 10 boosts an output voltage of the battery 142, to avoid abnormal shutdown due to a low temperature.

The touch sensor 180K may also be referred to as a touch panel or a touch-sensitive surface. The touch sensor 180K may be disposed on the display 194, and the touch sensor 180K and the display 194 form a touchscreen, which is also referred to as a "touch screen". The touch sensor 180K is configured to detect a touch operation performed on or near the touch sensor 180K. The touch sensor may transfer the detected touch operation to the application processor, to determine a type of a touch event. Visual output related to the touch operation may be provided on the display 194. In some other embodiments, the touch sensor 180K may alternatively be disposed on a surface of the electronic device 10 at a location different from a location of the display 194.

The bone conduction sensor 180M may obtain a vibration signal. In some embodiments, the bone conduction sensor 180M may obtain a vibration signal of a vibration bone of a human vocal part. The bone conduction sensor 180M may also be in contact with a human pulse, and receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 10 may receive a button input, and generate a button signal input related to a user setting and function control of the electronic device 10.

The motor 191 may generate a vibration prompt. The motor 191 may be configured to produce an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is used to connect to a SIM card. The SIM card may be inserted into the SIM card interface 195 or removed from the SIM card interface 195, to implement contact with or separation from the electronic device 10. The electronic device 10 may support one or N SIM card interfaces, where N is a positive integer greater than 1. The SIM card interface 195 can support a nano-SIM card, a micro-SIM card, a SIM card, and the like. A plurality of cards may be simultaneously inserted into a same SIM card interface 195. The plurality of cards may be of a same type or of different types. The SIM card interface 195 is applicable to different types of SIM cards. The SIM card interface 195 is also applicable to an external storage card. The electronic device 10 interacts with a network through the SIM card, to implement functions such as calling and data communication. In some embodiments, the electronic device 10 uses an eSIM, that is, an embedded SIM card. The eSIM card may be embedded in the electronic device 10, and cannot be separated from the electronic device 10.

For example, the electronic device 10 shown in FIG. 1A may display, by using the display 194, user interfaces described in the following embodiments. The electronic device 10 may detect a touch operation in each user interface by using the touch sensor 180K, for example, a tap operation (for example, a touch operation or a double-tap operation on an icon) in each user interface, or an upward or downward slide operation or an operation of drawing a circle gesture in each user interface. In some embodiments, the electronic device 10 may detect, by using the gyroscope sensor 180B, the acceleration sensor 180E, or the like, a motion gesture made by the user by holding the electronic device 10, for example, shaking the electronic device. In some embodiments, the electronic device 10 may detect a non-touch gesture operation by using the 3D camera module 193 (for example, a 3D camera or a depth camera).

A software system of the electronic device 10 may use a layered architecture, an event-driven architecture, a microkernel architecture, a micro service architecture, or a cloud architecture. In the embodiments of the present invention, an Android system with the layered architecture is used as an example to illustrate a software structure of the electronic device 10.

Figure 1B:
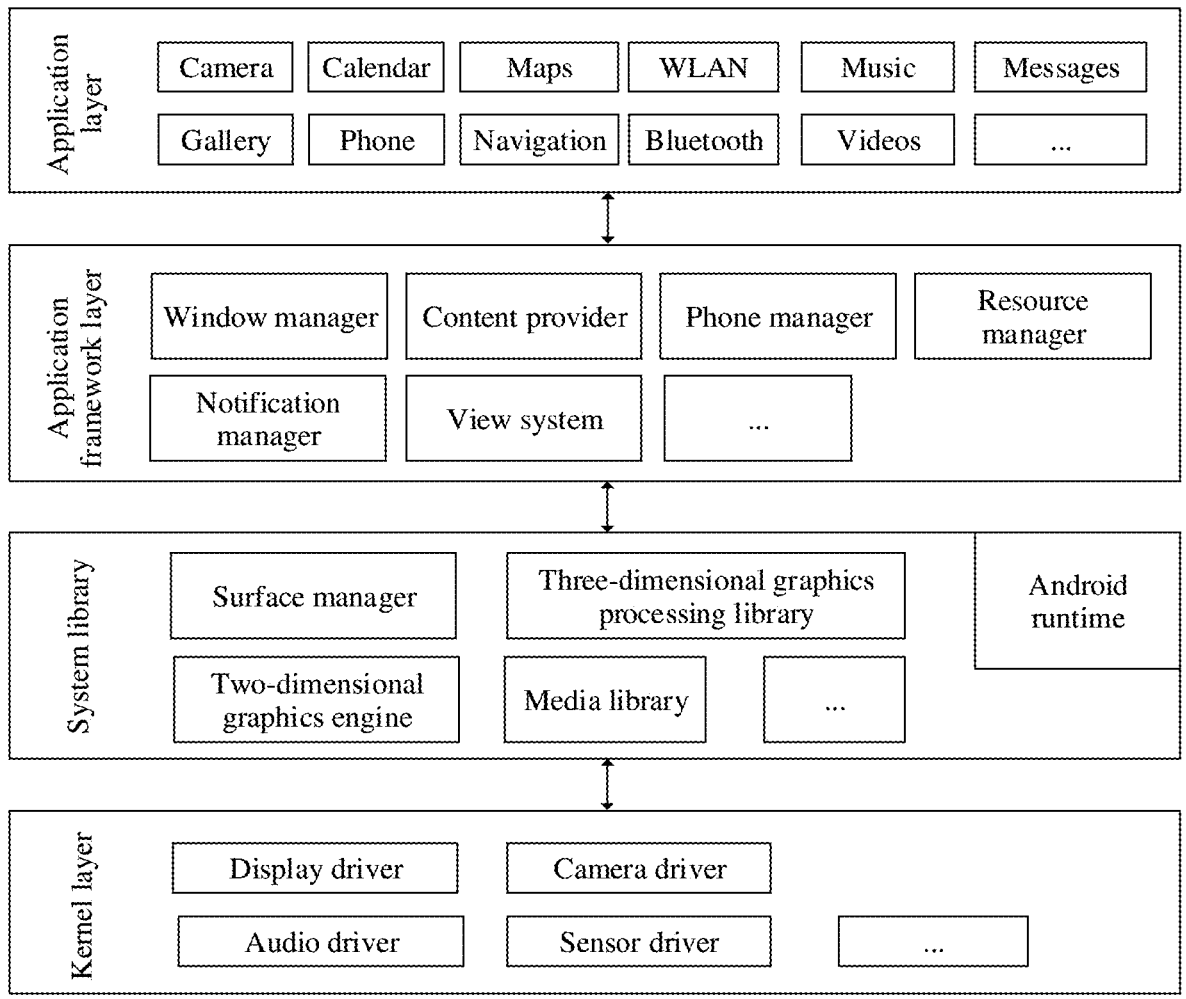
FIG. 1B is a block diagram of a software structure of an electronic device according to an embodiment of this application.

FIG. 1B is a block diagram of a software structure of an electronic device 10 according to an embodiment of this application.

In a layered architecture, software is divided into several layers, and each layer has a clear role and task. The layers communicate with each other through a software interface. In some embodiments, an Android system is divided into four layers: an application layer, an application framework layer, an Android runtime (Android runtime) and system library, and a kernel layer from top to bottom.

The application layer may include a series of application packages.

As shown in FIG. 1B, the application package may include applications such as "Camera", "Gallery", "Calendar", "Phone", "Maps", "Navigation", "WLAN", "Bluetooth", "Music", "Videos", and "Messages".

The application framework layer provides an application programming interface (application programming interface, API) and a programming framework for an application at the application layer. The application framework layer includes some predefined functions.

As shown in FIG. 1B, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to store and obtain data, and enable the data to be accessed by an application. The data may include a video, an image, audio, calls that are made and received, a browsing history and bookmarks, a phone book, and the like.

The view system includes visual controls, such as a control for displaying a text and a control for displaying an image. The view system may be configured to construct an application. A display interface may include one or more views. For example, a display interface including a message notification icon may include a text display view and a picture display view.

The phone manager is configured to provide a communication function of the electronic device 10, for example, management of a call status (including answering or declining a call).

The resource manager provides various resources for an application, such as a localized character string, an icon, a picture, a layout file, and a video file.

The notification manager enables an application to display notification information in a status bar, and may be configured to convey a notification type message, where the displayed notification information may automatically disappear after a short pause and require no user interaction. For example, the notification manager is configured to provide notifications of download completing, a message prompt, and the like. The notification manager may alternatively be a notification that appears on a top status bar of the system in a form of a graph or a scroll bar text, for example, a notification of an application running on the background or a notification that appears on the screen in a form of a dialog window. For example, text information is displayed in the status bar, an alert sound is played, the electronic device vibrates, or the indicator light blinks.

The Android runtime includes a kernel library and a virtual machine. The Android runtime is responsible for scheduling and management of the Android system.

The kernel library includes two parts: a function that needs to be invoked in Java language and a kernel library of Android.

The application layer and the application framework layer run on the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of function modules, for example, a surface manager (surface manager), a media library (Media Library), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording of audio and video in a plurality of commonly used formats, static image files, and the like. The media library may support a plurality of audio and video coding formats, such as MPEG-4, G.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The software system shown in FIG. 1B relates to an application presentation (such as a gallery or a file manager) that uses a sharing capability, a moment share module that provides the sharing capability, a print service (print service) that provides a printing capability, and a print spooler (print spooler). In addition, the application framework layer provides a printing framework, a WLAN service, and a Bluetooth service, and the bottom kernel layer provides a WLAN Bluetooth capability and a basic communications protocol.

The following describes examples of working procedures of software and hardware of the electronic device 10 with reference to a photographing scenario.

When the touch sensor 180K receives a touch operation, a corresponding hardware interruption is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. An example in which the touch operation is a touch operation and a control corresponding to the touch operation is a control of a camera application icon is used. A camera application invokes an interface of the application framework layer, so that the camera application is started. Then, a camera driver is started by invoking the kernel layer, and a static image or a video is captured by using the camera module 193.

The following describes an example of a user interface for an application menu on the electronic device 10.

Figure 2A:
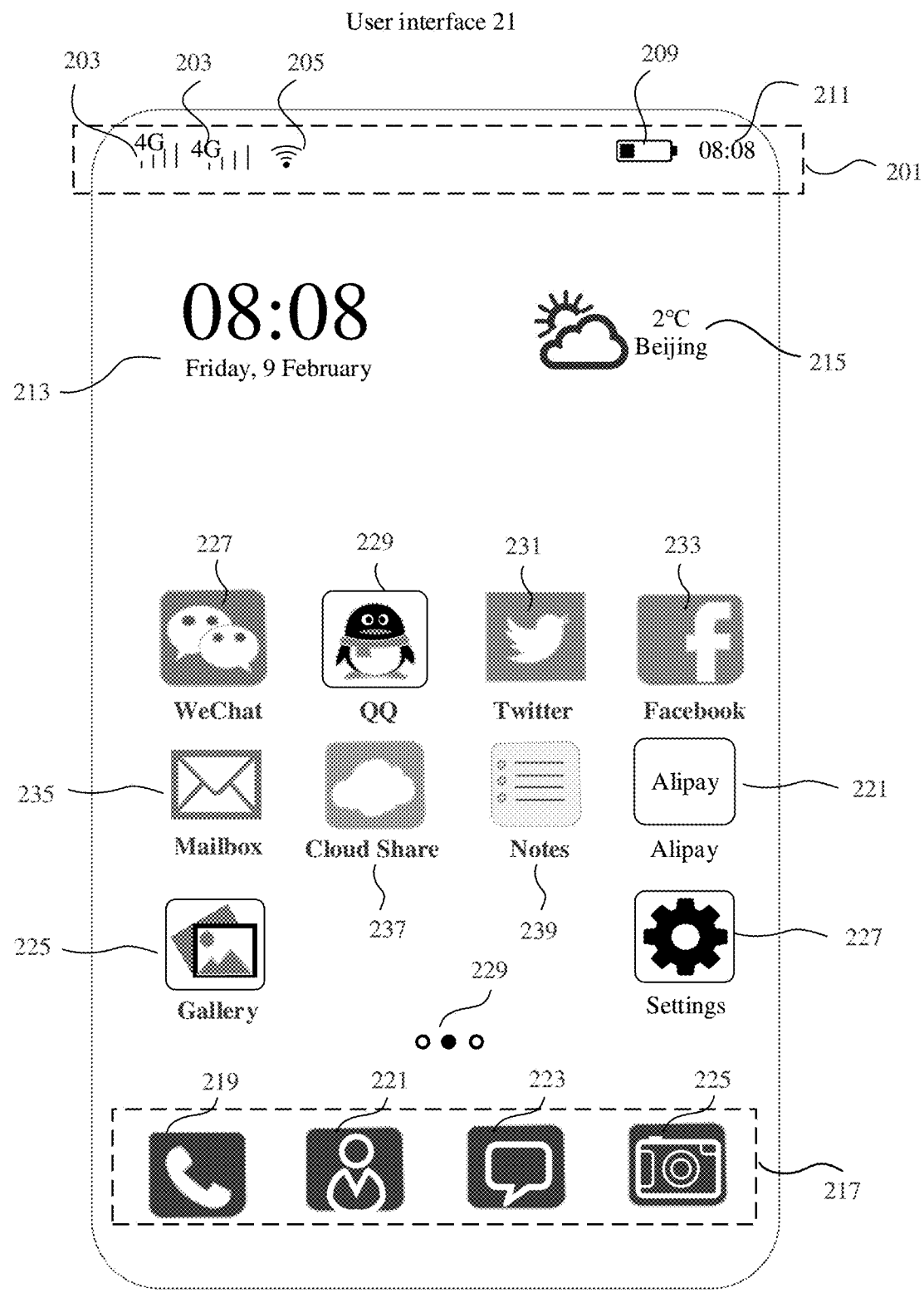
FIG. 2A is a schematic diagram of a home screen displayed by an electronic device according to an embodiment of this application.

FIG. 2A shows an example of a user interface 21 for displaying an application menu on an electronic device 10.

As shown in FIG. 2A, the user interface 21 may include a status bar 201, a tray 217 with commonly used application icons, a calendar widget 213, a weather widget 215, and other application icons. The status bar 201 may include one or more signal strength indicators 203 for mobile communication signals (which may also be referred to as cellular signals), one or more signal strength indicators 205 for wireless fidelity (wireless fidelity, Wi-Fi) signals, a battery status indicator 209, and a time indicator 211.

The calendar widget 213 may be used to indicate a current time, for example, a date, a day of a week, and hour and minute information.

The weather widget 215 may be used to indicate a weather type, for example, cloudy to sunny, or light rain, and may be further used to indicate information such as a temperature.

The tray 217 with commonly used application icons may include a "Phone" icon 219, a "Contacts" icon 221, a "Messages" icon 223, and a "Camera" icon 225.

For example, the other application icons may be a "WeChat (WeChat)" icon 227, a "QQ" icon 229, a "Twitter (Twitter)" icon 231, a "Facebook (Facebook)" icon 233, a "Mailbox" icon 235, a "Cloud Share" icon 237, a "Notes" icon 239, an "Alipay" icon 221, a "Gallery" icon 225, and a "Settings" icon 227. The user interface 21 may further include a page indicator 229. The other application icons may be distributed on another page. The page indicator 429 may be used to indicate a quantity of pages and a specific page currently browsed by a user. For example, the page indicator 429 is displayed as three small dots, the second small dot is black, and the other two small dots are white. This indicates that a mobile phone currently includes three pages and the user currently browses the second page. In addition, the user may slide leftward or rightward on the current page to browse an application icon on another page.

In some embodiments, the example of the user interface 21 shown in FIG. 2A may be a user interface of a home screen (Home screen).

In some other embodiments, the electronic device 10 may further include a home button. The home button may be a physical button or a virtual button. The home button may be configured to: receive an instruction from the user, and enable a currently displayed UI to be switched to the home screen in response to the instruction from the user. This can help the user view the home screen at any time. The instruction may be specifically an operation instruction of pressing the home button once by the user, may be an operation instruction of consecutively pressing the home button twice by the user within a short time, or may be an operation instruction of touching and holding the home button by the user within a predetermined time. In some other embodiments of this application, a fingerprint sensor may be further integrated into the home button, so that a fingerprint is collected and recognized when the home button is pressed.

It may be understood that FIG. 2A merely shows the example of the user interface on the electronic device 10, and should not constitute a limitation on this embodiment of this application.

Figure 2B:
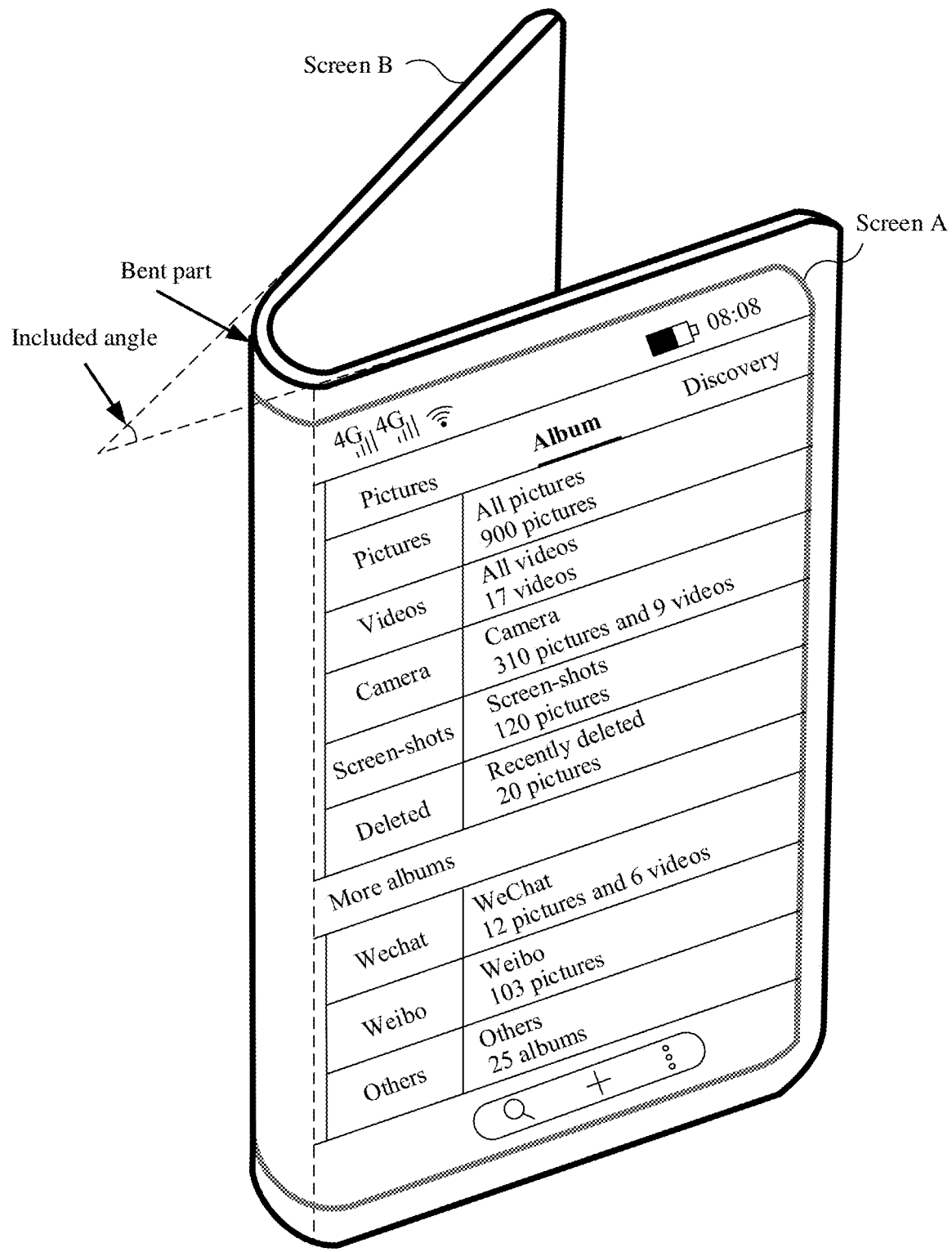
FIG. 2B is a schematic diagram of an electronic device according to an embodiment of this application.

FIG. 2B is a schematic diagram of an example of an electronic device 10.

As shown in FIG. 2B, a display 194 of the electronic device 10 is a foldable screen, and the display 194 may be divided into a screen A and a screen B after the electronic device is folded.

Figure 2C:
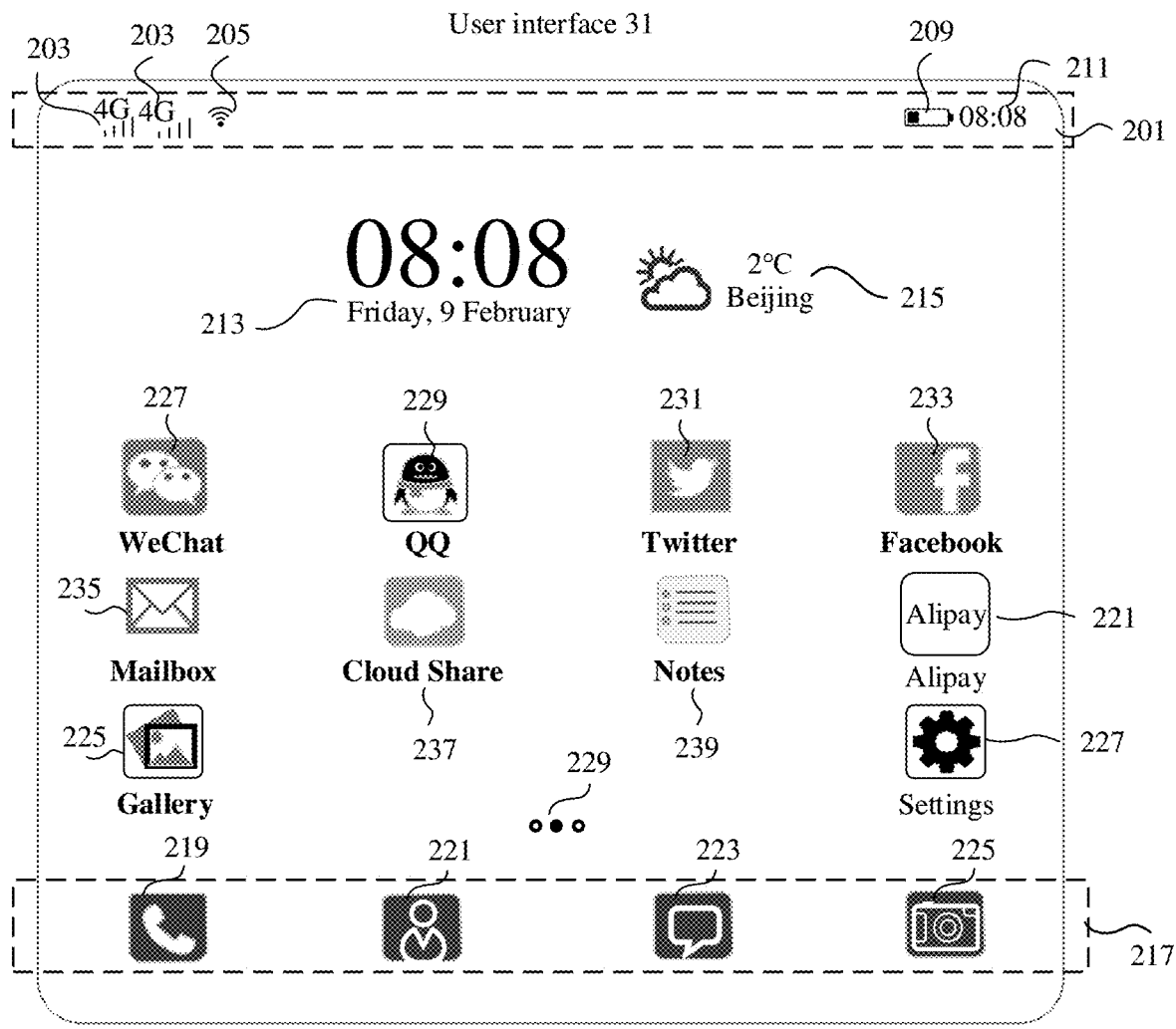
FIG. 2C is a schematic diagram of another home screen displayed by an electronic device according to an embodiment of this application.

Corresponding to the example of the electronic device 10 shown in FIG. 2B, FIG. 2C shows an example of still another user interface 22 for displaying an application menu on an electronic device 10. It should be noted that the user interface 22 includes content displayed on a screen A and content displayed on a screen B. Content included in a display 194 is presented in a plane form in FIG. 2C. However, in an actual scenario, FIG. 2C may be presented on the foldable screen shown in FIG. 2B. The content displayed on the screen A and the content displayed on the screen B are located in different planes. Specifically, when the foldable screen is unfolded to 180 degrees, the content displayed on the display 194 is located on a same plane. Elements included in FIG. 2C may be the same as the elements included in FIG. 2A. For details, refer to the descriptions in FIG. 2A.

The following describes some split-screen display embodiments provided in this application.

Figure 3A:
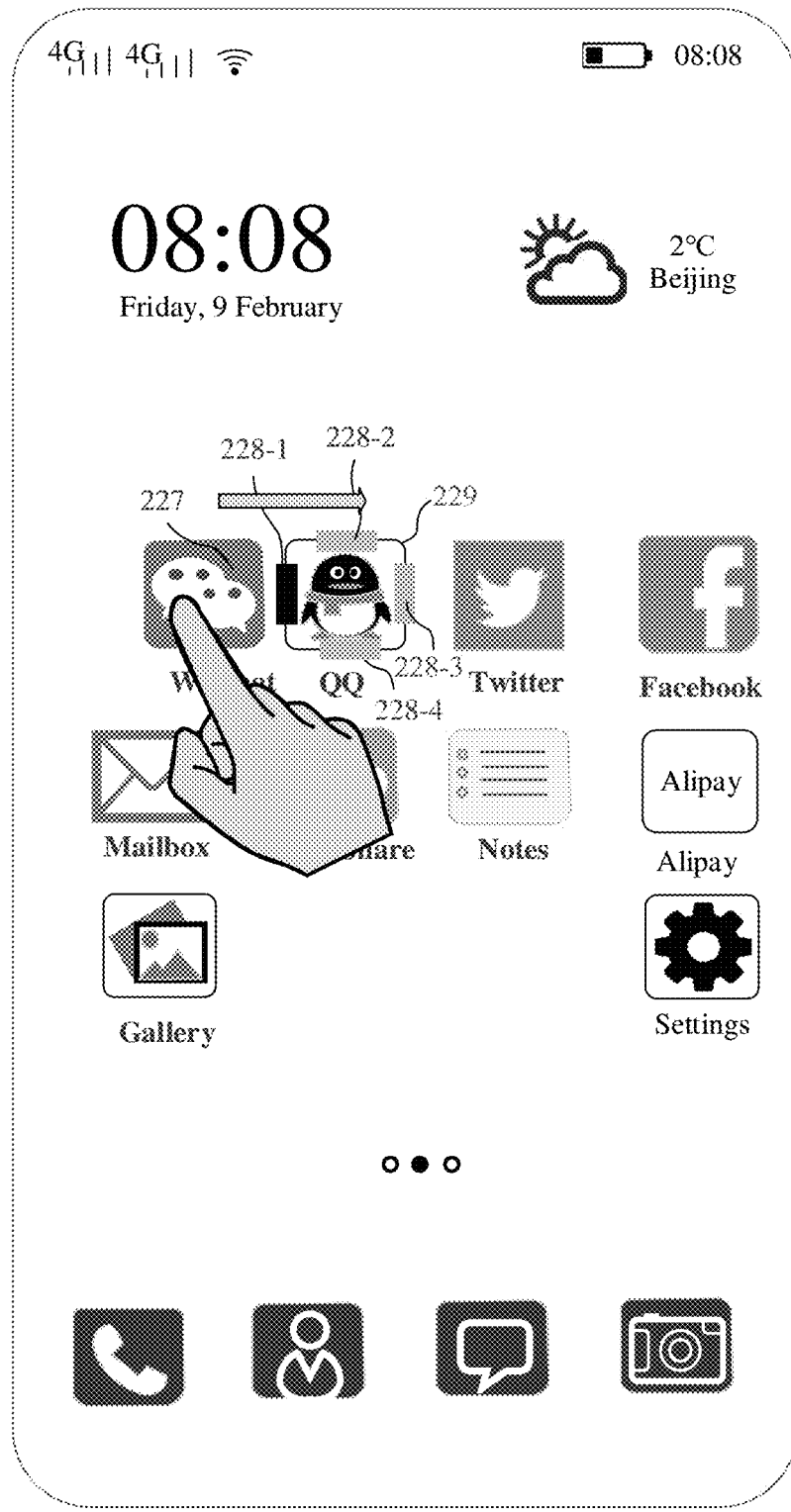
FIG. 3A to FIG. 3C are schematic diagrams of some user interfaces for split screen according to an embodiment of this application.
Figure 3B:
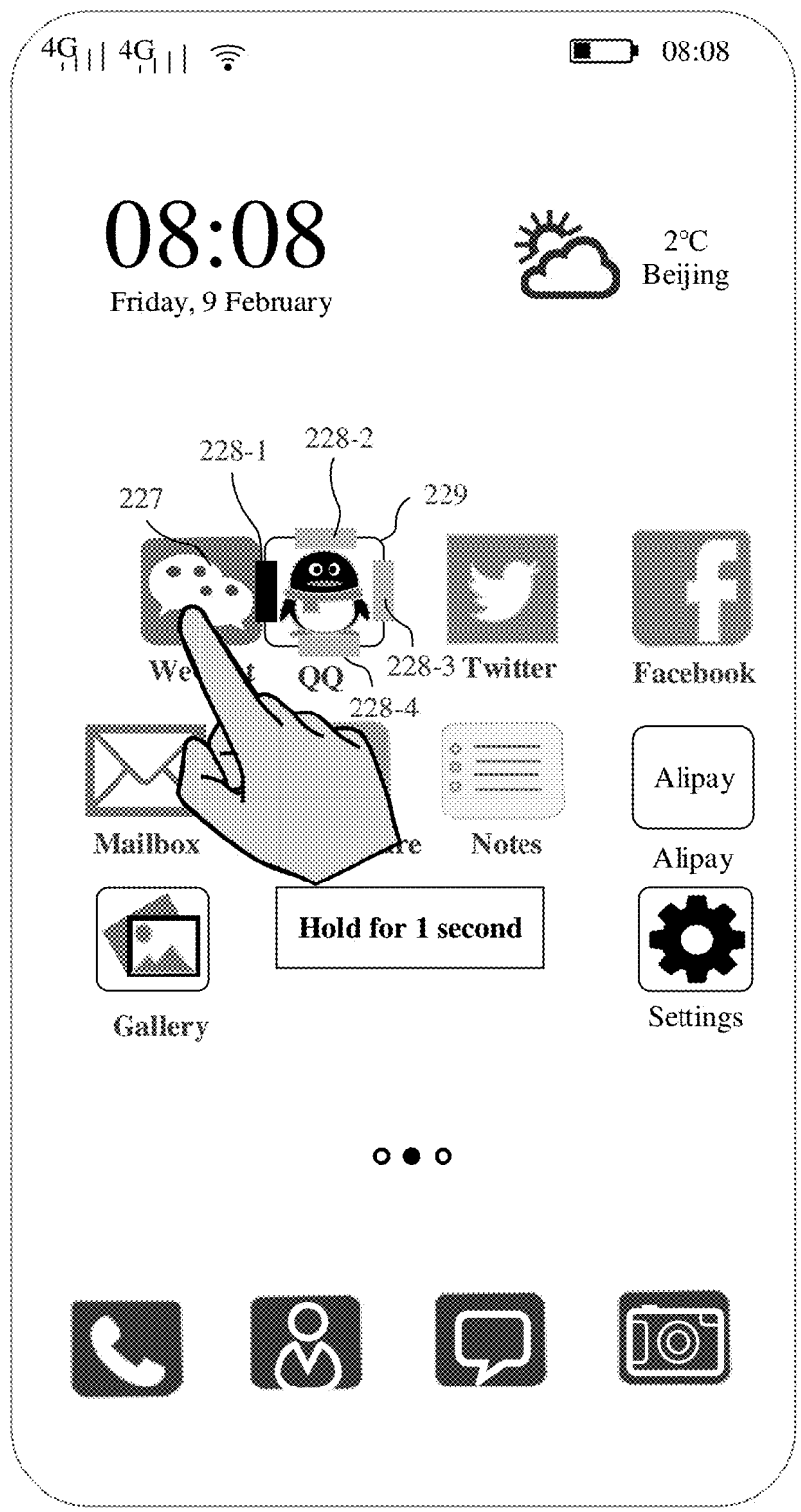
Figure 3C:
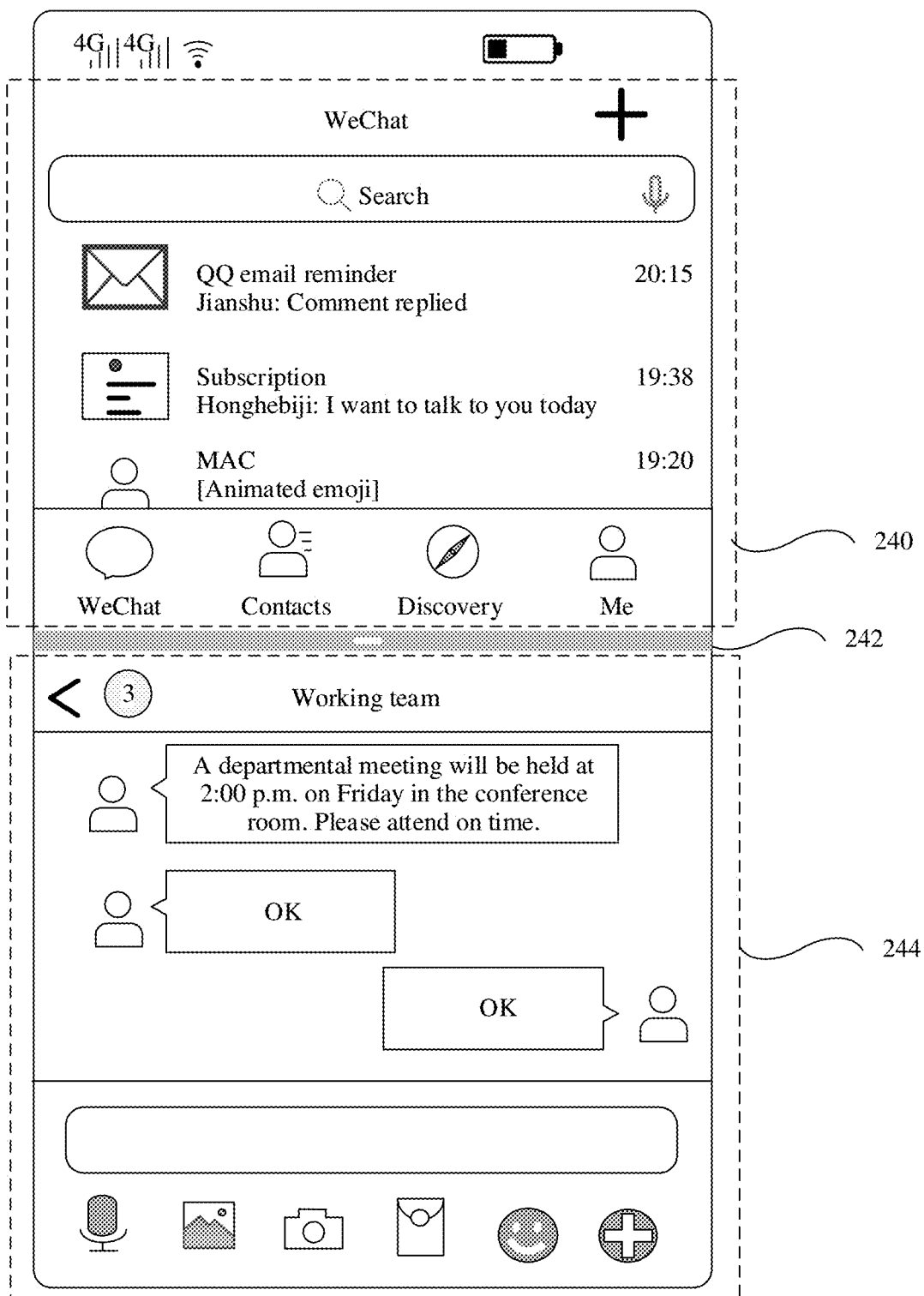

FIG. 3A to FIG. 3C are schematic diagrams of examples of some user interfaces for split screen.

In the embodiment illustrated in FIG. 3A to FIG. 3C, when a user moves an icon of a first application that needs to be displayed in a split screen manner to a location around an icon of a second application, an electronic device displays a prompt for the icon of the second application. Then, if the user enables the icon of the first application to be in contact with the prompt corresponding to the second application, and keeps duration for contact not less than a preset value, the electronic device displays a first split-screen interface including an interface of the second application and an interface of the first application.

Figure 3D:
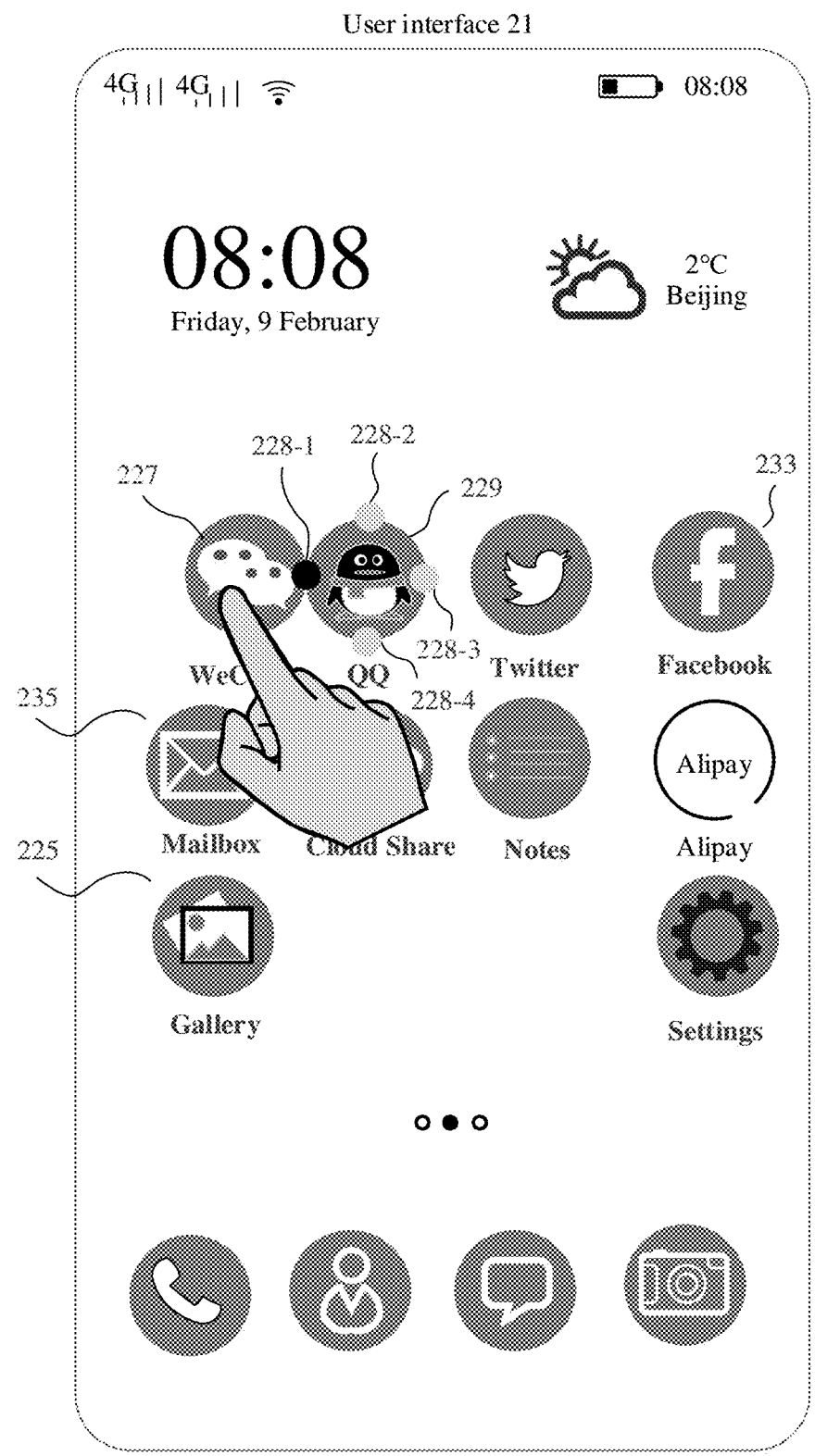
FIG. 3D is a schematic diagram of a prompt according to an embodiment of this application.

For example, as shown in FIG. 3A, the electronic device receives an operation input by the user on the icon of the first application (namely, a "WeChat" icon 227), where the operation is an operation of moving the "WeChat" icon to a nearby area of a "QQ" icon (namely, the "QQ" icon 229). The electronic device displays four prompts around the icon 229 in response to the operation, where the four prompts are specifically a prompt 228-1 (located on the left side of the icon 229), a prompt 228-2 (located on the top side of the icon 229), a prompt 228-3 (located on the right side of the icon 229), and a prompt 228-4 (located on the bottom side of the icon 229). These prompts are used to indicate that the second application (namely, "QQ") can support a split-screen operation. In an optional implementation, only one prompt may be displayed around the icon 229, where the prompt is the prompt 228-1 closest to the icon 227 in the foregoing prompts. It should be noted that moving the icon of the first application to the location near the icon of the second application means that pixels on edges of the icon of the first application fall within a nearby area of the icon of the second application, where the nearby area is an area including pixels that are outside the icon of the second application and that have distances to edges of the icon of the second application less than a preset value. FIG. 3H is a schematic diagram of a nearby area and a preset area of an application icon according to an embodiment of this application.

In a possible implementation, when the icon 227 is moved to a location near the icon 229, the electronic device specially displays (for example, highlights, changes a color, darkens a color, displays in a dither manner) the prompt 228-1 closest to the icon 227 in these prompts. Optionally, in this case, the electronic device may further display a magnetic attraction effect of the icon 229 on the icon 227. The magnetic attraction effect is represented as follows: The icon 229 and the icon 227 are joined, so that edges of the icon 227 are aligned with edges of the icon 229, and an edge of the icon 227 that is closest to an edge of the icon 229 approaches the edge of the icon 229. In particular, the edge of the icon 227 that is closest to the edge of the icon 229 may overlap with the edge of the icon 229. As shown in FIG. 3B, an upper edge of the icon 227 and an upper edge of the icon 229 are located on a same horizontal line, a lower edge of the icon 227 and a lower edge of the icon 229 are located on a same horizontal line, a left edge and a right edge of the icon 227 are parallel to a left edge and a right edge of the icon 229, and the right edge of the icon 227 approaches the left edge of the icon 229. Optionally, after the icon 229 and the icon 227 are joined, the electronic device may not continue to display a prompt around the icon 229.

It should be noted that the prompt may be displayed in a plurality of different manners. For example, if an application icon displayed on a user interface of a terminal is a circle, an example of prompts may be shown in FIG. 3D. The prompts are four dots around the icon 229, and a display color of the prompt 228-1 closest to the icon 227 is changed. In addition, the prompt may be displayed in another manner. For example, a circular prompt may also be displayed for a square icon. This is not limited in this embodiment of this application. In addition, to avoid blocking an application icon, transparency may be set for the prompt, or the prompt may be displayed on the bottom side of the application icon. This is not limited in this embodiment of this application.

For example, as shown in FIG. 3B and FIG. 3C, the user continuously drags the icon 227, so that the icon 227 is in contact with the prompt 228-1. Then, if detecting that the icon 227 is continuously in contact with the prompt 228-1 and duration for contact is not less than the preset value, the electronic device displays a user interface 22 including the interface of the second application and the interface of the first application. The user interface 22 includes a first display area 240, a second display area 244, and a split-screen flag 242.

The first display area 240 may be used to display the interface of the first application. If the first application is not started before the interface of the first application is displayed, the interface of the first application is an interface displayed when the first application is started. If the first application is started before the interface of the first application is displayed, the interface of the first application is an interface of the first application displayed before the first application is closed last time.

The second display area 244 may be used to display the interface of the second application. If the second application is not started before the interface of the first application is displayed, the interface of the second application is an interface displayed when the second application is started. If the second application is started before the interface of the first application is displayed, the interface of the second application is an interface of the first application displayed before the second application is closed last time. It should be noted that the interface of the second application may alternatively be displayed in the first display area 240, and the interface of the first application may alternatively be displayed in the second display area. This is not limited in this embodiment.

The split-screen flag 242 may be used to separate the first display area 240 from the second display area 244. The split-screen flag 242 is further used to receive a slide operation of the user. The electronic device adjusts a size of the first display area 240 and a size of the second display area 242 in response to the slide operation of the user. Specifically, if the slide operation is a slide operation toward a status bar 201, the electronic device decreases the size of the first display area 240, and increases the size of the second display area 244. If the slide operation is a slide operation away from the status bar 201, the electronic device increases the size of the first display area 240, and decreases the size of the second display area 244. It should be noted that the split-screen flag 242 may not be displayed in the user interface 22. In addition, in this case, the size of the first display area 240 may be the same as the size of the second display area 244.

In this manner, the user can control the icon of the first application to conveniently enter the split-screen interface corresponding to the first application and the second application. This improves split-screen operation efficiency, and improves user experience.

Figure 3E:
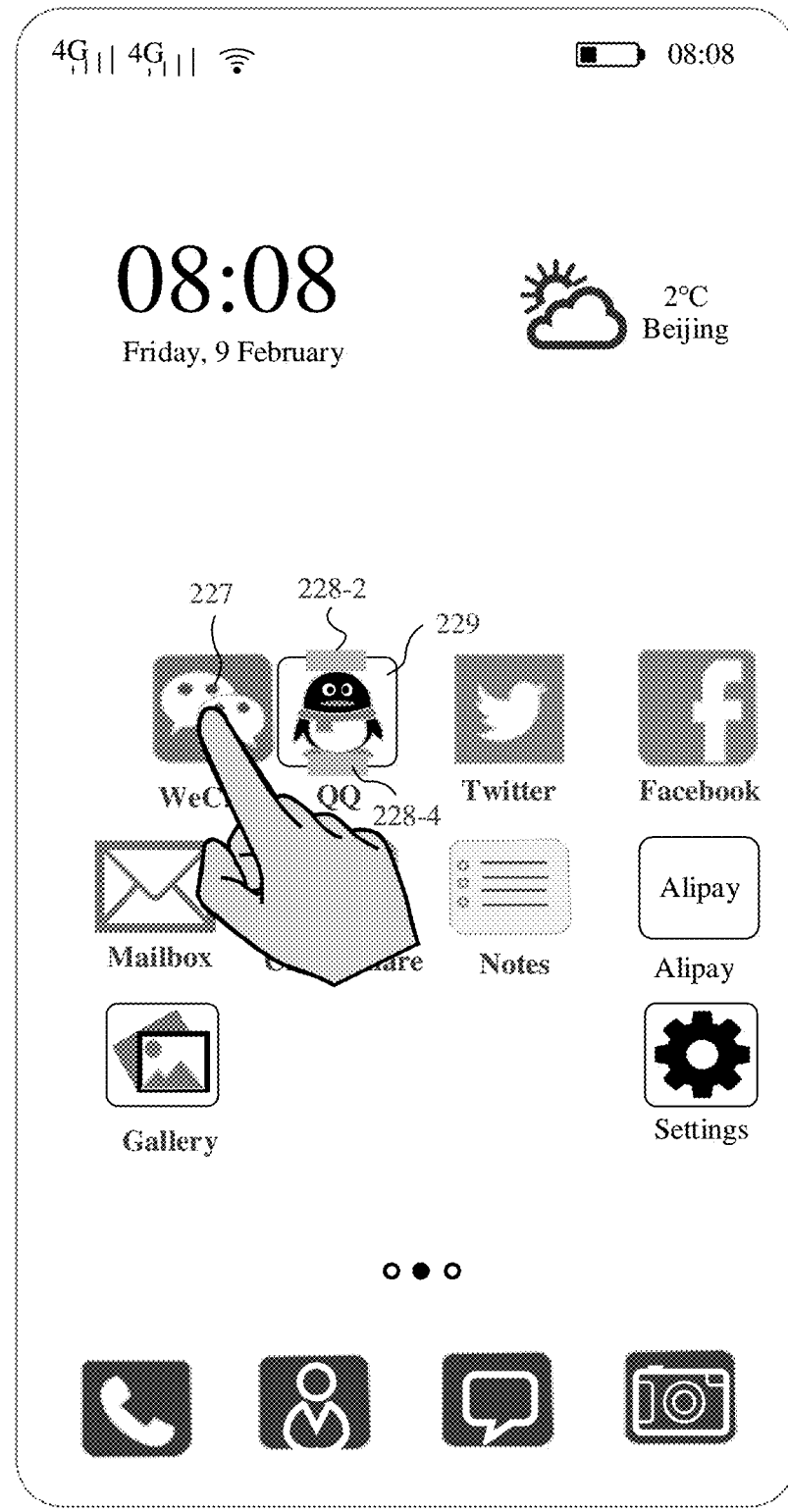
FIG. 3E to FIG. 3G are schematic diagrams of some other user interfaces for split screen according to an embodiment of this application.
Figure 3F:
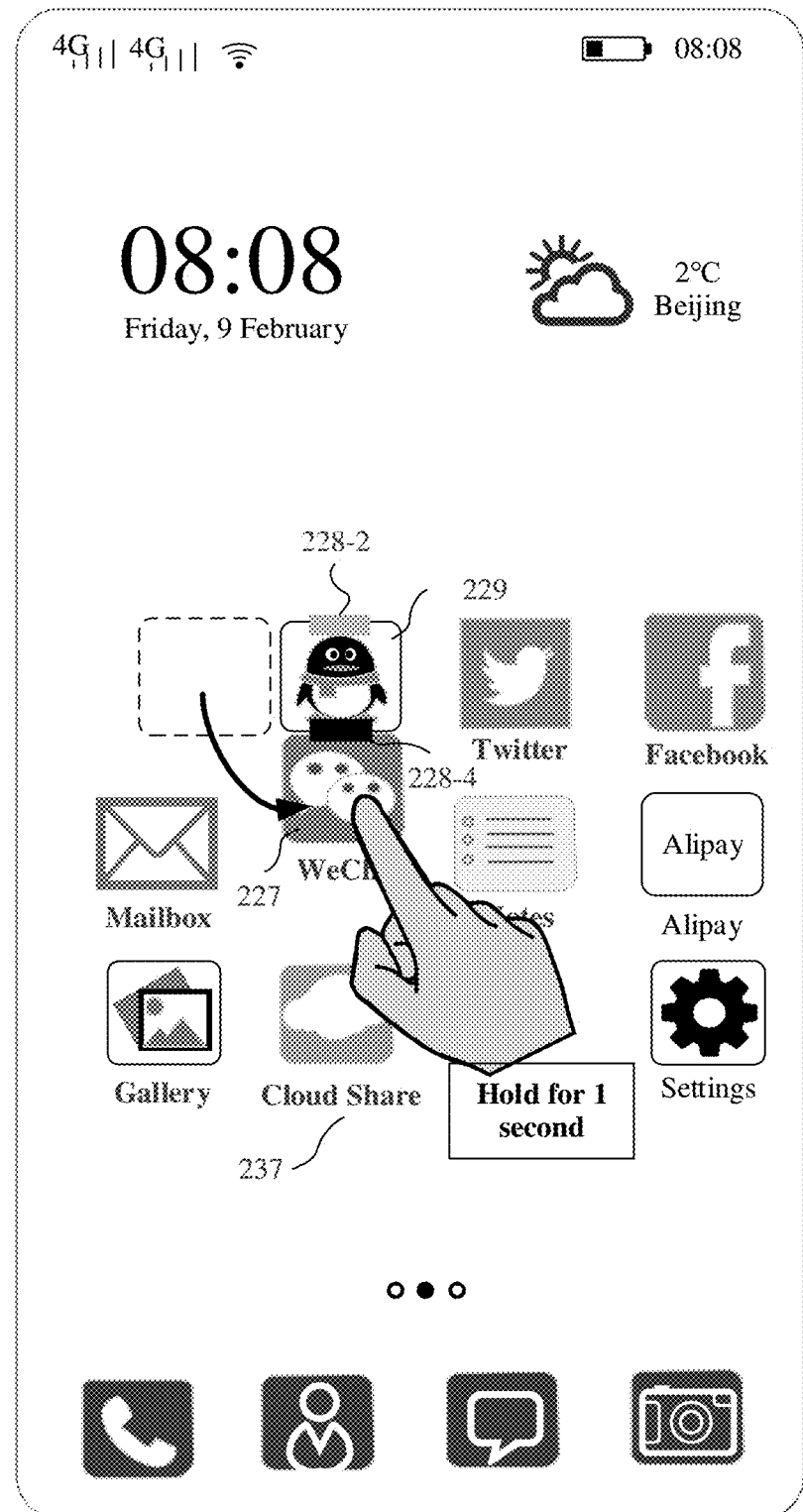
Figure 3G:
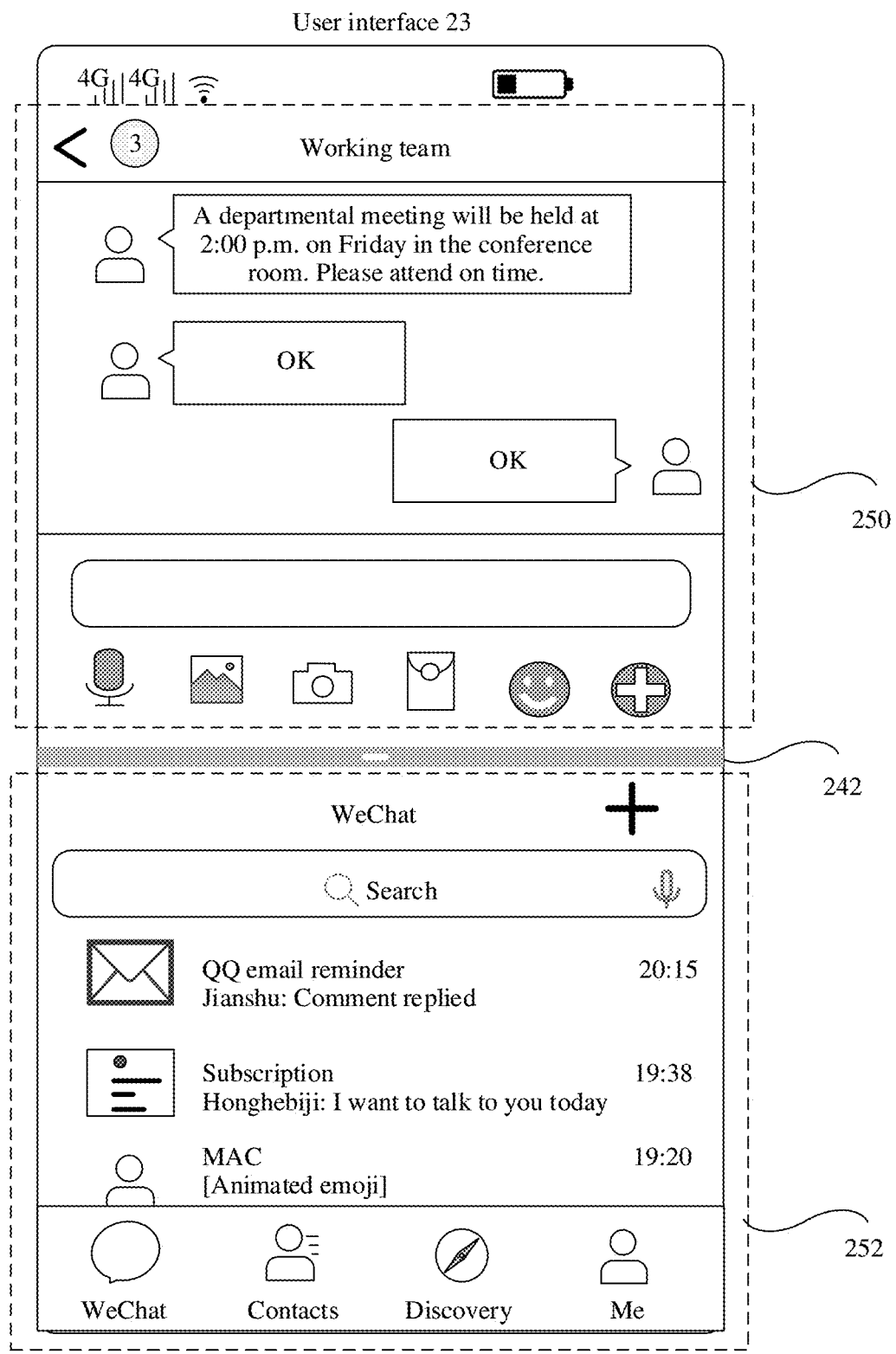
Figure 3H:
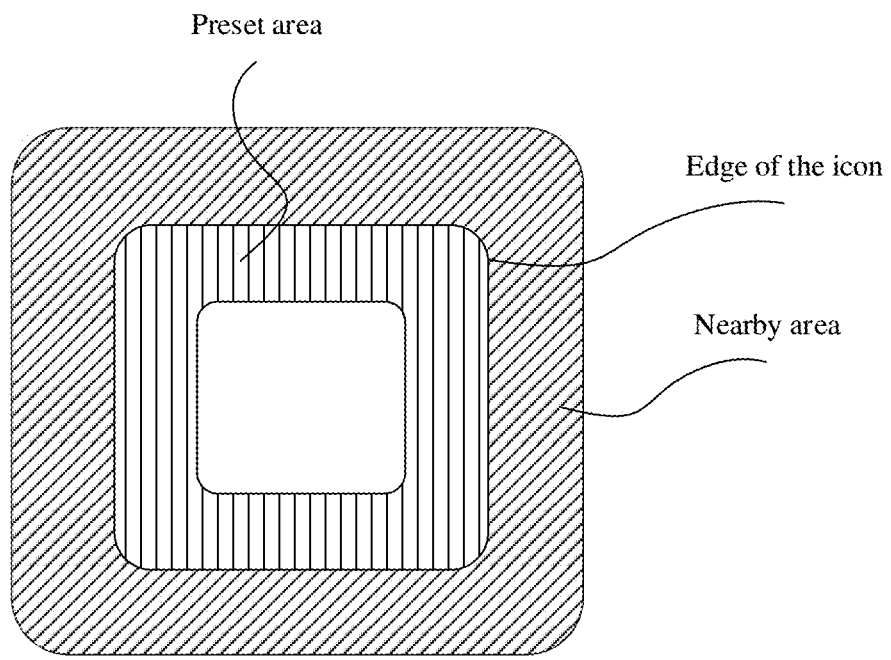
FIG. 3H is a schematic diagram of a preset area and a nearby area of an application icon according to an embodiment of this application.

FIG. 3E to FIG. 3G are schematic diagrams of examples of some other user interfaces for split screen.

In an embodiment illustrated in FIG. 3E to FIG. 3G, a direction of a prompt displayed by the electronic device for the icon 229 relative to the icon 229 is consistent with a split-screen direction supported by the electronic device 10. The user can intuitively learn the split-screen direction supported by the electronic device. Particularly, a location relationship between the icon 229 and the icon 227 is the same as a location relationship between a display interface of "QQ" and a display interface of "WeChat" in the split-screen interface.

For example, as shown in FIG. 3E, the electronic device receives an operation input by the user on the icon 227, where the operation is an operation of moving the icon 227 to a location near the icon 229. The electronic device displays a prompt around the icon 229 in response to the operation. If the electronic device 10 supports only an up-down split-screen mode, prompts displayed on the icon 229 are the prompt 228-2 located on the top side of the icon 229 and the prompt 228-4 located on the bottom side of the icon 229. In this manner, the user can conveniently learn the split-screen direction supported by the electronic device.

For example, as shown in FIG. 3F and FIG. 3G, the electronic device receives an operation input by the user for enabling the icon 227 to be in contact with the prompt 228-4 and keeping duration in which the icon 227 is not moved not less than the preset value. The electronic device displays a user interface 23 including the interface of the second application and the interface of the first application in response to the operation. Optionally, in a process of moving the icon 227, the electronic device may move an icon 237, so that the icon 237 and the icon 227 do not block each other.

The user interface 23 includes a first display area 250, a second display area 252, and a split-screen flag 242.

The first display area may be used to display a display interface of "QQ" corresponding to the icon 229. For specific content included in the interface of the application, refer to the foregoing descriptions. Details are not described herein again.

The second display area may be used to display a display interface of "WeChat" corresponding to the icon 227. For specific content included in the interface of the application, refer to the foregoing descriptions. Details are not described herein again. It should be noted that, display content in the first display area and display content in the second display area are determined based on the location relationship between the icon 229 and the icon 227 in this embodiment. Specifically, if the icon 229 is located on the top side of the icon 227, the display interface of "QQ" is located on the bottom side of the display interface of "WeChat" in the user interface 23. In other words, it is determined that the display interface of "QQ" is displayed in the first display area, and the display interface of "WeChat" is displayed in the second display area.

For the split-screen flag 242, refer to the foregoing descriptions. Details are not described herein again.

In this manner, the user can control the location relationship between the icon of the second application and the icon of the first application, to determine the location relationship between the interface of the second application and the interface of the first application in the split-screen interface. This further improves split-screen operation efficiency.

The foregoing describes some embodiments of displaying a split-screen interface on the electronic device. Optionally, there may be a plurality of possible implementations in these embodiments. The following describes some possible implementations.

Figure 4A:
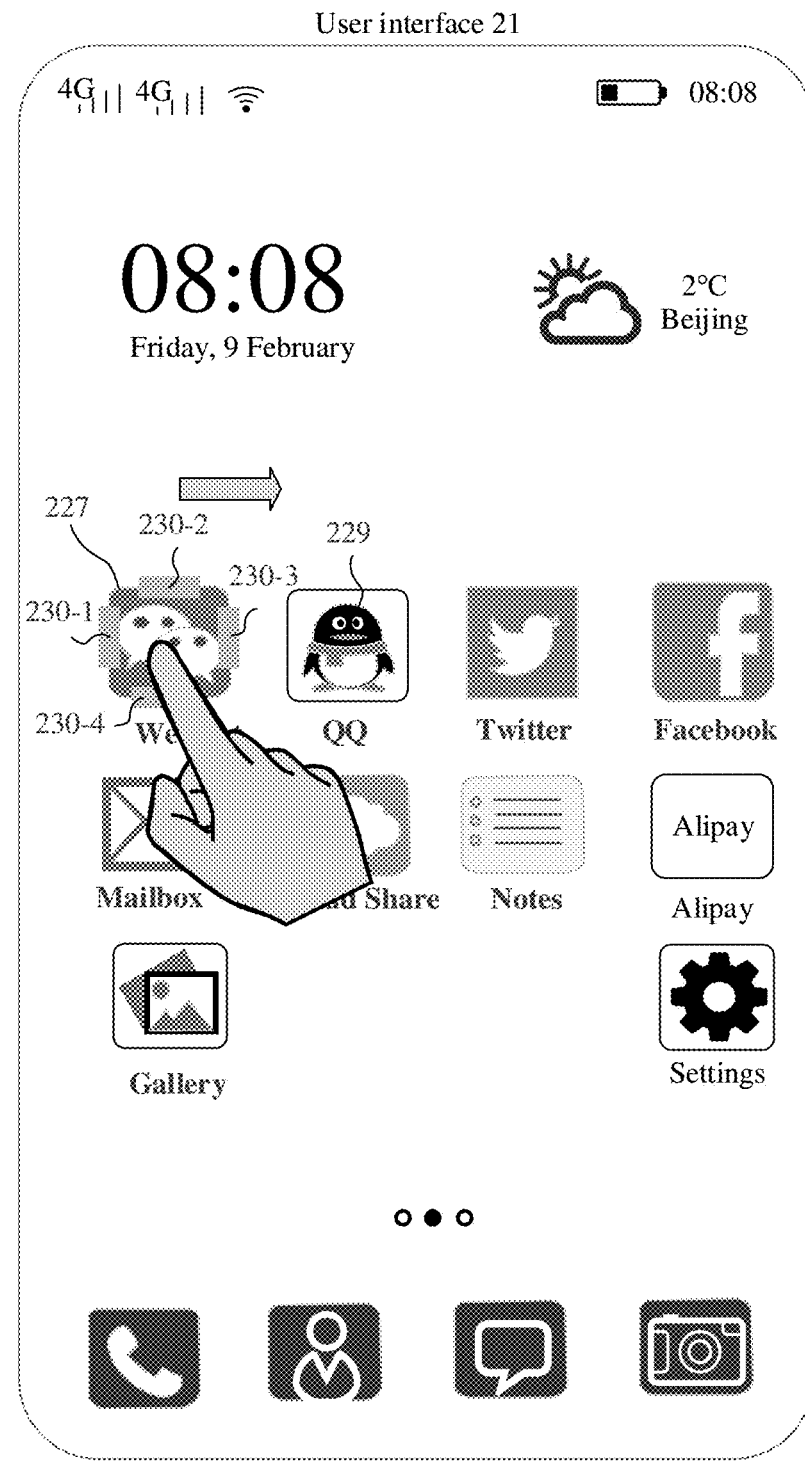
FIG. 4A and FIG. 4B are schematic diagrams of some user interfaces displaying prompts according to an embodiment of this application.

FIG. 4A shows an example of a user interface 21 displaying a prompt for an icon of a first application.

For example, as shown in FIG. 4A, before prompts are displayed for an icon or icons of one or more second applications, an electronic device detects an operation (for example, a touch-and-hold operation, or a force touch (force touch) operation) performed by a user on the icon of the first application (namely, a "WeChat" icon 227). The electronic device displays four prompts around the icon 227 in response to the operation of the user, where the four prompts include a prompt 230-1 (located on the left side of the icon 227), a prompt 230-2 (located on the top side of the icon 227), a prompt 230-3 (located on the right side of the icon 227), and a prompt 230-4 (located on the bottom side of the icon 227). The prompts may indicate that the first application can support a split-screen operation. It should be noted that seventh prompts may not be displayed around the icon of the first application. This is not limited in this embodiment of this application. Optionally, the electronic device may display, for the icon 227, only a seventh prompt that is in a direction the same as a split-screen direction supported by the electronic device.

Figure 4B:
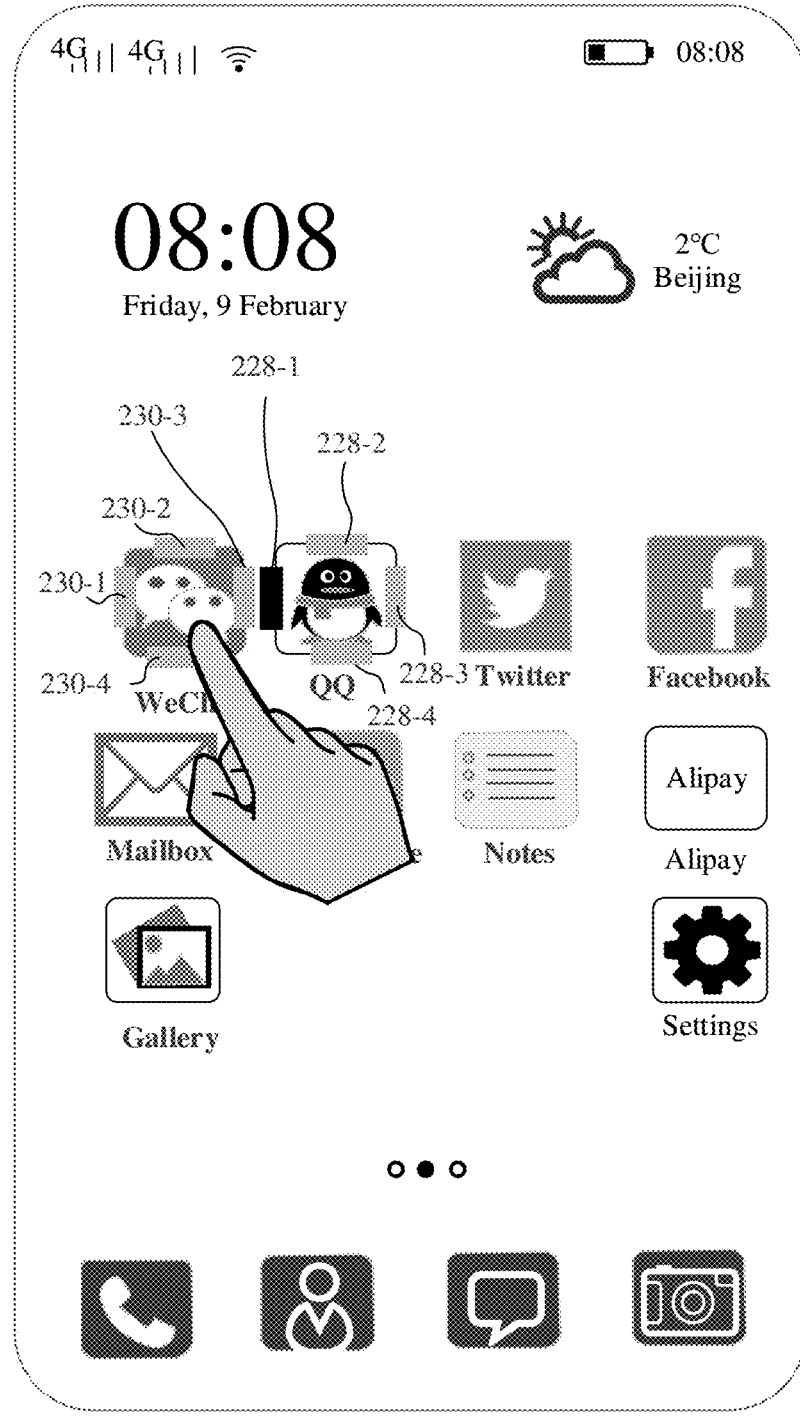

For example, as shown in FIG. 4A and FIG. 4B, the electronic device receives an operation input by the user on the icon 227, where the operation is an operation of moving the icon 227 to a location near an icon 229. The electronic device displays four prompts around the icon 229 in response to the operation, where the four prompts include a prompt 228-1 (located on the left side of the icon 229), a prompt 228-2 (located on the top side of the icon 229), a prompt 228-3 (located on the right side of the icon 229), and a prompt 228-4 (located on the bottom side of the icon 229). Optionally, the electronic device may further display a magnetic attraction effect of the icon 229 on the icon 227, where the magnetic attraction effect is represented as follows: The icon 229 and the icon 227 are joined, so that the prompt 228-1 corresponding to the icon 229 overlaps with the prompt 230-3 corresponding to the icon 227. Optionally, after the prompt 228-1 overlaps with the prompt 230-3, the electronic device may display only an overlapped prompt 230-3/228-1 and no longer display other prompts. It should be noted that, for a method for subsequently displaying a split-screen interface, refer to the foregoing descriptions. Details are not described herein again.

Figure 4C:
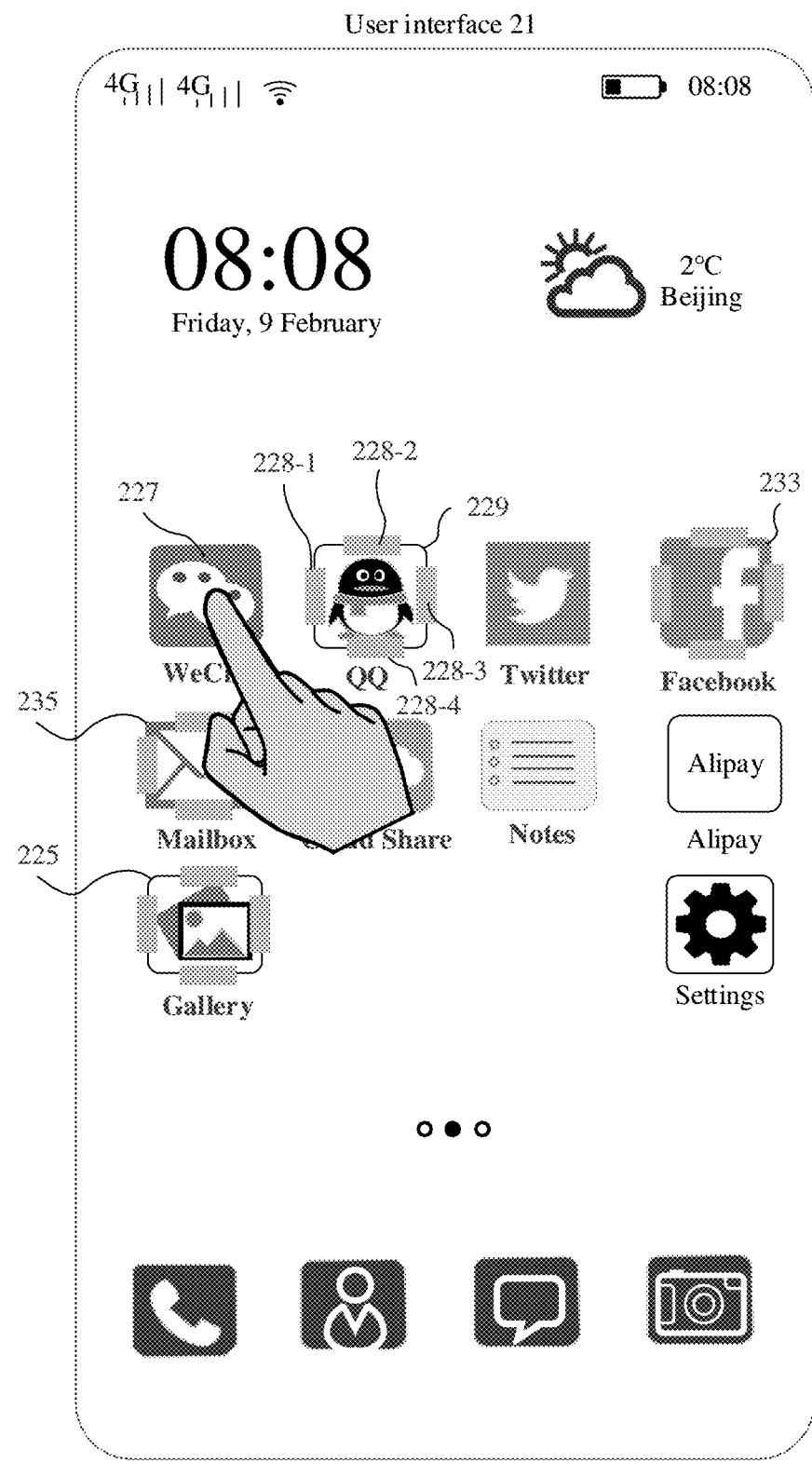
FIG. 4C and FIG. 4D are schematic diagrams of some user interfaces for split screen according to an embodiment of this application.

FIG. 4C shows an example of a user interface displaying a prompt for an icon of a second application.

For example, as shown in FIG. 4C, an electronic device receives a touch operation input by a user on an icon 227 (for example, a touch-and-hold operation or a force touch operation). In response to the operation, the electronic device displays prompts around icons of the second applications that support split screen, where the icons of the second applications are an icon 229, an icon 233, an icon 235, and an icon 225. In this manner, the user can intuitively view which applications can support split screen, so that the user can conveniently select an application that needs to be displayed in a split screen manner.

Optionally, the electronic device may alternatively display a prompt around an icon of a first application in response to a touch operation on the first application. Optionally, a direction of the prompt displayed by the electronic device for the icon of the first application relative to the icon of the first application may be consistent with a split-screen direction supported by the electronic device.

Figure 4D:
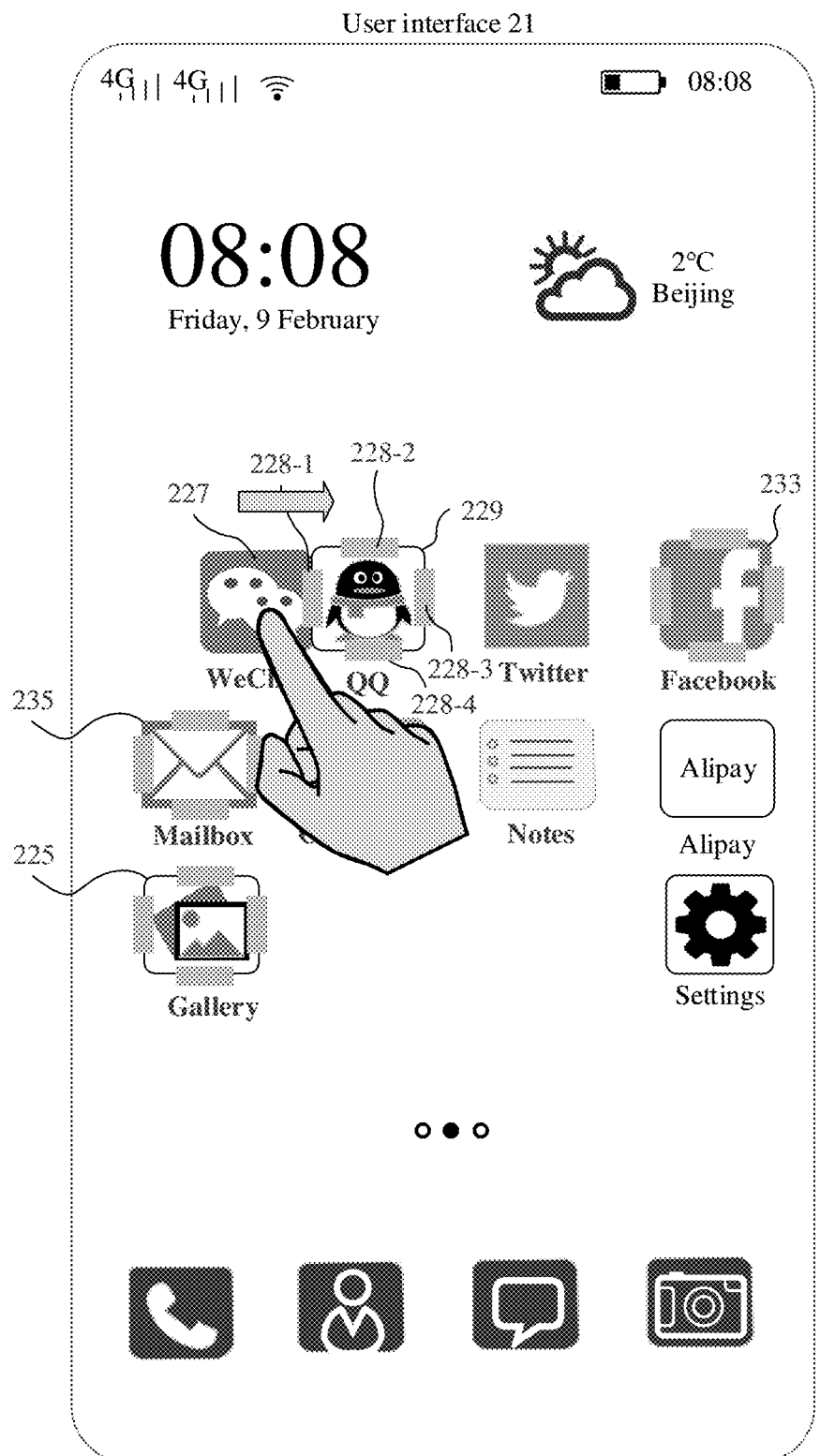

For example, as shown in FIG. 4C and FIG. 4D, the electronic device receives the operation input by the user on the icon 227, where the operation is enabling the icon 227 to be in contact with a prompt 228-1 corresponding to the icon 229. Optionally, the electronic device may further display a magnetic attraction effect of the icon 229 on the icon 227, where the magnetic attraction effect is represented as follows: The icon 229 and the icon 227 are joined, so that one edge of the icon 229 is in contact with one edge of the icon 227. Optionally, the icon 229 and the icon 227 are joined, so that the prompt 228-1 corresponding to the icon 229 overlaps with a prompt 230-3 corresponding to the icon 227. Optionally, after the prompt 228-1 overlaps with the prompt 230-3, the electronic device may display only an overlapped prompt 230-3/228-1 and no longer display other prompts.

It should be noted that after the icon 227 is in contact with the prompt 228-1, the electronic device may switch from displaying a home screen (refer to a user interface 21 shown in FIG. 4D) to displaying a first split-screen interface (refer to the user interface 22 shown in FIG. 3C). The first split-screen interface includes an interface of the first application "WeChat" and an interface of the third application "QQ" at the same time. Optionally, after the icon 227 is in contact with the prompt 228-1 and duration for contact is not less than a preset value, the electronic device is switched from displaying the home screen (refer to the user interface 21 shown in FIG. 4D) to displaying the first split-screen interface (refer to the user interface 22 shown in FIG. 3C). In this manner, split-screen intention of the user can be better determined, and split-screen accuracy can be improved.

In a possible implementation, the second application is an application that supports split screen, and a type to which the second application belongs is the same as a type to which the first application belongs. A type to which an application belongs may be a game type, a social communication type, a video and audio playing type, a news reading type, or the like. Optionally, the electronic device may pre-store type labels of a plurality of applications, where the type label is used to indicate a type of an application. In this case, the electronic device may determine the second application from the plurality of applications based on the type labels of the plurality of applications and a type label of the first application included in the home screen.

In still another possible implementation, the second application is an application that supports split screen, and the second application has an association with the first application. If the electronic device records that a quantity of times for mutual switching between the second application and the first application exceeds a preset value within a first preset time period (for example, one day, three days, or one week), the electronic device establishes the association between the second application and the first application. Optionally, there may be one or more first applications that have an association with the second application may. This is not limited herein. For example, the user frequently performs switching between "WeChat" and "QQ" and between "WeChat" and "Twitter". In this case, the electronic device establishes an association between "WeChat" and "QQ" and an association between "WeChat" and "Twitter". In this manner, the electronic device can select, from the plurality of applications, the one or more first applications that have the association with the first application, and display a prompt. This conforms to a user's habit of using the application, and further improves split-screen efficiency.

Specifically, a process of switching from the second application to the first application may be as follows: (1) Directly switch from the interface of the second application to the interface of the second application. (2) Within a second preset time period (for example, 15 seconds, 30 seconds, or one minute), switch from the interface of the second application to the home screen, and then switch from the home screen to the interface of the first application. (3) Within the second preset time period, switch from the interface of the second application to an interface of a "recent application", and then switch from the interface of the "recent application" to the interface of the first application. In addition, there may be another switching manner. Details are not described herein. Likewise, for a process of switching from the first application to the second application, refer to the manners described above.

It should be noted that, in the foregoing embodiments, if a first application corresponding to an icon that is close to the icon of the first application does not support split screen, the electronic device may display prompt information (for example, a  (a name of the first application) application does not support split screen), or display a prompt for the icon of the first application, where the prompt is used to indicate that the application does not support split screen. For example, the prompt may be an "X"-type prompt covering the icon of the first application, or the prompt may be a pattern of another style. This is not limited herein. Likewise, if the first application does not support split screen, the electronic device may display prompt information (for example, a  (a name of the first application) application does not support split screen), or display a prompt for the icon of the first application.

Figure 5A:
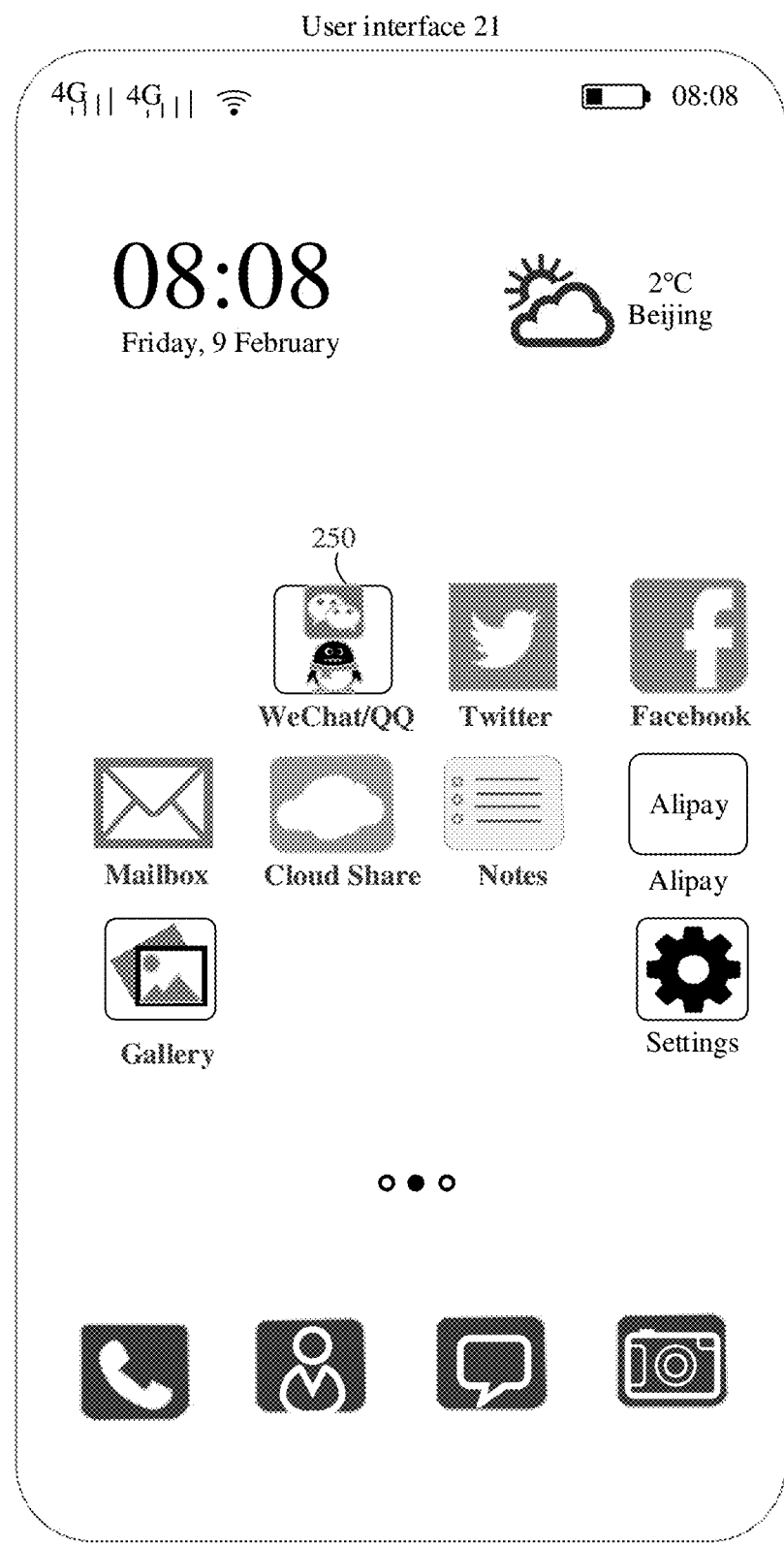
FIG. 5A is a schematic diagram of a user interface displaying a fused icon according to an embodiment of this application.

FIG. 5A shows an example of a user interface 21 displaying a fused icon on an electronic device.

After the electronic device detects that duration for an operation (refer to FIG. 3B) is not less than a preset value, the electronic device may further generate a fused icon, and display the fused icon on a home screen after the electronic device returns to the home screen. The fused icon is an icon obtained after a "WeChat" icon and a "QQ" icon are fused, and the fused icon includes the "WeChat" icon and the "QQ" icon. Fusing the "WeChat" icon and the "QQ" icon may mean that sizes of the "WeChat" icon and the "QQ" icon are decreased according to a specific proportion, so that both the two icons can be included in a frame of the fused icon. In addition, there may be another fusion manner. Details are not described herein.

For example, as shown in FIG. 5A, the fused icon 250 corresponding to "WeChat" and "QQ" is displayed on the electronic device, where the fused icon 250 includes the "WeChat" icon and the "QQ" icon. Optionally, a location relationship between the "WeChat" icon and the "QQ" icon in the fused icon 250 may be the same as a location relationship between a display interface of "WeChat" and a display interface of "QQ" in a split-screen interface (refer to FIG. 3C). The fused icon 250 is further configured to receive an operation of a user. In response to the operation of the user, the electronic device displays the split-screen interface (refer to FIG. 3C) including the display interface of "WeChat" and the display interface of "QQ".

In a possible implementation, after the fused icon 250 is displayed, the electronic device no longer displays the "WeChat" icon and the "QQ" icon in the user interface 21 (for such a display manner, refer to FIG. 5A). A display location of the fused icon 250 may be a location at which the "WeChat" icon is originally located, or may be a location at which the "QQ" icon is originally located.

Figure 5B:
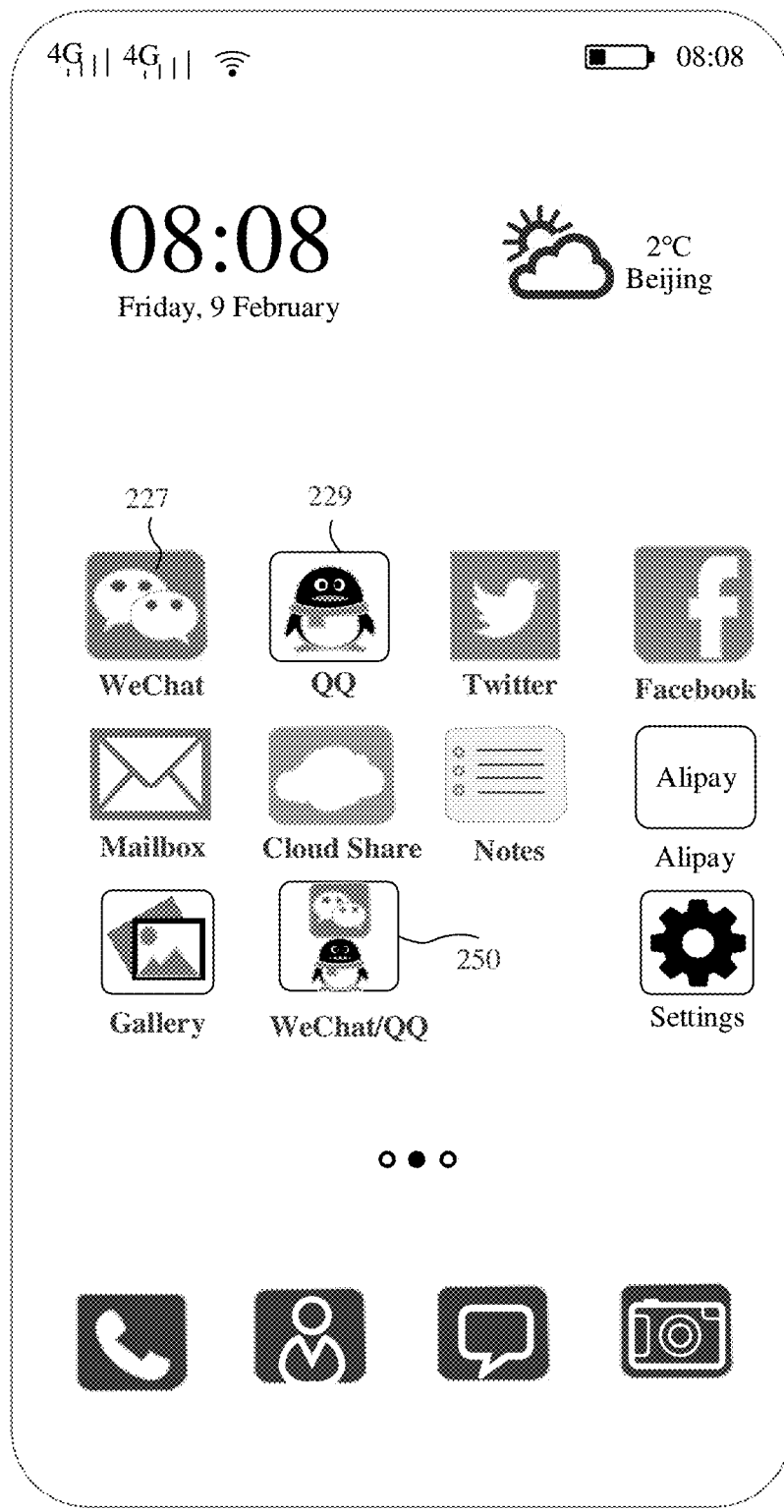
FIG. 5B is a schematic diagram of another user interface displaying a fused icon according to an embodiment of this application.

In still another possible implementation, the electronic device displays a "WeChat" icon 227, a "QQ" icon 229, and a fused icon 250 in a user interface 21 at the same time (for such a display manner, refer to FIG. 5B). Optionally, a display location of the fused icon 250 may be any one of display locations not occupied by icons in the user interface 21. Alternatively, when all the display locations are occupied by the icons in the user interface 21, the fused icon 250 is displayed in another user interface of the home screen. Alternatively, the fused icon 250 is displayed in a user interface dedicated to displaying a fused icon in the home screen. In this manner, the user can tap the "WeChat" icon 227 to enter a display interface of "WeChat", tap the "QQ" icon 229 to enter a display interface of "QQ", and tap the fused icon 250 to enter a split-screen interface (refer to FIG. 3C) including the display interface of "WeChat" and the display interface of "QQ".

In still another possible implementation, the user interface 21 shown in FIG. 5A or the user interface 21 shown in FIG. 5B may be displayed before the split-screen interface is displayed in the foregoing embodiment. For example, a process for displaying the split-screen interface on the electronic device is shown in FIG. 3A, FIG. 3B, FIG. 5A, or FIG. 3C. Optionally, after being displayed in a preset time period (for example, 0.5 second or 1 second), the user interface displaying the fused icon may be automatically switched to a user interface for displaying the split-screen interface. Optionally, in another manner, after the fused icon is displayed, if the electronic device receives an operation input by the user on the fused icon, the electronic device is switched to displaying the user interface for displaying the split-screen interface.

Figure 6A:
FIG. 6A and FIG. 6B are schematic diagrams of some other user interfaces for split screen according to an embodiment of this application.
Figure 6B:
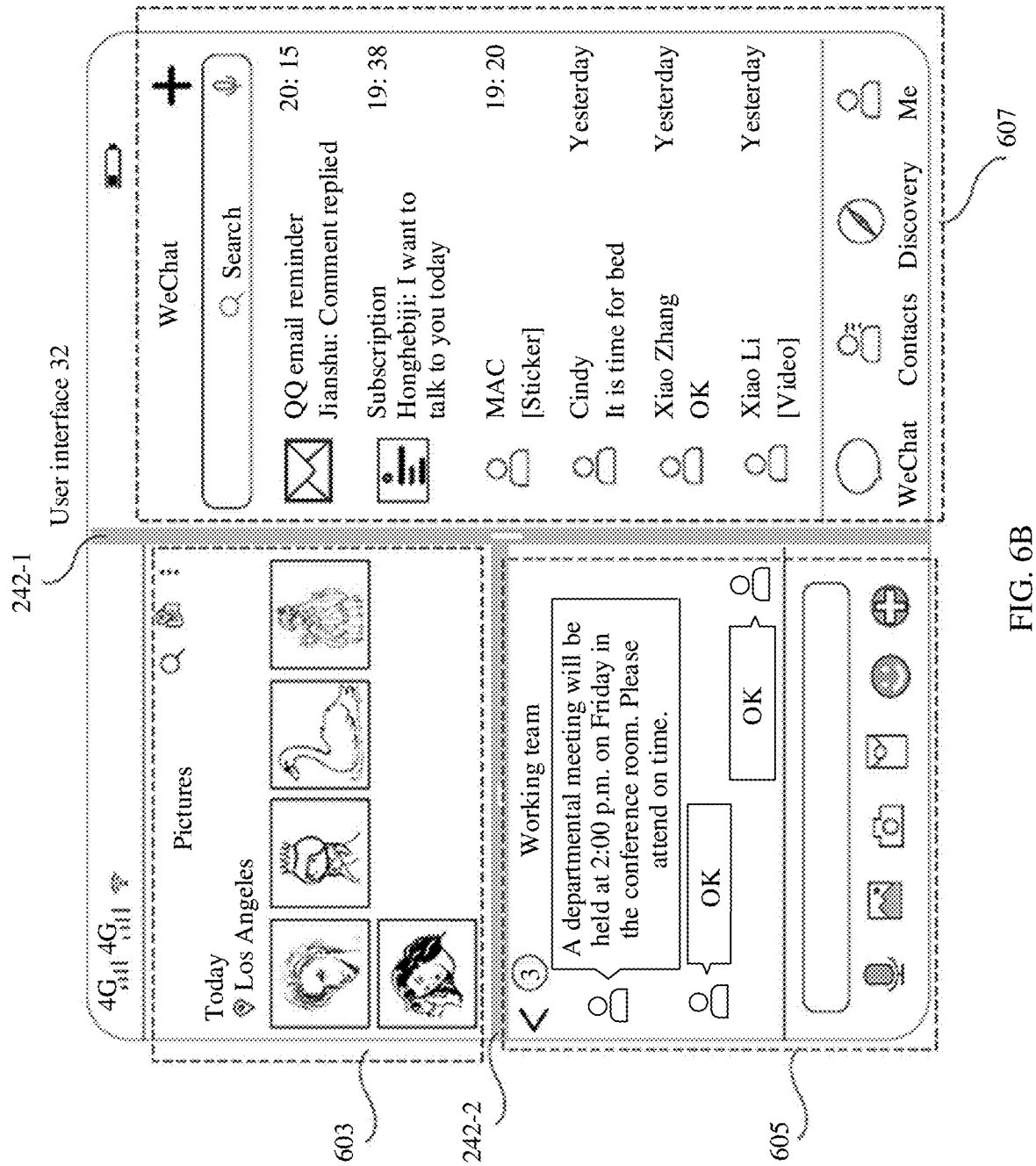

FIG. 6A and FIG. 6B are schematic diagrams of examples of some other user interfaces for split screen.

In an embodiment illustrated in FIG. 6A and FIG. 6B, an electronic device may support split-screen displaying of interfaces of two or more than two applications. When the electronic device detects that an icon 225 is moved to a location near a fused icon 602, the electronic device displays six prompts around the fused icon 602, where the six prompts are a prompt 601-1, a prompt 601-2, a prompt 601-3, a prompt 601-4, a prompt 601-5, and a prompt 601-6.

Figure 6C:
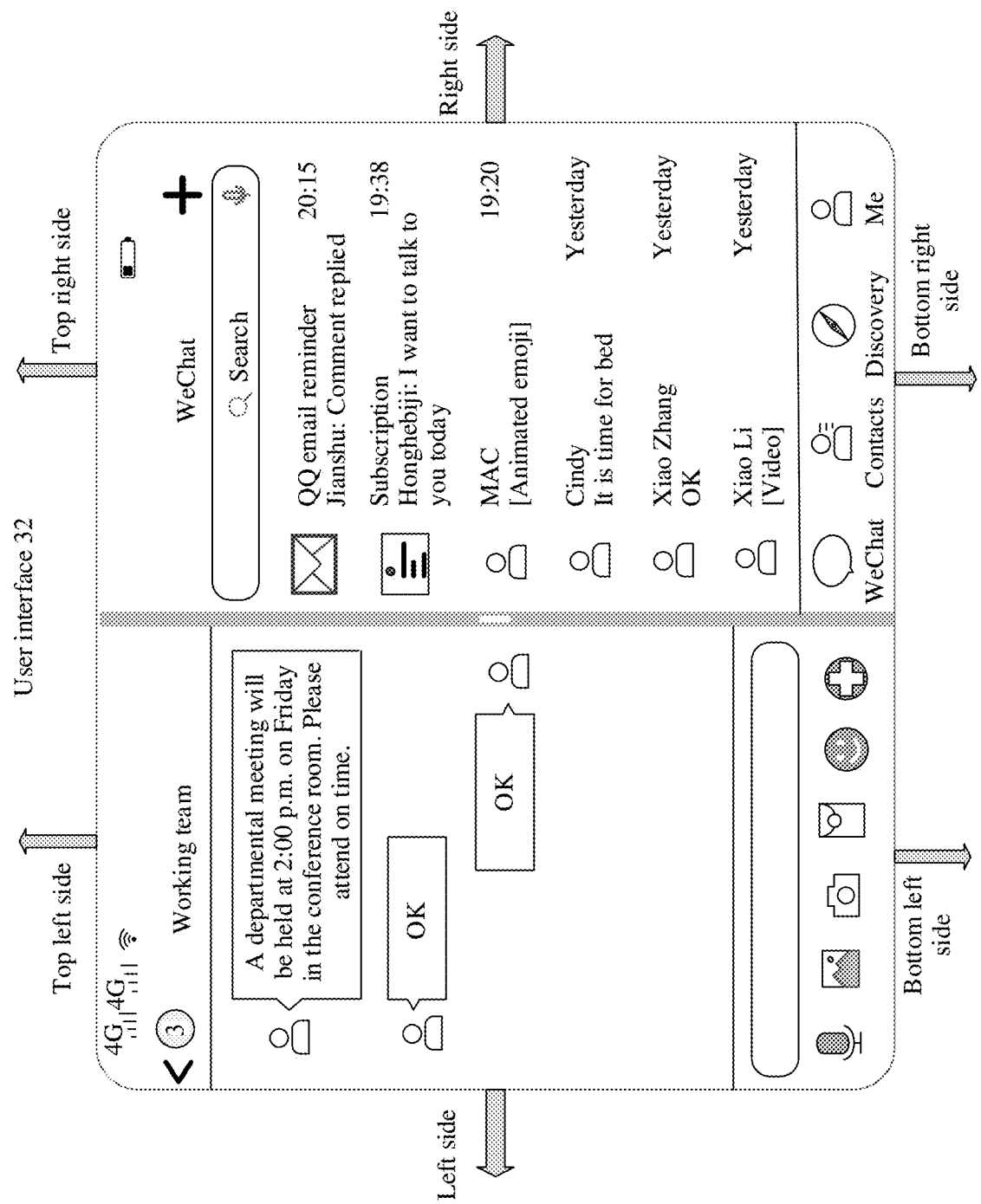
FIG. 6C is a schematic diagram of a split-screen interface according to an embodiment of this application.

Optionally, a direction of a prompt relative to the fused icon 602 is consistent with a direction (refer to FIG. 6C or FIG. 6H) in which an interface of an application may be further added to a split-screen interface corresponding to the fused icon 602. Specifically, the prompts displayed in FIG. 6A indicate that an interface of a new application may be further added to the split-screen interface corresponding to the fused icon 602 on the left side (corresponding to the prompt 601-1), on the top left side (corresponding to the prompt 601-2), on the top right side (corresponding to the prompt 601-3), on the right side (corresponding to the prompt 601-4), on the bottom right side (corresponding to the prompt 601-5), or on the bottom left side (corresponding to the prompt 601-6) relative to this original split-screen interface. In still another possible implementation, if the electronic device can support split-screen displaying of interfaces of applications in at most four directions (the top left side, the top right side, the bottom right side, and the bottom left side), the electronic device displays four prompts around the fused icon 602, where the four prompts are the prompt 601-2, the prompt 601-3, the prompt 601-5, and the prompt 601-6. In this manner, the user can conveniently learn directions in which interfaces of new applications can be added to a formed split-screen interface.

For example, as shown in FIG. 6A and FIG. 6B, the electronic device detects an operation in which the icon 225 is enabled to be in contact with the prompt 601-2 and duration for contact is not less than a preset value. In response to the operation, the electronic device displays a user interface 32 including interfaces of applications indicated by the fused icon 602 and an interface of a first application corresponding to the icon 225. Optionally, a direction of the interface of the first application relative to the user interface 31 is consistent with a direction of the prompt 601-2 relative to the fused icon 602.

The user interface 32 includes a first display area 603, a second display area 605, a third display area 607, a split-screen flag 242-1, and a split-screen flag 242-2.

The first display area 603 may be used to display the interface of the application (namely, "Gallery") corresponding to the icon 225. For specific content included in the interface of the application, refer to the foregoing descriptions. Details are not described herein again.

The second display area 605 may be used to display an interface of an application (namely, "QQ") corresponding to an application icon located on the left side of the fused icon 602. For specific content included in the interface of the application, refer to the foregoing descriptions. Details are not described herein again.

The third display area 607 may be used to display an interface of an application (namely, "WeChat") corresponding to an application icon located on the right side of the fused icon 602. For specific content included in the interface of the application, refer to the foregoing descriptions. Details are not described herein again.

The split-screen flag 242-1 and the separator 242-2 may be used to separate the three display areas. The two split-screen flags may be further used to receive a slide operation of the user. The electronic device adjusts a size of a display area in response to the slide operation. Optionally, the electronic device may not display the split-screen flag 242-1 and the separator 242-2.

Figure 6D:
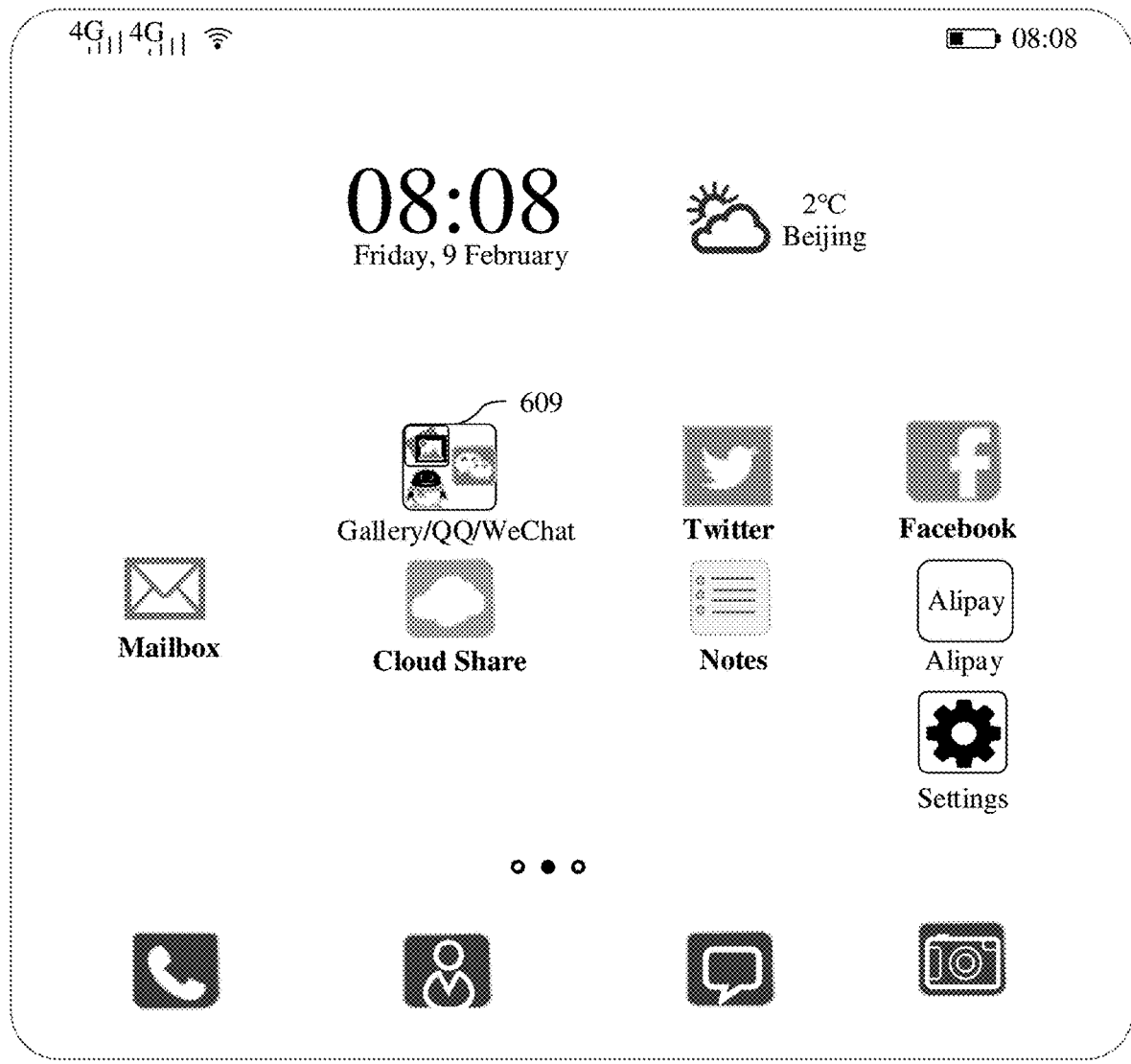
FIG. 6D is a schematic diagram of still another user interface displaying a fused icon according to an embodiment of this application.

In still another possible implementation, the electronic device generates a new fused icon 609 in response to the operation. A direction of an icon of an application relative to the fused icon is the same as a direction of an interface of the application relative to a first split-screen interface. For example, the "QQ" icon is located on the bottom left side of the fused icon 609, and the interface of "QQ" is also on the bottom left side of the first split-screen interface. The two directions are the same. FIG. 6D shows an example of a user interface 31 displaying the fused icon 609 on the electronic device. Optionally, the user interface 31 may further include a "WeChat" icon 227, a "QQ" icon 229, and a fused icon 602.

It may be understood that, when prompts in contact with an icon 225 are different, split-screen interfaces displayed on the electronic device are different. The following describes still another case of displaying a split-screen interface.

Figure 6E:
FIG. 6E and FIG. 6F are schematic diagrams of some still other user interfaces for split screen according to an embodiment of this application.
Figure 6F:
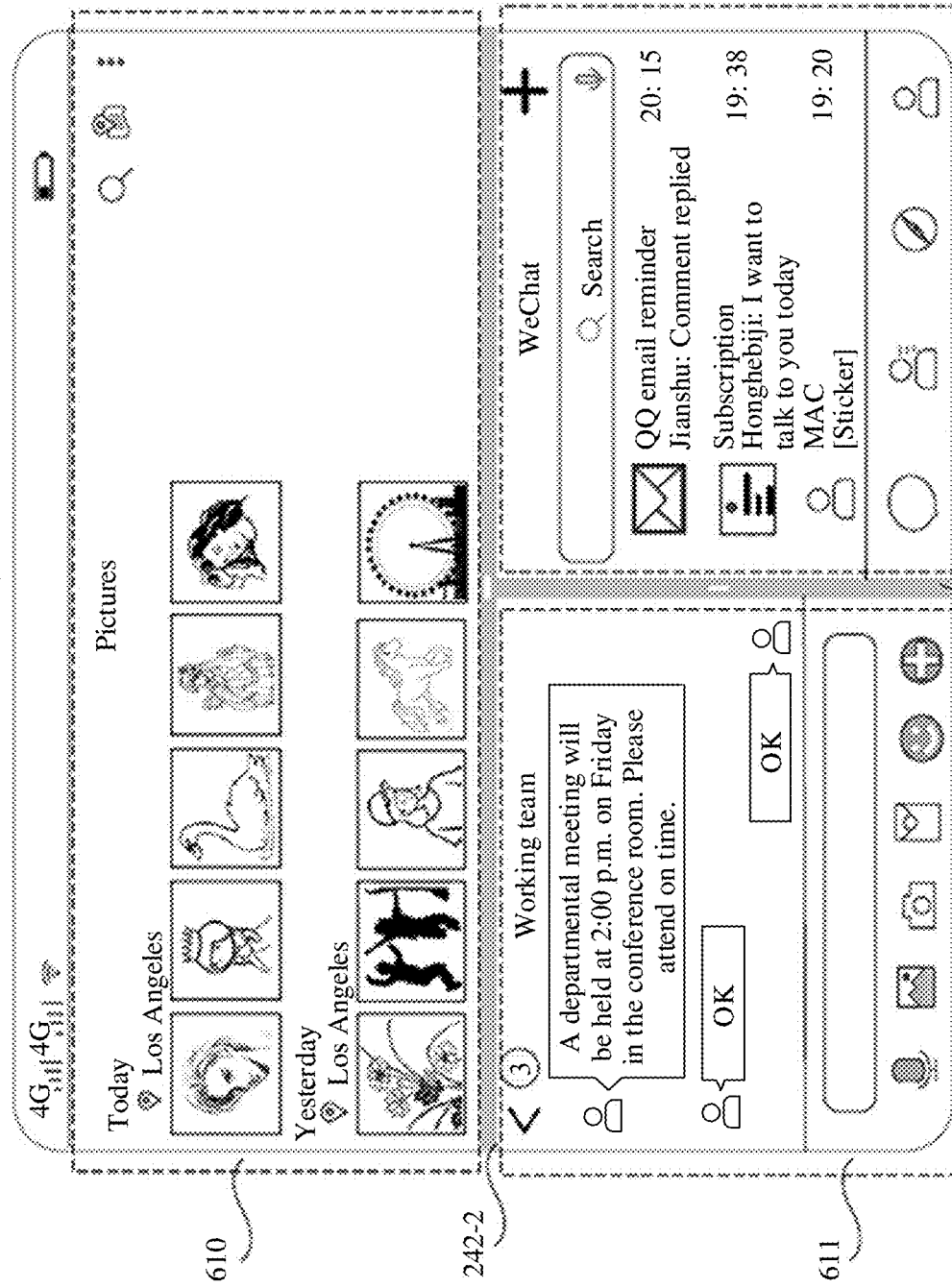

For example, as shown in FIG. 6E and FIG. 6F, when an electronic device detects that an icon 225 is in contact with a prompt 601-2 and a prompt 601-3 and duration for contact is kept not less than a preset value, the electronic device displays a user interface 33 including interfaces of applications indicated by a fused icon 602 and an interface of a first application corresponding to an icon 225. Optionally, a direction of the interface of the first application relative to the user interface 31 is consistent with a direction of the prompt 601-2 relative to the fused icon 602. Specifically, if both the prompt 601-2 and the prompt 601-3 are located on the top side of the fused icon 602, the interface of the first application is located on the top side of a split-screen interface.

The user interface 33 includes a first display area 610, a second display area 611, a third display area 612, a split-screen flag 242-1, and a split-screen flag 242-2.

The first display area 610 may be used to display an interface of an application (namely, "Gallery") corresponding to the icon 225. For specific content included in the interface of the application, refer to the foregoing descriptions. Details are not described herein again.

The second display area 611 may be used to display an interface of an application (namely, "QQ") corresponding to an application icon located on the left side of the fused icon 602. For specific content included in the interface of the application, refer to the foregoing descriptions. Details are not described herein again.

The third display area 612 may be used to display an interface of an application (namely, "WeChat") corresponding to an application icon located on the right side of the fused icon 602. For specific content included in the interface of the application, refer to the foregoing descriptions. Details are not described herein again.

The split-screen flag 242-1 and the separator 242-2 may be used to separate the three display areas. The two split-screen flags may be further used to receive a slide operation of the user. The electronic device adjusts a size of a display area in response to the slide operation. Optionally, the electronic device may not display the split-screen flag 242-1 and the separator 242-2.

Figure 6G:
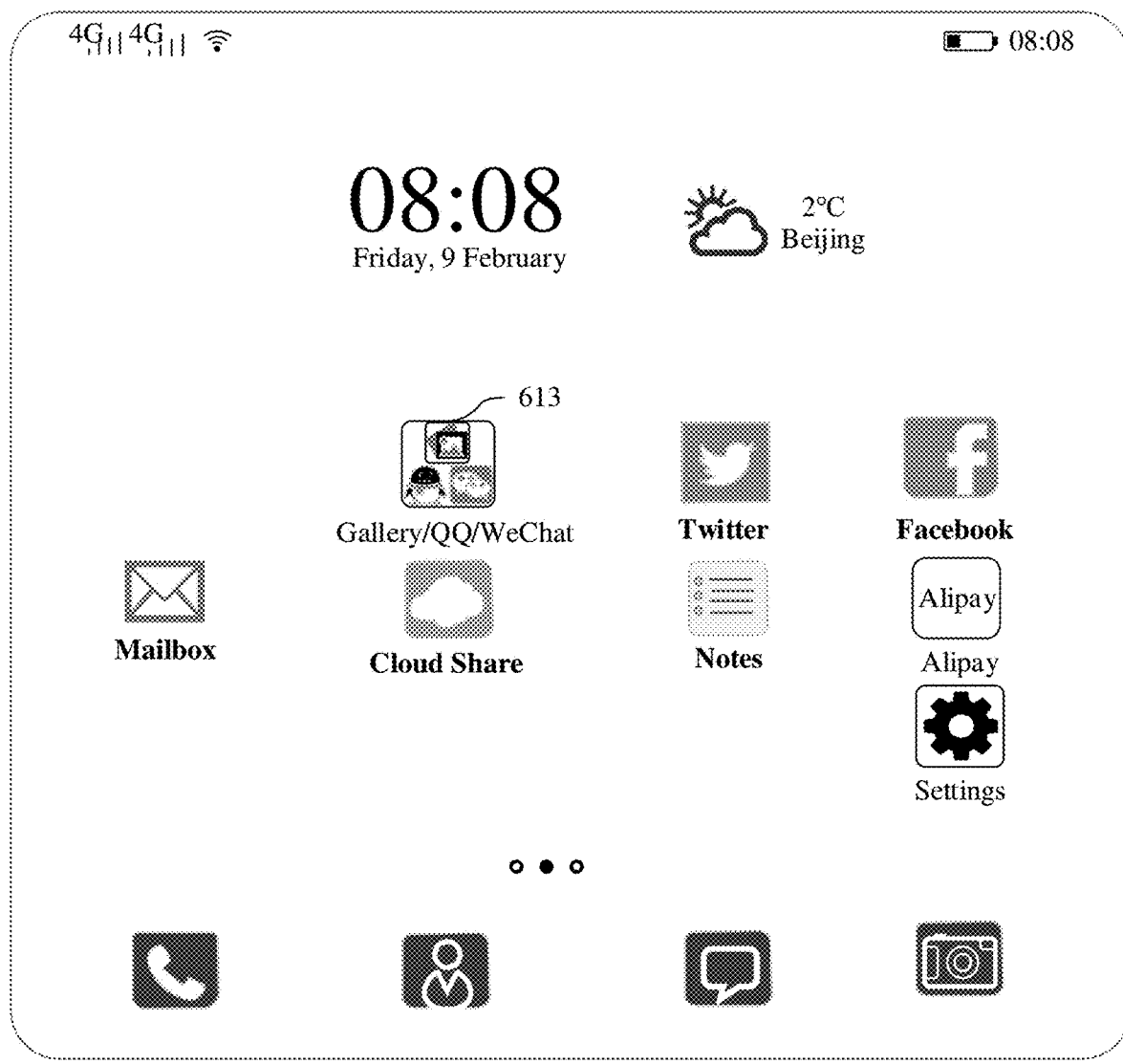
FIG. 6G is a schematic diagram of still another user interface displaying a fused icon according to an embodiment of this application.
Figure 6H:
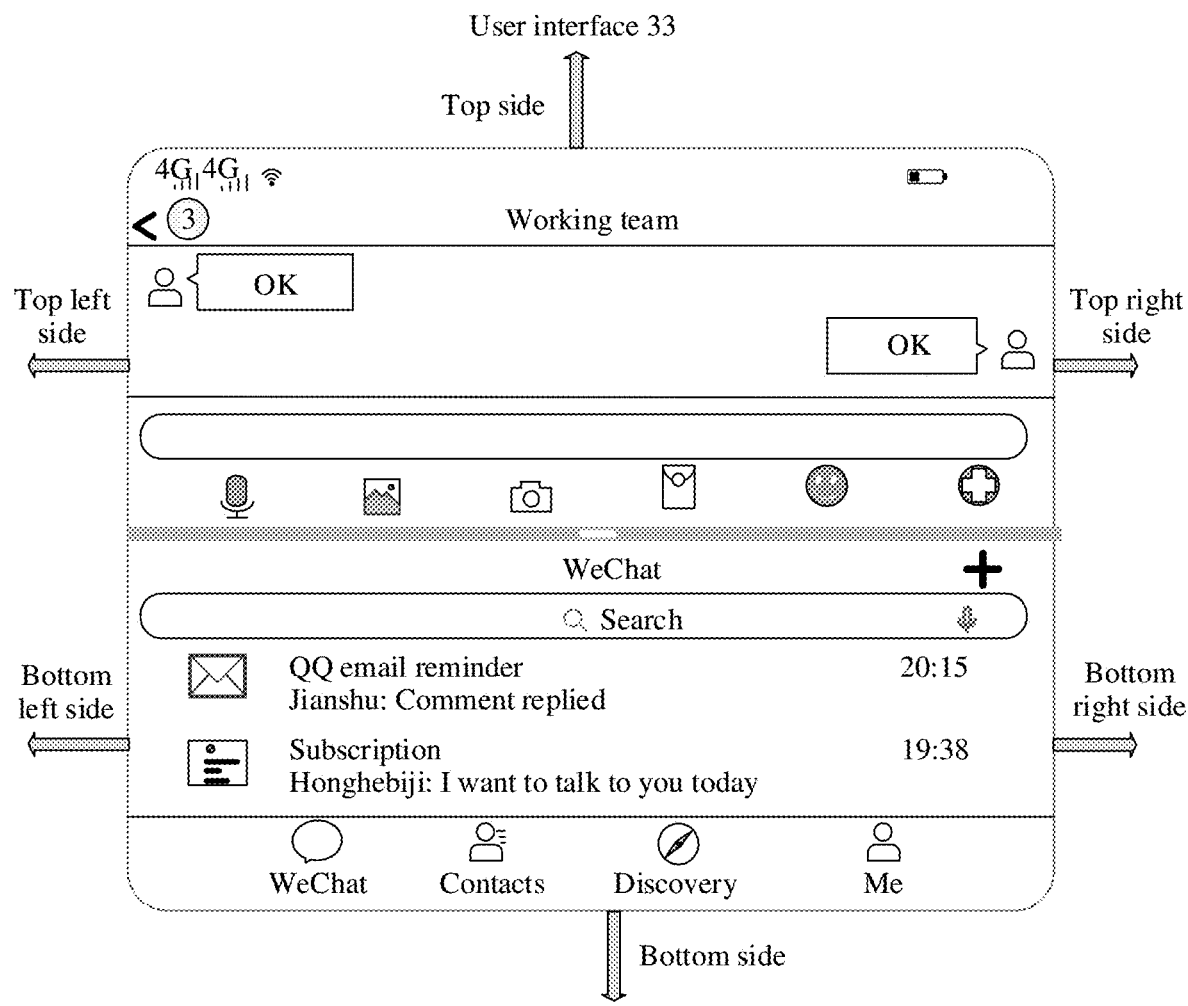
FIG. 6H is a schematic diagram of another split-screen interface according to an embodiment of this application.

In still another possible implementation, the electronic device generates a new fused icon 613 in response to the operation. A direction of the interface of the first application relative to the user interface 31 is consistent with directions of the prompt 601-2 and the prompt 601-3 relative to the fused icon 602. FIG. 6G shows an example of a user interface 31 displaying a fused icon 613. Optionally, the user interface 31 may further include a "WeChat" icon 227, a "QQ" icon 229, and a fused icon 602.

It should be understood that, in this embodiment of this application, the user may alternatively move the fused icon to the location near the icon of the first application to generate the split-screen interface. This is not limited in this embodiment of this application. Optionally, before the user moves the fused icon to the location near the icon of the first application, if the electronic device receives the operation input by the user on the fused icon, the electronic device displays the prompts around the fused icon in response to the operation of the user, where a direction of a prompt relative to the fused icon is consistent with a direction in which an interface of an application may be further added to the split-screen interface corresponding to the fused icon.

The foregoing describes some embodiments of manners for displaying a split-screen interface, and the following further describes embodiments of manners for disabling split screen. Generally, disabling split screen may include two cases. In a first case, only a fused icon is displayed on a home screen of an electronic device, and application icons included in the fused icon are not separately displayed (for details in this case, refer to FIG. 5A). In a second case, a fused icon is displayed on a home screen of an electronic device, and application icons included in the fused icon are separately displayed (for details in this case, refer to FIG. 5B). The following describes manners for disabling split-screen in the two cases.

Figure 7A:
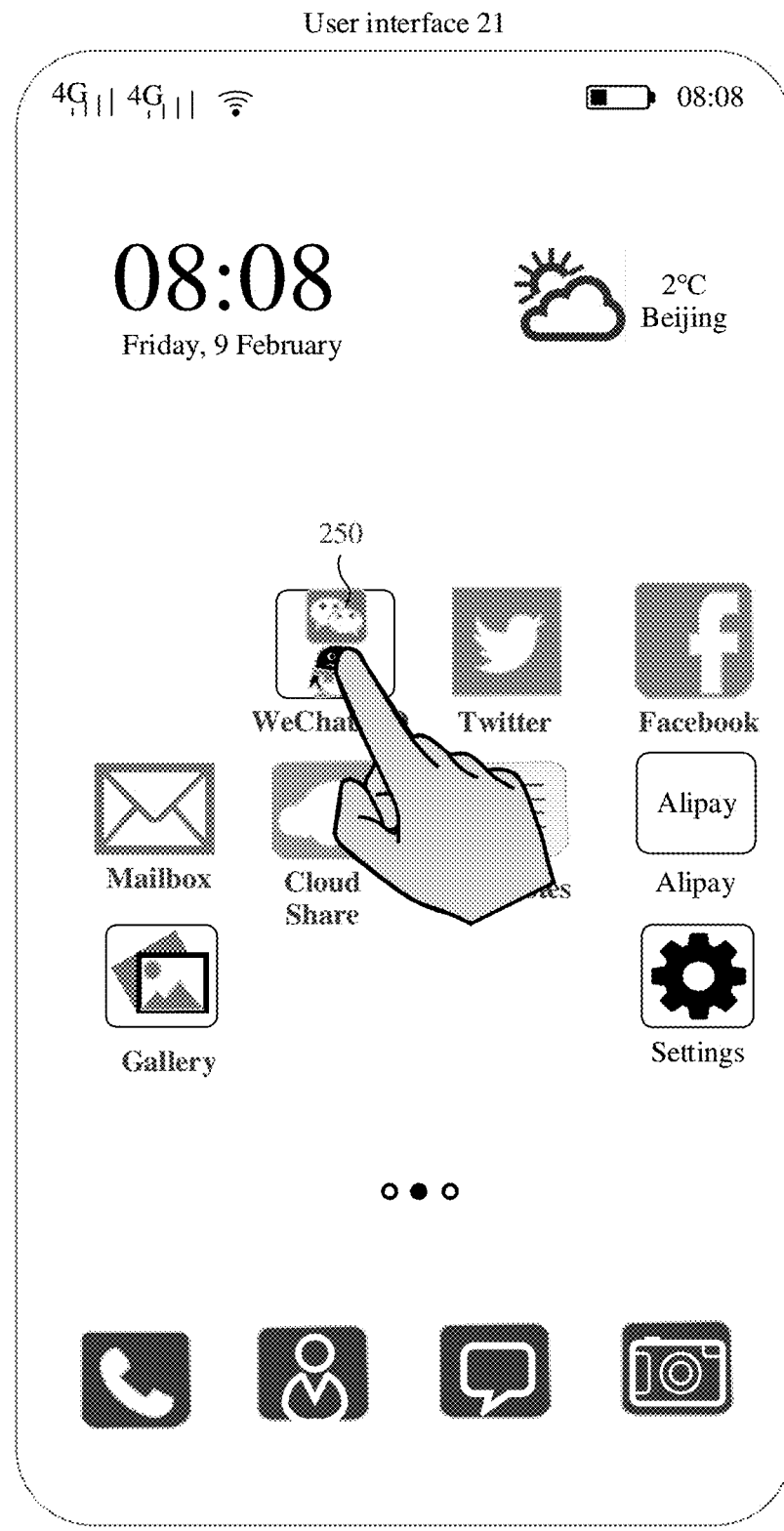
FIG. 7A to FIG. 7C are schematic diagrams of some user interfaces for disabling split screen according to an embodiment of this application.
Figure 7B:
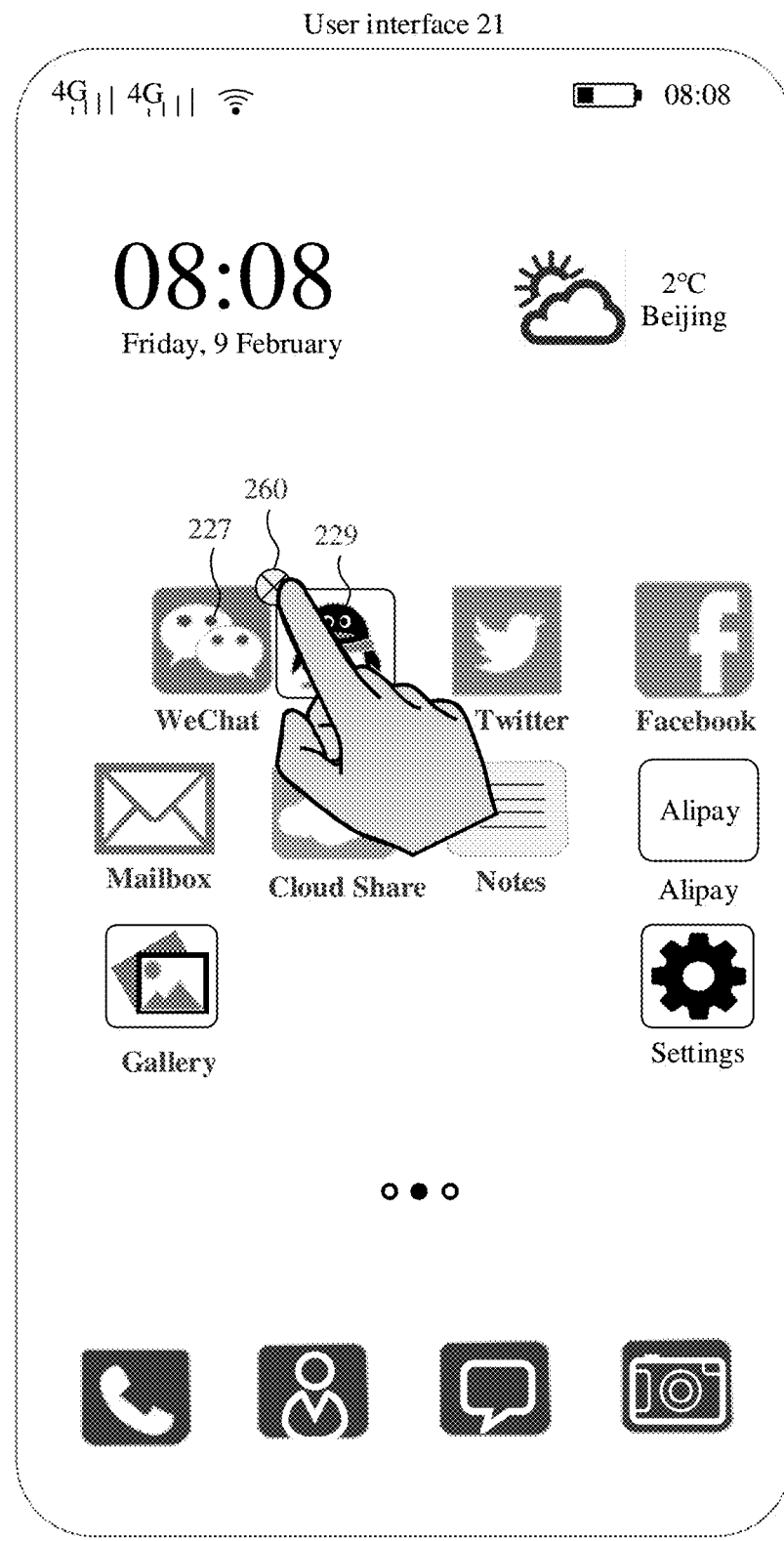
Figure 7C:
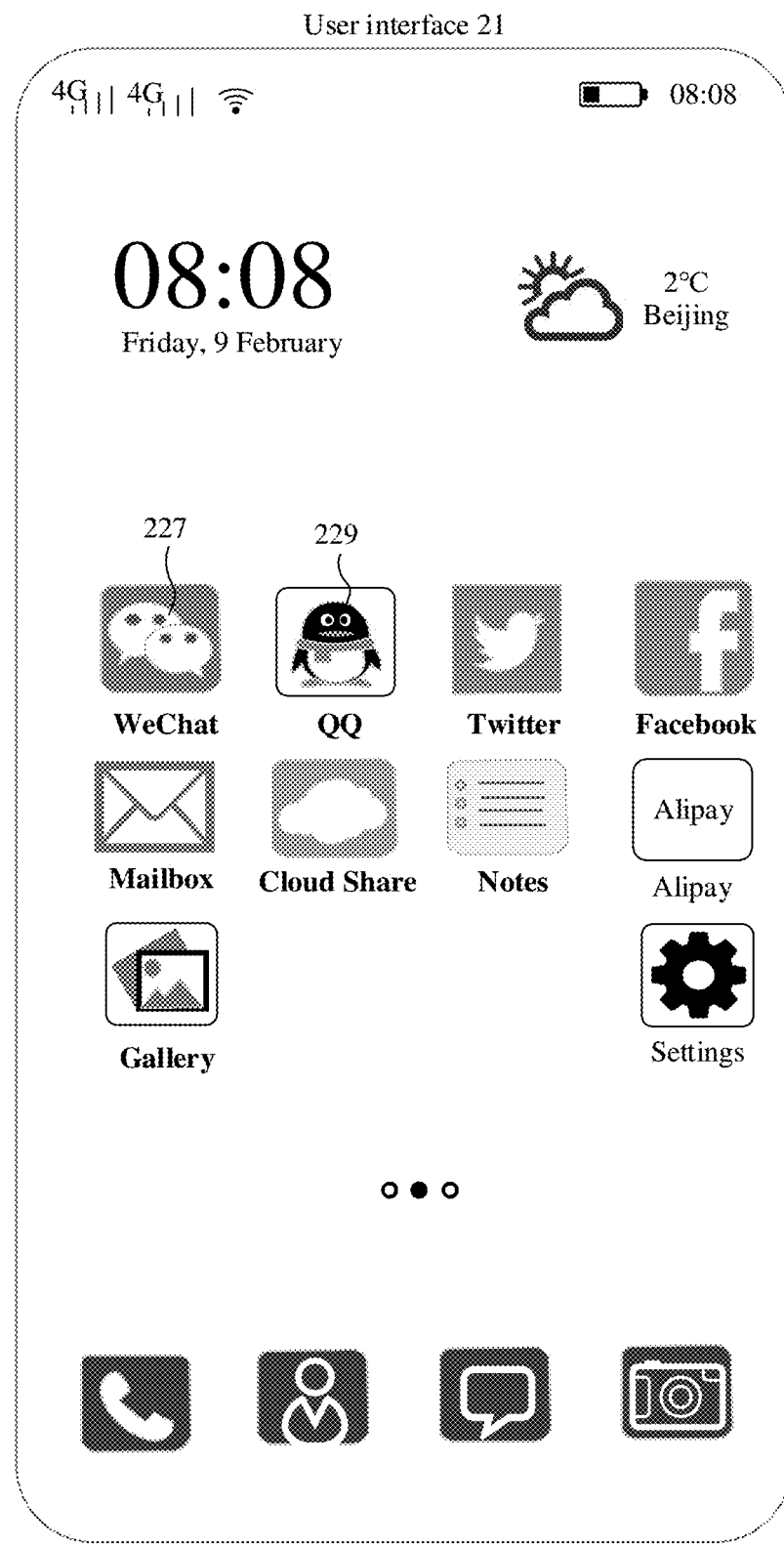

First, a manner for disabling split-screen in the first case is described. FIG. 7A to FIG. 7C are schematic diagrams of examples of some user interfaces for disabling split screen.

For example, as shown in FIG. 7A and FIG. 7B, an electronic device receives a touch-and-hold operation of a user on a fused icon 250. In response to the operation of the user, the electronic device displays a "QQ" icon 229 and a "WeChat" icon 227 that are included in the fused icon, and a prompt 260. The prompt 260 may be located between the icon 229 and the icon 227. Specifically, the prompt may be located at the top right side of the icon 227 (also on the top left side of the icon 229), or may be located at a middle part of a right edge of the icon 227 (also at a middle part of a left edge of the icon 229). This is not limited in this embodiment of this application. The prompt 260 may be used to receive an operation of the user. In response to the operation of the user, the electronic device no longer displays the fused icon 250 and a split-screen interface corresponding to the fused icon 250, but separately displays the icon 229 and the icon 227. Optionally, to distinguish the prompt from a deleted application icon, the prompt may be displayed in a color different from a color for displaying the deleted icon, or the prompt may be a pattern different from the pattern in the example. This is not limited in this embodiment of this application.

For example, as shown in FIG. 7B and FIG. 7C, the electronic device receives a tap operation of the user on the prompt 260. In response to the operation of the user, the electronic device no longer displays the fused icon 250 in the user interface 21, but separately displays the icon 229 and the icon 227. Optionally, the electronic device may further delete the split-screen interface corresponding to the fused icon 250 recorded in an interface of a "recent application".

In still another possible implementation, a fused icon may include more than two application icons. For details in this case, refer to FIG. 7D to FIG. 7G. FIG. 7D to FIG. 7G show schematic diagrams of examples of disabling split screen.

Figure 7D:
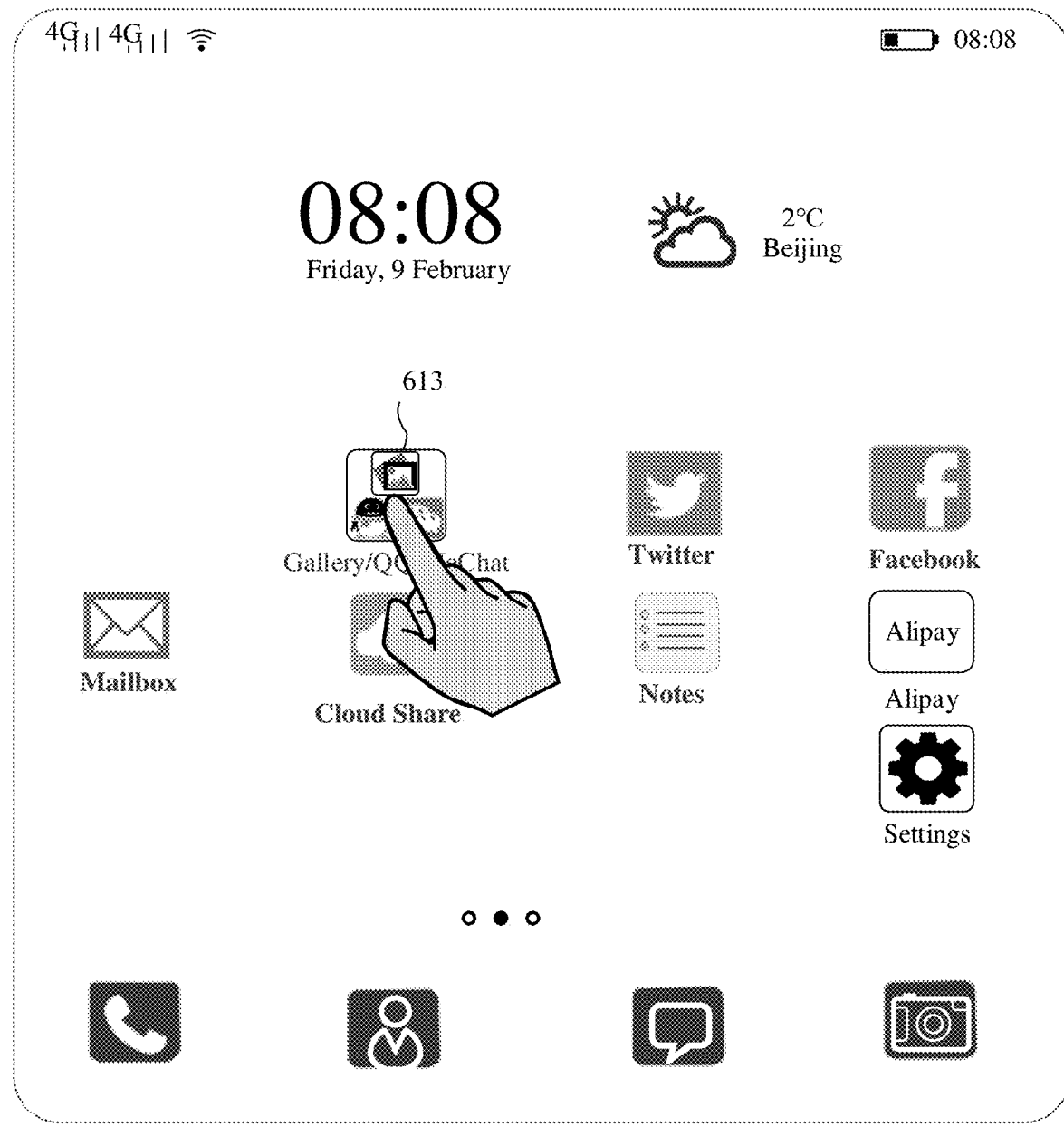
FIG. 7D to FIG. 7G are schematic diagrams of some other user interfaces for disabling split screen according to an embodiment of this application.
Figure 7E:

For example, as shown in FIG. 7D and FIG. 7E, an electronic device receives an operation of a user on a fused icon 613 (an icon including three applications). In response to the operation of the user, the electronic device displays a "Gallery" icon 225, a "QQ" icon 229, and a "WeChat" icon 227, and a prompt corresponding to each of the application icons. Specifically, the icon 225 corresponds to a prompt 260-1, the icon 229 corresponds to a prompt 260-2, and the icon 227 corresponds to a prompt 260-3. A prompt may be located on the top left side or top right side of an application icon corresponding to the prompt, or may be displayed in the middle part. This is not limited in this embodiment of this application.

Figure 7F:

For example, as shown in FIG. 7E and FIG. 7F, the electronic device receives a tap operation of the user on the prompt 260-1. In response to the operation of the user, the electronic device separately displays the icon 225 corresponding to the prompt 260-1. Optionally, a display location of the icon 225 may be the same as a display location of the original icon 225. It should be noted that, for the display location of the original icon 225, reference may be made to the example of the user interface shown in FIG. 2A.

Figure 7G:

For example, as shown in FIG. 7F and FIG. 7G, the electronic device receives an operation (for example, a tap operation) of the user in a display area that does not include the prompt 260-2 and the prompt 260-3 in the user interface 31. In response to the operation of the user, the electronic device displays a fused icon 701 including the icon 229 corresponding to the prompt 260-2 and the icon 227 corresponding to the prompt 260-3, generates a split-screen interface corresponding to the new fused icon 701, and deletes a split-screen interface corresponding to the original fused icon 613. The newly generated split-screen interface includes an interface of the application corresponding to the icon 229 and an interface of the application corresponding to the icon 227. The fused icon 701 may be configured to receive an operation of the user. In response to the operation of the user, the electronic device displays the split-screen interface corresponding to the fused icon 701. Optionally, a location relationship between the icon 227 and the icon 229 in the newly fused icon 701 is consistent with a location relationship between the icon 227 and the icon 229 in the originally fused icon 613. Further, a location relationship between the interface of the application corresponding to the icon 229 and the interface of the application corresponding to the icon 227 in the newly generated split-screen interface is consistent with the location relationship between the icon 227 and the icon 229 in the newly fused icon 701.

Optionally, in the example of the user interface 31 shown in FIG. 7F, the user may continue to perform an operation on the prompt 260-2 (or the prompt 260-3). In response to the operation of the user, the electronic device separately displays the icon 227 and the icon 229, and deletes the split-screen interface corresponding to the fused icon 613. Optionally, a display location of the icon 227 is the same as the display location of the original icon 227, and a display location of the icon 229 is the same as the display location of the original icon 229. Likewise, for the display location of the original icon 227 and the display location of the original icon 229, refer to the example of the user interface shown in FIG. 2A.

In still another optional implementation, in a case in which the fused icon may include more than two application icons, FIG. 8A to FIG. 8D show schematic diagrams of examples of some still other user interfaces for disabling split screen.

Figure 8A:
FIG. 8A to FIG. 8D are schematic diagrams of some still other user interfaces for disabling split screen according to an embodiment of this application.
Figure 8B:

For example, as shown in FIG. 8A and FIG. 8B, an electronic device receives an operation of a user on a fused icon 613 (an icon including three applications). The electronic device displays a window 703 in a user interface 31 in response to the operation of the user, where the window 703 includes a "Gallery" icon 225, a "QQ" icon 229, a "WeChat" icon 227, and prompt information 705.

Figure 8C:

For example, as shown in FIG. 8B and FIG. 8C, the electronic device receives a slide-up operation (which may be another operation, and is merely an example herein) of the user on the "QQ" icon 229. The electronic device deletes the icon 229 in the window 703 in response to the operation of the user. Optionally, the electronic device separately displays the icon 229. A display location of the icon 229 may be the same as a display location of the original icon 229.

Figure 8D:

For example, as shown in FIG. 8C and FIG. 8D, the electronic device receives an operation (for example, a tap operation) of the user in a display area other than the window 703 in the user interface 31. In response to the operation of the user, the electronic device no longer displays the window 703, and displays the icon 229 and a newly fused icon 705 in the user interface 31, generates a split-screen interface corresponding to the newly fused icon 705, and deletes a split-screen interface corresponding to the originally fused icon 613. The newly generated split-screen interface includes an interface of the application corresponding to the icon 225 and an interface of the application corresponding to the icon 227. The fused icon 705 may be configured to receive an operation of the user. In response to the operation of the user, the electronic device displays the split-screen interface corresponding to the fused icon 705. Optionally, a location relationship between the icon 225 and the icon 227 in the newly fused icon 705 is consistent with a location relationship between the icon 225 and the icon 227 in the originally fused icon 613. Further, a location relationship between the interface of the application corresponding to the icon 225 and the interface of the application corresponding to the icon 227 in the newly generated split-screen interface is consistent with the location relationship between the icon 225 and the icon 227 in the newly fused icon 705.

Optionally, in the example of the user interface 31 shown in FIG. 8C, the user may continue to perform a slide-up operation on the icon 225 (or the icon 227). In response to the operation of the user, the electronic device no longer displays the window 703, and separately displays the icon 227 and the icon 225 in the user interface 31. It should be noted that the electronic device deletes the split-screen interface corresponding to the fused icon 613. Optionally, a display location of the icon 227 is the same as a display location of the original icon 227, and a display location of the icon 225 is the same as a display location of the original icon 225.

Figure 8E:
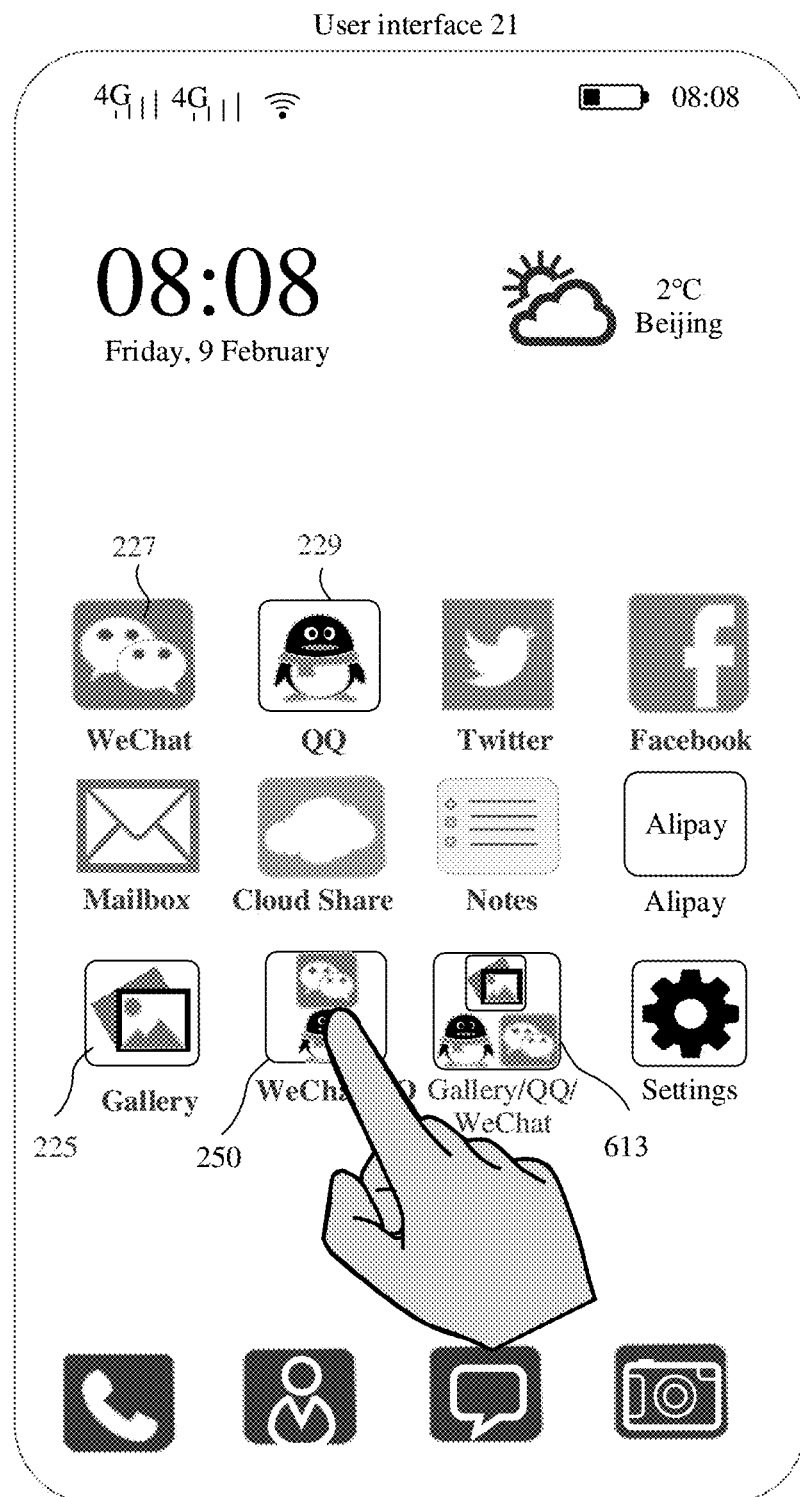
FIG. 8E to FIG. 8G are schematic diagrams of some yet other user interfaces for disabling split screen according to an embodiment of this application.
Figure 8F:
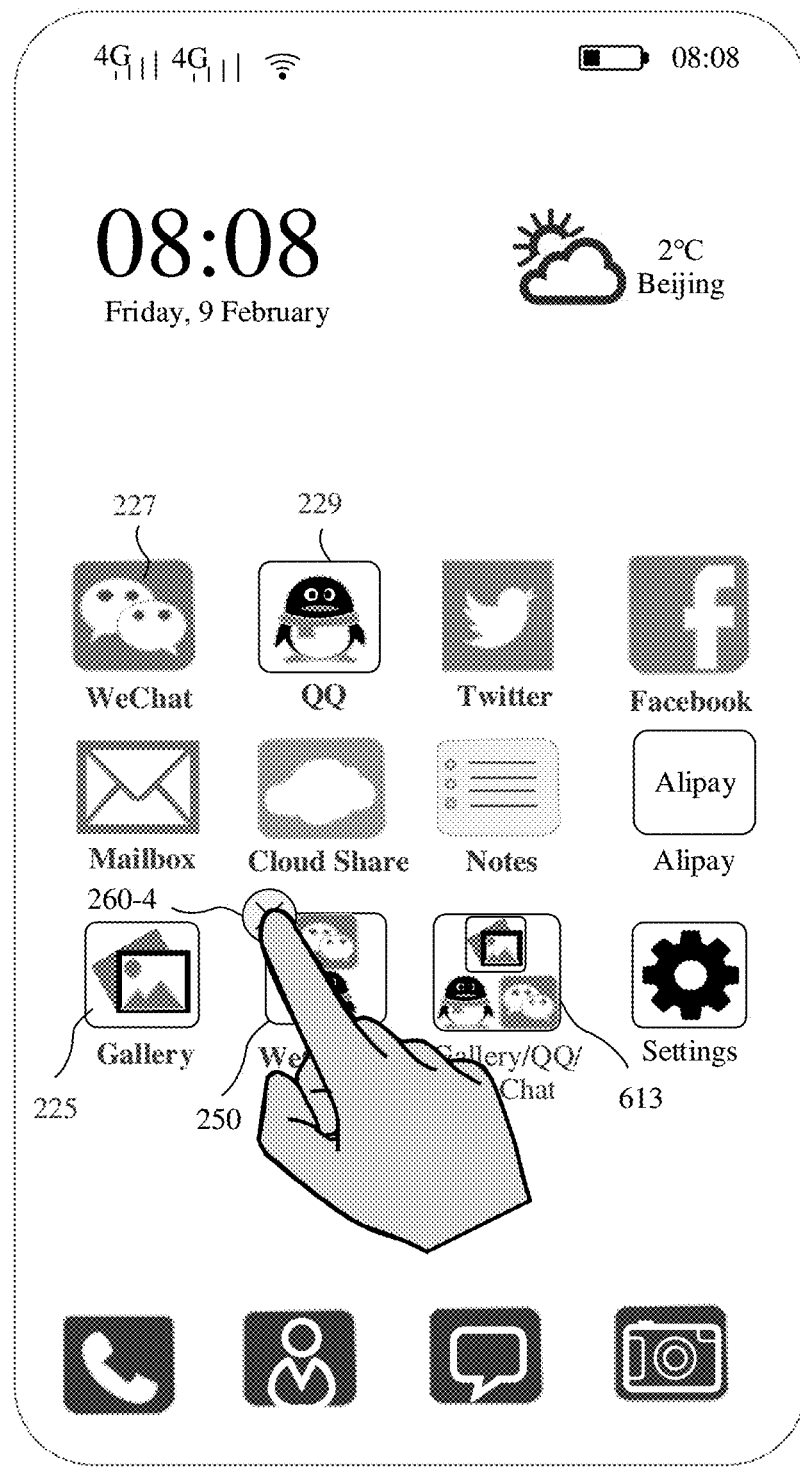
Figure 8G:
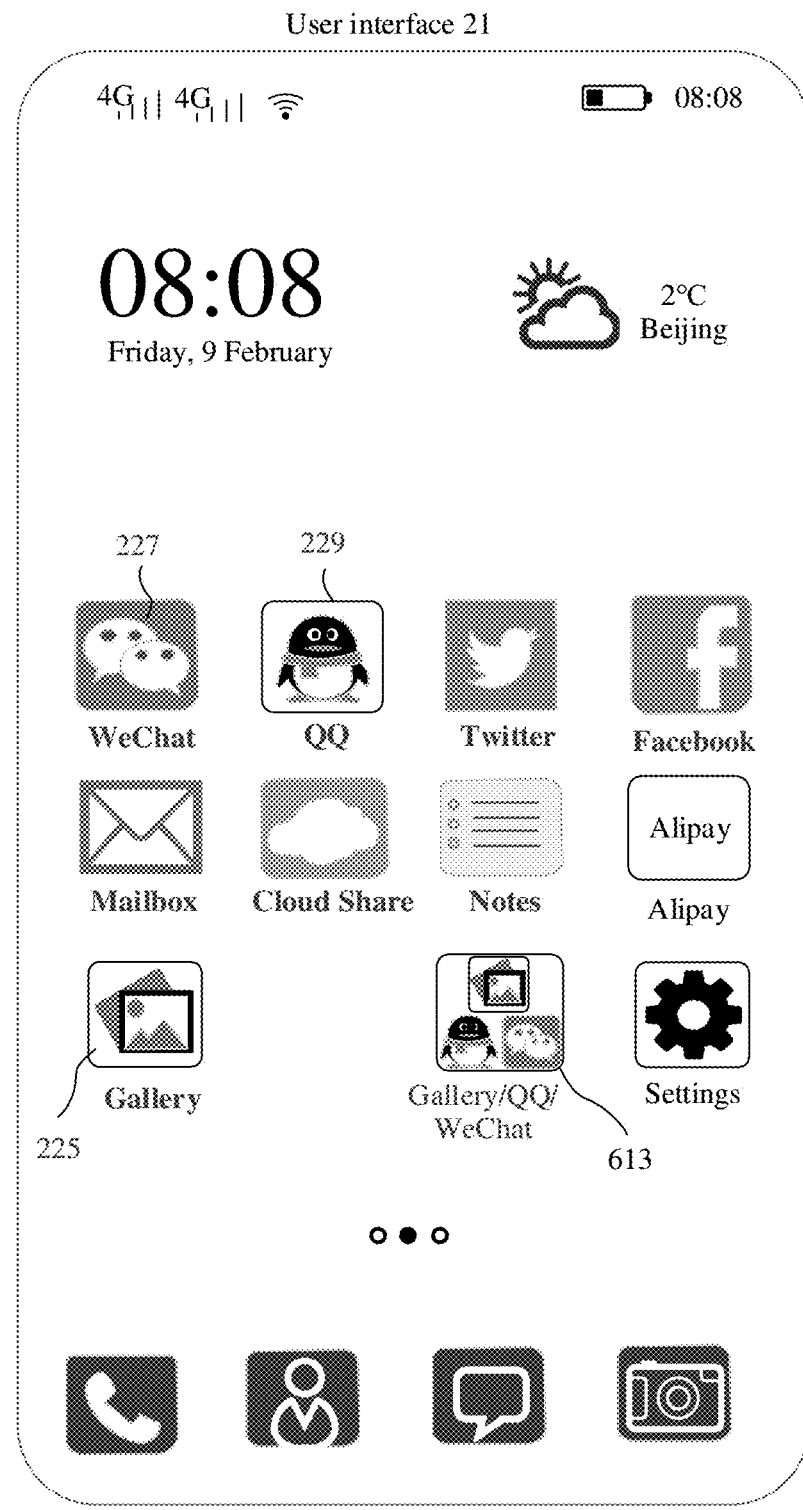

Next, a split-screen disabling manner in the second case is described. FIG. 8E to FIG. 8G are schematic diagrams of examples of some user interfaces for disabling split screen.

For example, as shown in FIG. 8E, a user interface 21 displays a fused icon 250 and a fused icon 613, and separately displays application icons included in the two fused icons, namely, an icon 227, an icon 229, and an icon 225.

For example, as shown in FIG. 8E and FIG. 8F, the electronic device detects an operation (for example, a touch-and-hold operation, or a force touch operation) of a user on the fused icon 250. The electronic device displays a prompt 260-4 on the fused icon 250 in response to the operation of the user. The prompt may be located on the top left side of the fused icon 250, may be located on the top right side, or displayed in the middle. This is not limited in this embodiment of this application. Optionally, in response to the operation of the user, the electronic device may display prompts for all fused icons in a home screen. For example, in this manner, the prompts are displayed on both the fused icon 250 and the fused icon 613 in the user interface 21.

For example, as shown in FIG. 8F and FIG. 8G, the electronic device detects a tap operation of the user on the prompt 260-4. In response to the operation of the user, the electronic device no longer displays the fused icon 250, and deletes a split-screen interface corresponding to the fused icon 250. Optionally, the fused icon 613 may be moved to a display location vacated by the originally fused icon 250. In this split-screen disabling manner, the user can conveniently delete all formed split-screen interfaces.

The foregoing specifically describes the embodiments of disabling split screen. In the conventional technology, a user may generate a folder by dragging icons to cover each other. The following further describes a switching process of generating a split-screen interface and generating a folder.

FIG. 9A to FIG. 9D are schematic diagrams of examples of some user interfaces for generating a folder.

Figure 9A:
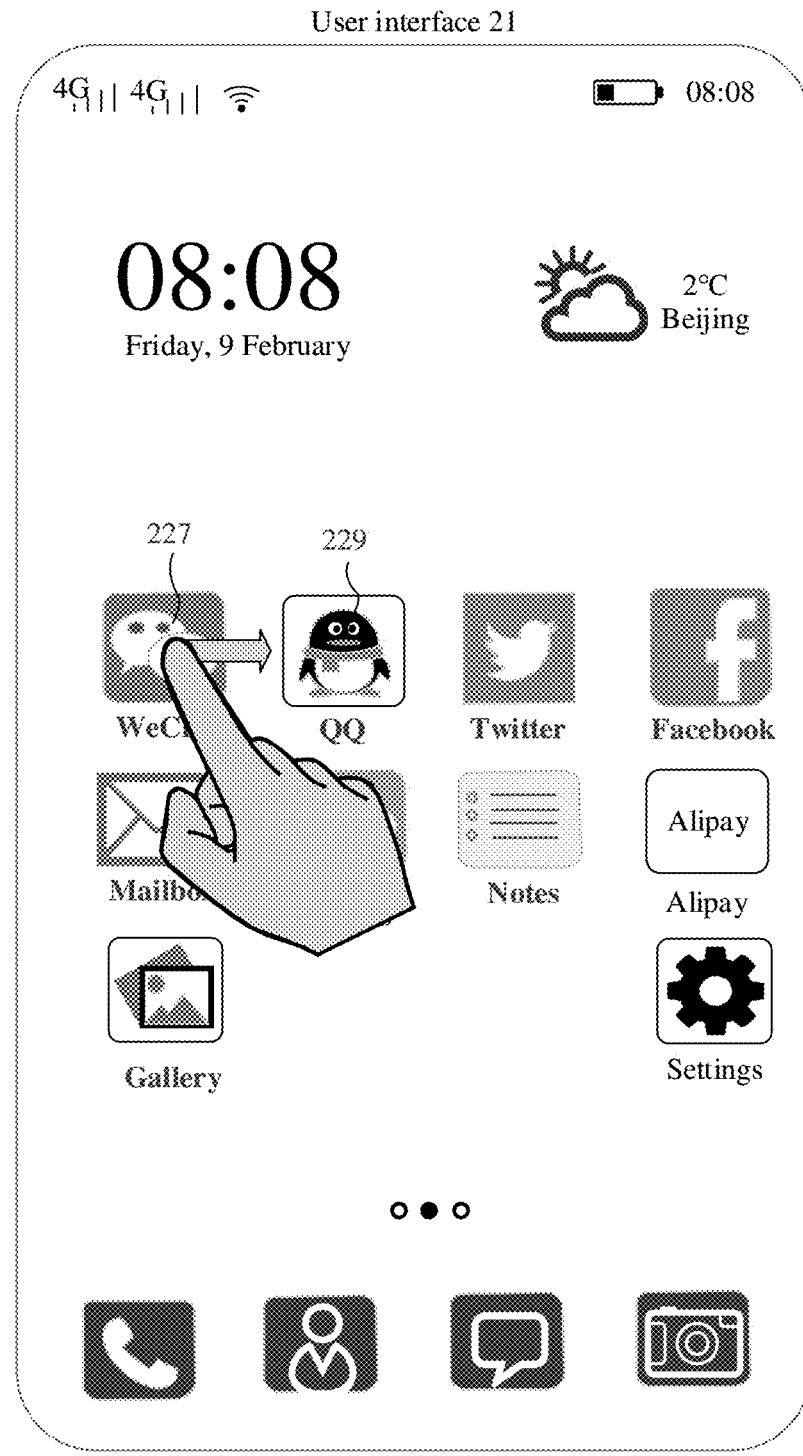
FIG. 9A to FIG. 9F are schematic diagrams of some user interfaces for generating a folder according to an embodiment of this application.
Figure 9B:
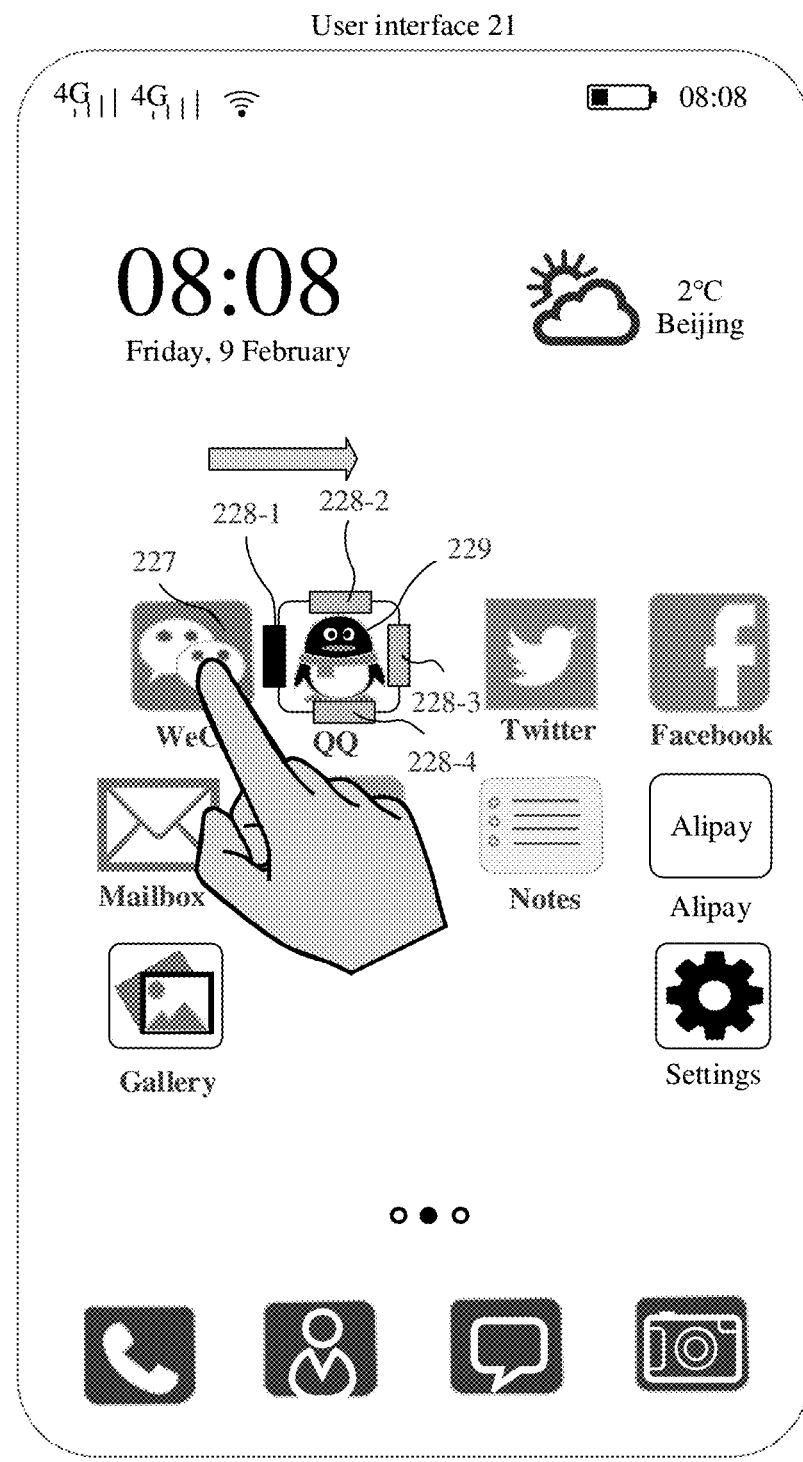

For example, as shown in FIG. 9A and FIG. 9B, an electronic device receives an operation entered by a user on a "WeChat" icon 227, where the operation is an operation of moving the icon 227 to the vicinity of a "QQ" icon 229. The electronic device displays four prompts around the icon 229 in response to the operation, where the four prompts are a prompt 228-1 (located on the left side of the icon 229), a prompt 228-2 (located on the top side of the icon 229), a prompt 228-3 (located on the right side of the icon 229), and a prompt 228-4 (located on the bottom side of the icon 229).

Figure 9C:
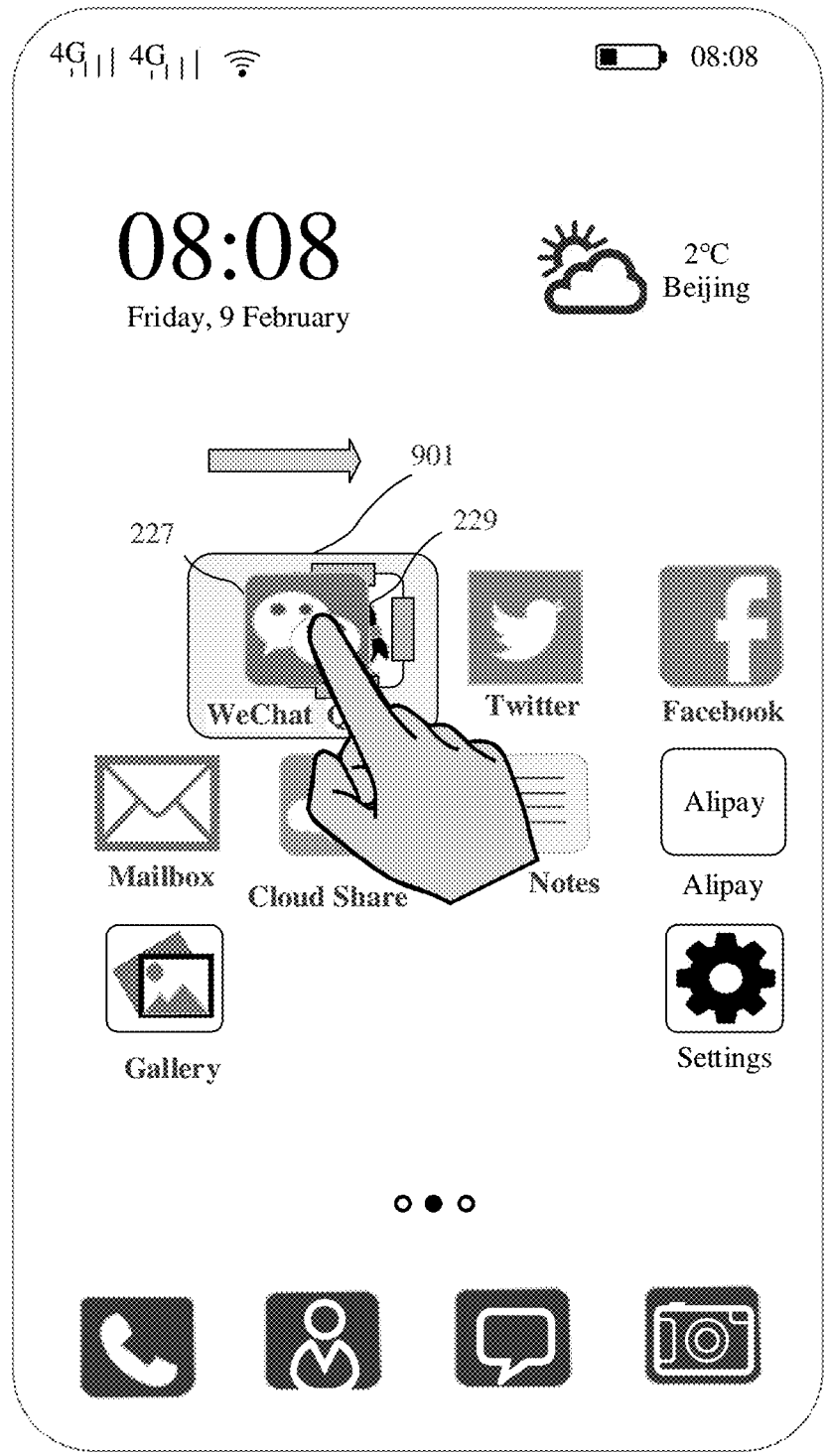

For example, as shown in FIG. 9B and FIG. 9C, the user continuously moves the icon 227 rightwards. Optionally, in a process in which the user continues to move the icon 227, the prompts may still be displayed around the icon 229. When the electronic device detects that finger coordinates of the user fall within a preset area of the icon 229, the electronic device displays a folder prompt box 901. The folder prompt box 901 is used to prompt the user that a folder including the icon 227 and the icon 229 is to be generated. The preset area of the icon 229 may be an area including pixels that are inside the icon 229 and whose distances from edges of the icon 229 are less than a preset value. Specifically, refer to FIG. 3H. FIG. 3H is a schematic diagram of a nearby area and a preset area of an application icon according to an embodiment of this application.

Figure 9D:
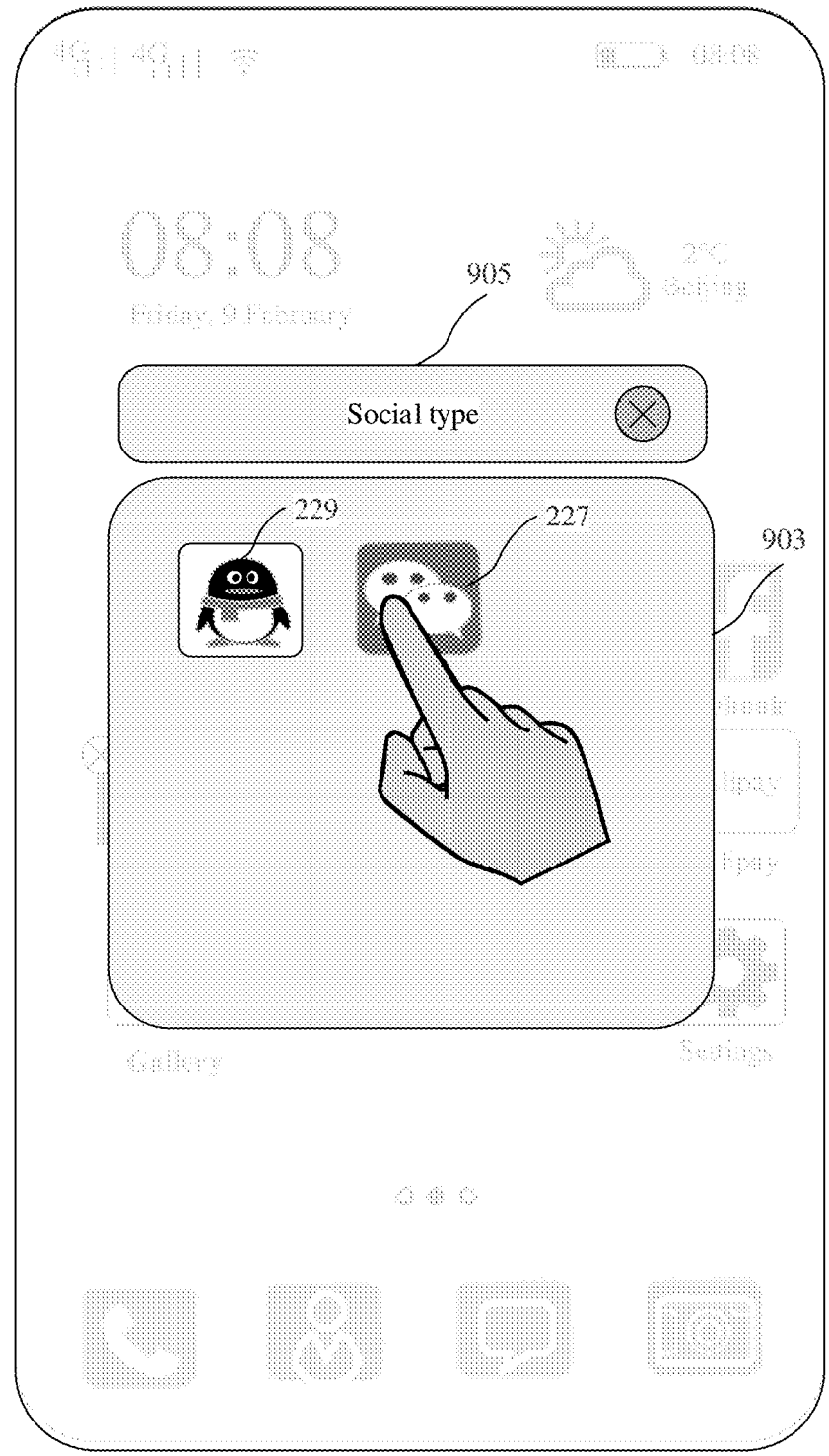

For example, as shown in FIG. 9C and FIG. 9D, when the electronic device detects that duration in which the finger coordinates of the user fall within the preset area of the icon 229 is not less than a preset value (for example, 0.5 second or 1 second), the electronic device displays a folder 903 and an input box 905. The icon 227 and the icon 229 are displayed in the folder 903, and a preset name "Social" of the folder is displayed in the input box 905. The preset name may be determined by a type of an application corresponding to the icon 227 and a type of an application corresponding to the icon 229. The input box 905 may further receive text information (which may also be information such as a symbol or an emoticon) entered by the user. The electronic device stores the text information as a name of the folder 903 in response to the operation of the user. Optionally, the preset name of the folder may not be displayed in the input box.

In still another possible implementation, for the example of the process of generating the folder prompt box 901 shown in FIG. 9B and FIG. 9C, refer to an example of a process shown in FIG. 9B to FIG. 9E, and FIG. 9F.

For example, as shown in FIG. 9B to FIG. 9E, after the electronic device displays the prompt 228-1, the prompt 228-2, the prompt 228-3, and the prompt 228-4 around the icon 229, the electronic device detects a shaking operation entered by the user on the icon 227, and the electronic device no longer displays the prompts. The shaking operation may include a left-right shaking operation (the icon 227 may also move up and down at the same time, which is not limited herein), and an up-down shaking operation (the icon 227 may also move left and right at the same time, which is not limited herein). In this manner, the electronic device can more accurately determine an intention of the user, thereby improving split-screen display accuracy.

Figure 9E:
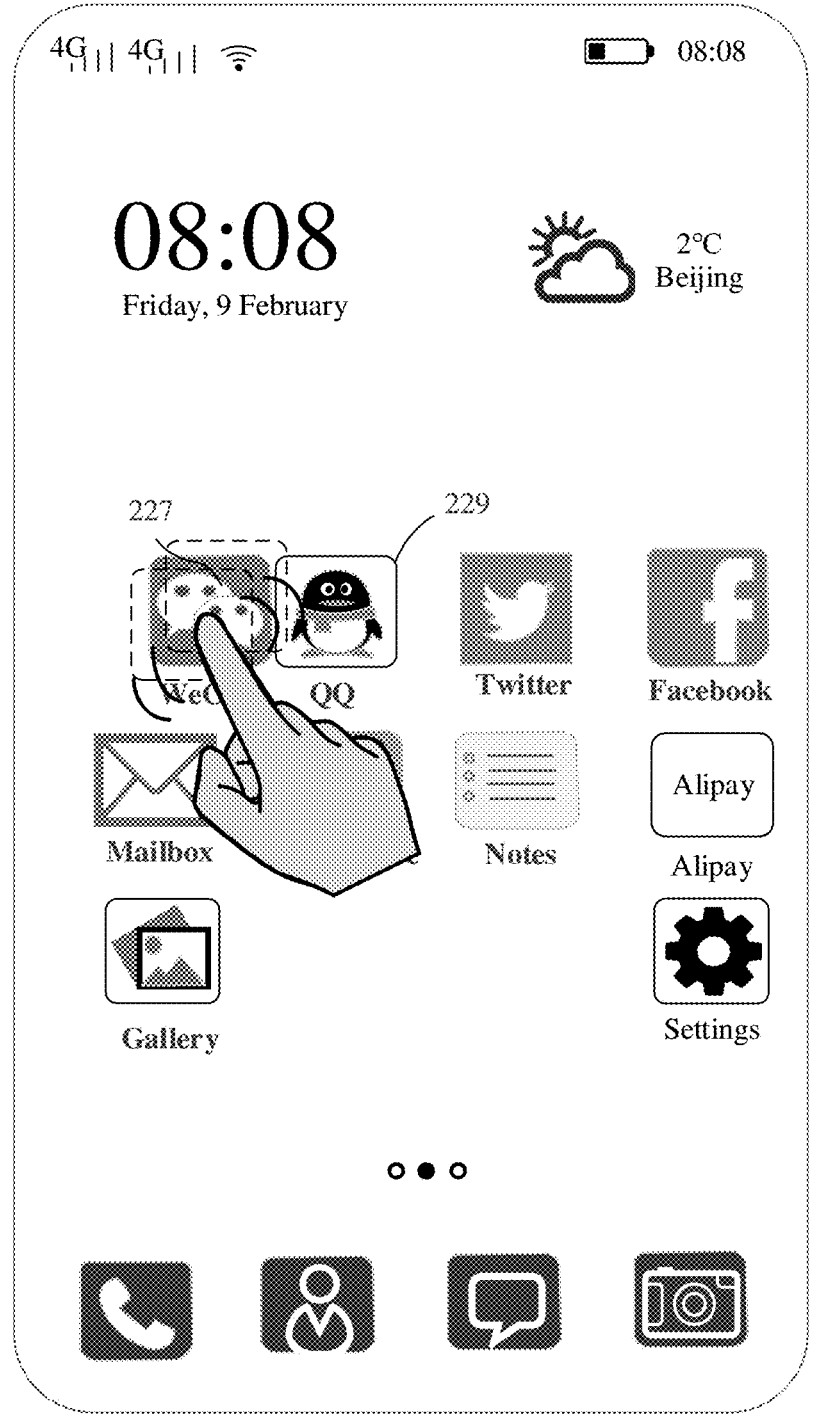
Figure 9F:
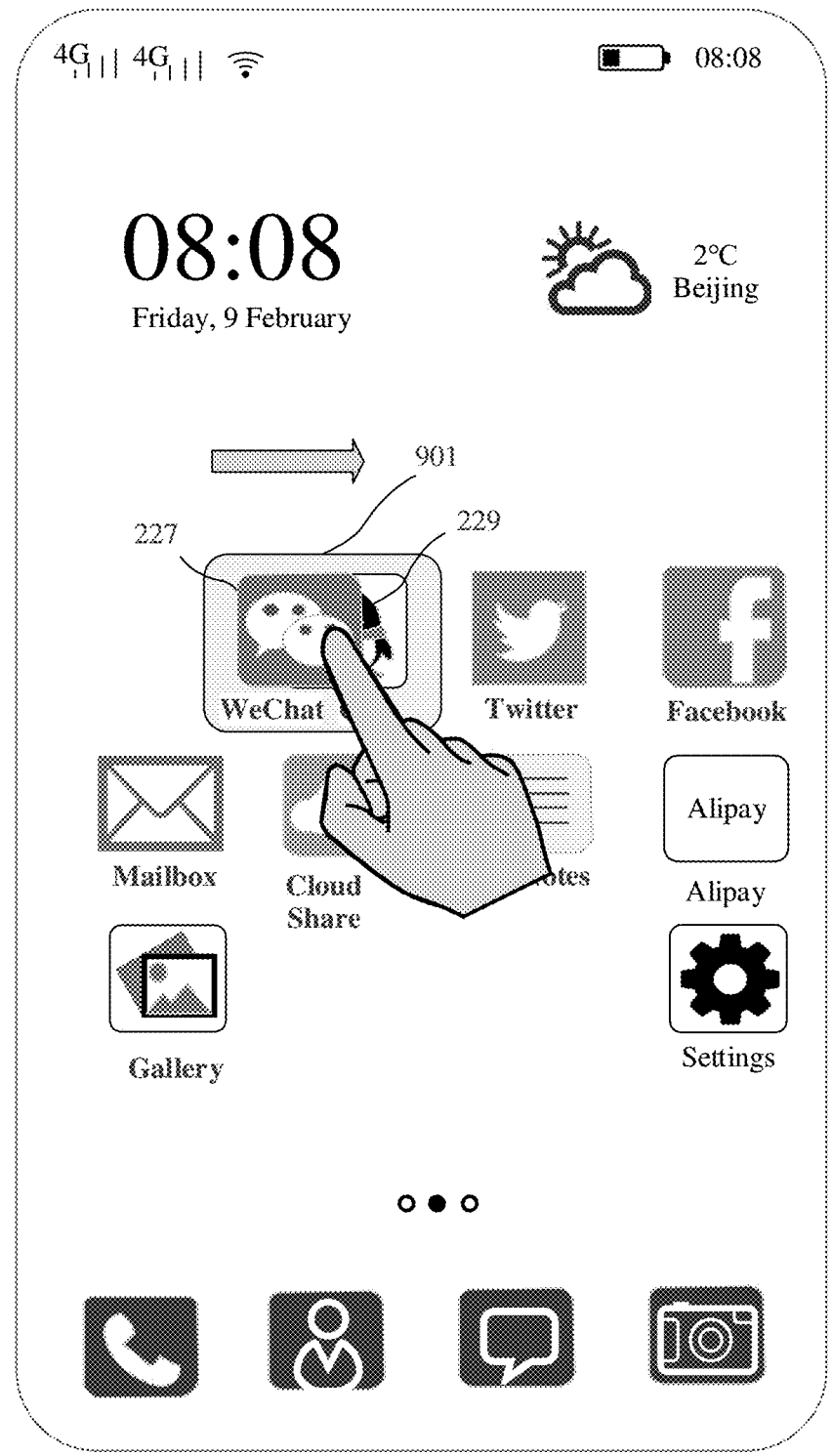

For example, as shown in FIG. 9E and FIG. 9F, the user continues to move the icon 227 rightwards. When the electronic device detects that the finger coordinates of the user fall within the preset area of the icon 229, the electronic device displays the folder prompt box 901.

Figure 10:
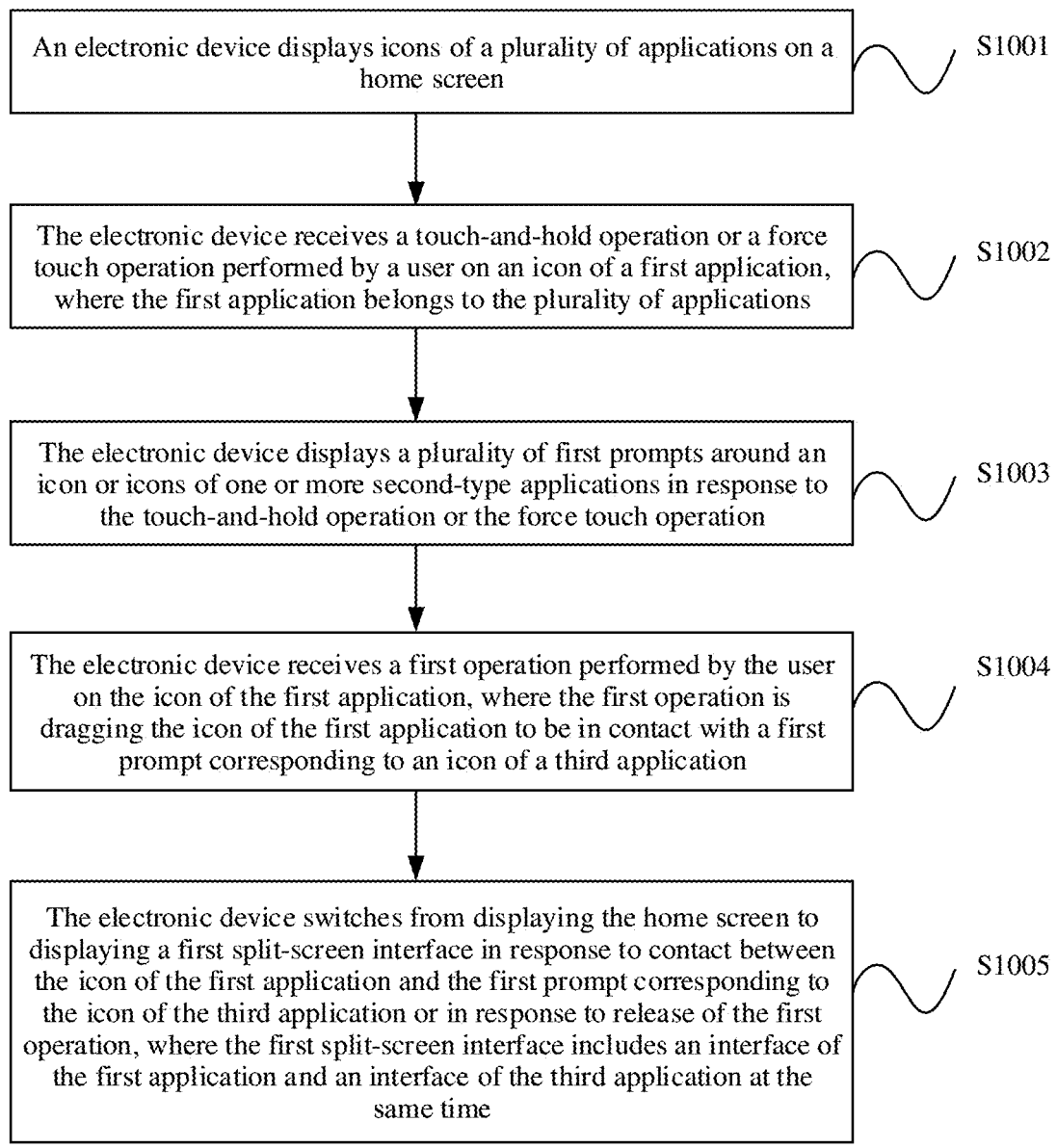
FIG. 10 is a schematic flowchart of a split-screen method according to an embodiment of this application.

FIG. 10 is a schematic flowchart of a split-screen method according to an embodiment of this application. As shown in FIG. 10, the method includes the following steps.

S1001: An electronic device displays icons of a plurality of applications on a home screen.

The plurality means that an integer is greater than 1. The application may also be referred to as an application program, software, or the like. Specifically, for the home screen on which the electronic device displays the icons of the plurality of applications, refer to the user interface 21 shown in FIG. 2A or the user interface 31 shown in FIG. 2C.

S1002: The electronic device receives a touch-and-hold operation or a force touch operation performed by a user on an icon of a first application, where the first application belongs to the plurality of applications.

For example, the icon of the first application may be the icon 227 in the embodiment corresponding to FIG. 4C. The touch-and-hold operation or the force touch operation may be a touch operation on the icon 227.

S1003: The electronic device displays a plurality of first prompts around an icon or icons of one or more second-type applications in response to the touch-and-hold operation or the force touch operation.

The one or more second-type applications are applications that support split screen in the plurality of applications, and the first prompt is used to indicate that the one or more second-type applications support split screen.

It should be noted that a plurality of second-type applications do not indicate that the plurality of second-type applications are the same. The plurality of second-type applications are different from each other. For example, refer to FIG. 4C, icons of the plurality of second-type applications displayed in FIG. 4C include the icon 229, the icon 233, the icon 235, and the icon 225. For example, four first prompts are displayed around the icon 229 of one second-type application in FIG. 4C. Specifically, the four prompts are the prompt 228-1 (located on the left side of the icon 229), the prompt 228-2 (located on the top side of the icon 229), the prompt 228-3 (located on the right side of the icon 229), and the prompt 228-4 (located on the bottom side of the icon 229). Likewise, the plurality of first prompts are also displayed around icons of other second-type applications, which are not indicated one by one herein. In this manner, the user can intuitively view which applications can support split screen, so that the user can conveniently select an application that needs to be displayed in a split screen manner.

In addition, the electronic device may display the plurality of first prompts around the first application in response to the touch-and-hold operation or the force touch operation, where the first prompt is used to indicate that the first application may support split screen. For example, refer to FIG. 4A. The icon of the first application is the "WeChat" icon 227, and four seventh prompts displayed around the icon of the first application are the prompt 230-1 (located on the left side of the icon 227), the prompt 230-2 (located on the top side of the icon 227), the prompt 230-3 (located on the right side of the icon 227), and the prompt 230-4 (located on the bottom side of the icon 227). Optionally, the electronic device may not display the first prompt around the first application. This is not limited in this embodiment of this application.

S1004: The electronic device receives a first operation performed by the user on the icon of the first application, where the first operation is dragging the icon of the first application to be in contact with a first prompt corresponding to an icon of a third application.

The third application is one of the one or more second-type applications. For example, the first operation may be enabling the icon 227 to be in contact with the first prompt 228-1 corresponding to the icon 229 in the embodiment shown in FIG. 4C and FIG. 4D. The third application is "QQ" corresponding to the icon 229.

S1005: The electronic device switches from displaying the home screen to displaying a first split-screen interface in response to contact between the icon of the first application and the first prompt corresponding to the icon of the third application or in response to release of the first operation, where the first split-screen interface includes an interface of the first application and an interface of the third application at the same time.

For example, refer to the embodiment shown in FIG. 4C and FIG. 4D. The home screen may be the user interface 21 shown in FIG. 4D, and the first split-screen interface may be the user interface 22 shown in FIG. 3C. The interface of the first application included in the first split-screen interface is the interface of "WeChat", and the interface of the third application is the interface of "QQ".

In a possible implementation, that the electronic device switches from displaying the home screen to displaying a first split-screen interface in response to release of the first operation includes: Before release of the first operation, the electronic device detects that duration of contact between the icon of the first application and the first prompt corresponding to the icon of the third application is not less than a preset value. The electronic device switches from displaying the home screen to displaying the first split-screen interface in response to release of the first operation. For example, the first operation may be enabling the icon 227 to be in contact with the first prompt 228-1 corresponding to the icon 229 in the embodiment shown in FIG. 4C and FIG. 4D. The third application is "QQ" corresponding to the icon 229. The preset value may be a time value such as 0.5 second or 1 second. A manner of releasing the first operation may be that a finger of the user leaves a display 194 of the electronic device. The electronic device may detect, by using a touch sensor 180K, whether the finger of the user leaves the display. In this manner, the user can keep contact between the icon of the first application and the first prompt corresponding to the icon of the third application for a period of time (not less than the preset value). After the user releases the first operation, the electronic device switches from displaying the home screen to displaying the split-screen interface. In this manner, split-screen intention of the user can be better determined, and split-screen accuracy can be improved.

In a possible implementation, the method further includes: The electronic device determines a second location of the interface of the first application relative to the interface of the third application in the first split-screen interface based on a first location of the icon of the third application relative to the first prompt that is in contact with the icon of the first application, where the first location includes one of a left side, a right side, a top side, and a bottom side, and the second location is the same as the first location. For example, the icon of the first application may be the icon 227 in FIG. 3F, the icon of the third application may be the icon 337 in FIG. 3F, and the first split-screen interface may be the user interface 23 in FIG. 3G. For specific content, refer to the embodiment shown in FIG. 3F and FIG. 3G. Details are not described herein again. In this manner, the user can control the location relationship between the icon of the third application and the icon of the first application, to determine the location relationship between the interface of the third application and the interface of the first application in the split-screen interface. This further improves split-screen operation efficiency.

In a possible implementation, that the electronic device displays a plurality of first prompts around an icon or icons of one or more second-type applications includes: The electronic device detects that a split-screen direction supported by the electronic device is a left-right direction, and separately displays one first prompt on a left side and a right side of each of the icon or the icons of the one or more second-type applications.

In a possible implementation, that the electronic device displays a plurality of first prompts around an icon or icons of one or more second-type applications includes: The electronic device detects that a split-screen direction supported by the electronic device is an up-down direction, and separately displays one first prompt on a top side and a bottom side of each of the icon or the icons of the one or more second-type applications. For example, an icon of one second-type application may be the icon 229 in FIG. 3E or FIG. 3F. The first icon 228-2 is displayed in the top side of the icon 229, and 228-4 is displayed in the bottom side of the icon 229. In this manner, the user can conveniently learn a direction the split-screen direction supported by the electronic device.

In a possible implementation, that the electronic device displays a plurality of first prompts around an icon or icons of one or more second-type applications includes: The electronic device detects that split-screen directions supported by the electronic device are a left-right direction and an up-down direction, and separately displays one first prompt on a left side, a right side, a top side, and a bottom side of each of the icon or the icons of the one or more second-type applications.

In a possible implementation, after the electronic device receives the first operation, and before the first operation is released, the method further includes: The icon of the third application absorbs the icon of the first application, so that one edge of the icon of the first application is in contact with one edge of the icon of the third application. For example, for a manner in which the icon of the third application adsorbs the icon of the first application, refer to the descriptions of the magnetic attraction effect in the embodiment shown in FIG. 3A and FIG. 3B.

In a possible implementation, the method further includes: The electronic device receives a second operation, and the electronic device switches from displaying the first split-screen interface to displaying the home screen in response to the second operation, where the home screen further includes a first fused icon, the home screen does not include the icon of the first application and the icon of the third application, the first fused icon does not belong to the icons of the plurality of applications, and the first fused icon is an icon obtained after the icon of the third application is fused with the icon of the first application; and receives a third operation performed on the first fused icon located on the home screen, and the electronic device displays the first split-screen interface in response to the third operation. For example, for the first fused icon, refer to the fused icon 250 in FIG. 5A. For the home screen, refer to the user interface 21 shown in FIG. 5A. The third operation may be an operation of tapping the fused icon 250. For specific content, refer to the embodiment shown in FIG. 5A. Details are not described herein again.

In a possible implementation, the method further includes: The electronic device receives a fourth operation, and the electronic device switches from displaying the first split-screen interface to displaying the home screen in response to the fourth operation, where the home screen further includes a first fused icon, the first fused icon does not belong to the icons of the plurality of applications, and the first fused icon is an icon obtained after the icon of the third application is fused with the icon of the first application; and receives a fifth operation performed on the first fused icon located on the home screen, and the electronic device displays the first split-screen interface in response to the fifth operation. For example, for the first fused icon, refer to the fused icon 250 in FIG. 5B, for the icon of the first application, refer to the "WeChat" icon 227 in FIG. 5B, for the icon of the third application, refer to the "QQ" icon 229 in FIG. 5B, and for the home screen, refer to the user interface 21 shown in FIG. 5B. The fifth operation may be an operation of tapping the fused icon 250. For specific content, refer to the embodiment shown in FIG. 5B. Details are not described herein again.

In a possible implementation, a location of the icon of the first application relative to the icon of the third application in the first fused icon is the same as the location of the interface of the first application relative to the interface of the third application in the first split-screen interface. For example, refer to the embodiment corresponding to FIG. 5A. For the first fused icon, refer to the fused icon 250 in FIG. 5A. For the first split-screen interface, refer to the user interface 22 shown in FIG. 3C. In this manner, the user can conveniently learn display locations of interfaces of applications in the split-screen interface by using icons.

In a possible implementation, the method further includes: The electronic device receives a sixth operation performed by the user on the first fused icon, and the electronic device displays the icon of the first application, the icon of the third application, and a second prompt in response to the sixth operation. The electronic device receives a seventh operation performed by the user on the second prompt, and in response to the seventh operation, the electronic device deletes the first fused icon on the home screen, and displays the icon of the first application and the icon of the third application on the home screen. For example, for this manner, refer to the embodiment corresponding to FIG. 7A to FIG. 7C. The sixth operation may be a touch-and-hold operation on the fused icon 250, the icon of the first application may be the icon 227, the icon of the third application may be the icon 229, the second prompt may be the prompt 260, and the seventh operation may be a tap operation on the prompt 260.

In a possible implementation, the method further includes: The electronic device receives an eighth operation performed by the user on the first fused icon, and the electronic device displays a third prompt for the first fused icon in response to the eighth operation. The electronic device receives a ninth operation performed by the user on the third prompt, and the electronic device deletes the first fused icon on the home screen. For example, for this manner, refer to the embodiment corresponding to FIG. 8E to FIG. 8G. The eighth operation may be a touch-and-hold operation on the fused icon 250, the third prompt may be the prompt 260-4, and the ninth operation may be a tap operation on the prompt 260-4. In this split-screen disabling manner, the user can conveniently delete all formed split-screen interfaces.

In a possible implementation, the home screen further includes an icon of a fourth application, the fourth application belongs to the one or more second-type applications, and the method further includes: The electronic device receives a touch-and-hold operation or a force touch operation performed by the user on the icon of the fourth application. In response to the touch-and-hold operation or the force touch operation, the electronic device displays the plurality of first prompts around a remaining icon or remaining icons of the one or more second-type applications except the icon of the first application and the icon of the third application, and displays a plurality of fourth prompts around the first fused icon, where the fourth prompt is used to indicate that an interface of another application may be added to the split-screen interface corresponding to the first fused icon. The electronic device receives a tenth operation performed by the user on the icon of the fourth application, where the tenth operation is dragging the icon of the fourth application to be in contact with the fourth prompt corresponding to the first fused icon. The electronic device switches from displaying the home screen to displaying a second split-screen interface in response to contact between the icon of the fourth application and the fourth prompt corresponding to the first fused icon or in response to release of the tenth operation, where the second split-screen interface includes an interface of the fourth application, the interface of the first application, and the interface of the third application at the same time. For example, refer to the embodiment shown in FIG. 6A and FIG. 6B. The fourth prompt may be the six prompts around the fused icon 602, and the six prompts are the prompt 601-1, the prompt 601-2, the prompt 601-3, the prompt 601-4, the prompt 601-5, and the prompt 601-6. The tenth operation may be enabling the icon 225 to be in contact with the prompt 601-2. The second split-screen interface may be the split-screen interface shown in FIG. 6B. The fourth application is "Gallery", the third application is "QQ", and the first application is "WeChat".

In a possible implementation, the home screen further includes an icon of a fourth application, the fourth application belongs to the one or more second-type applications, and the method further includes: The electronic device receives a touch-and-hold operation or a force touch operation performed by the user on the icon of the fourth application. In response to the touch-and-hold operation or the force touch operation, the electronic device displays the plurality of first prompts around the icon or the icons of the one or more second-type applications, and displays a plurality of fourth prompts around the first fused icon, where the fourth prompt is used to indicate that an interface of another application may be added to the split-screen interface corresponding to the first fused icon. The electronic device receives an eleventh operation performed by the user on the icon of the fourth application, where the eleventh operation is dragging the icon of the fourth application to be in contact with a fourth prompt corresponding to the first fused icon. The electronic device switches from displaying the home screen to displaying a second split-screen interface in response to contact between the icon of the fourth application and the fourth prompt corresponding to the first fused icon or in response to release of the eleventh operation, where the second split-screen interface includes an interface of the fourth application, the interface of the first application, and the interface of the third application at the same time.

In a possible implementation, the method further includes: The electronic device determines a fourth location of the interface of the fourth application in the second split-screen interface based on a third location of the first fused icon relative to the fourth prompt that is in contact with the icon of the fourth application, where the third location includes one of a left side, a right side, a top side, a bottom side, a top left side, a top right side, a bottom left side, or a bottom right side, and the fourth location is the same as the third location. For example, for this method, refer to the embodiment corresponding to FIG. 6A and FIG. 6B, or FIG. 6E and FIG. 6F.

In a possible implementation, that the electronic device displays a plurality of fourth prompts around the first fused icon includes: If detecting that split-screen directions supported by the electronic device are an up-down direction and a left-right direction, and a same direction supports to display only two split-screen interfaces, the electronic device separately displays one fourth prompt on a top left side, a top right side, a bottom left side, and a bottom right side of the first fused icon. For this manner, refer to descriptions in FIG. 6A and FIG. 6B. In this manner, the user can conveniently learn directions in which interfaces of new applications can be added to a formed split-screen interface.

In a possible implementation, the method further includes: The electronic device receives a twelfth operation, and the electronic device switches from displaying the second split-screen interface to displaying the home screen in response to the twelfth operation, where the home screen further includes a second fused icon, the home screen does not include the icon of the first application, the icon of the third application, and the first fused icon, the second fused icon does not belong to the icons of the plurality of applications, and the second fused icon is an icon obtained after the icon of the third application and the icon of the first application are fused with the icon of the fourth application; and receives a thirteenth operation performed on the second fused icon located on the home screen, and the electronic device displays the second split-screen interface in response to the thirteenth operation. For example, the home screen may be the user interface 31 shown in FIG. 6D. The second fused icon may be the fused icon 609. For the home screen, refer to the user interface 31 shown in FIG. 6G. The second fused icon may be the fused icon 613.

In a possible implementation, the method further includes: The electronic device receives a fourteenth operation, and the electronic device switches from displaying the second split-screen interface to displaying the home screen in response to the fourteenth operation, where the home screen further includes a second fused icon, the first fused icon does not belong to the icons of the plurality of applications, and the second fused icon is an icon obtained after the icon of the third application and the icon of the first application are fused with the icon of the fourth application; and receives a fifteenth operation performed on the second fused icon located on the home screen, and the electronic device displays the second split-screen interface in response to the fifteenth operation. For example, the home screen may be the user interface 21 shown in FIG. 8E. The second fused icon may be the fused icon 613.

In a possible implementation, a location of the icon of the fourth application in the second fused icon is the same as the location of the interface of the fourth application in the second split-screen interface. For example, for this method, refer to the embodiment corresponding to FIG. 6A and FIG. 6B, or FIG. 6E and FIG. 6F.

In a possible implementation, the method further includes: The electronic device receives a sixteenth operation performed by the user on the second fused icon, and the electronic device displays the icon of the first application, the icon of the third application, the icon of the fourth application, and three fifth prompts in response to the sixteenth operation, where one fifth prompt corresponds to an icon of one application; the electronic device receives a seventeenth operation performed by the user on a fifth prompt corresponding to the icon of the third application, and the electronic device deletes the second fused icon on the home screen, and displays the icon of the third application and a third fused icon on the home screen, where the third fused icon does not belong to the icons of the plurality of applications, and the third fused icon is an icon obtained after the icon of the first application is fused with the icon of the fourth application; and receives an eighteenth operation performed on the third fused icon located on the home screen, and the electronic device displays a third split-screen interface in response to the eighteenth operation, where the third split-screen interface includes the interface of the first application and the interface of the fourth application at the same time. For example, for this manner, refer to the embodiment shown in FIG. 7D to FIG. 7G. The first application is "WeChat", the third application is "Gallery", and the fourth application is "QQ". Specifically, the icon 225 corresponds to the prompt 260-1, the icon 229 corresponds to the prompt 260-2, and the icon 227 corresponds to the prompt 260-3. The seventeenth operation is a tap operation performed by the user on the prompt 260-1. The third fused icon is the icon 701.

In a possible implementation, the method further includes: The electronic device receives a nineteenth operation performed by the user on the second fused icon, and the electronic device displays one sixth prompt for each of the first fused icon and the second fused icon in response to the nineteenth operation, where one sixth prompt corresponds to one fused icon. The electronic device receives a twentieth operation performed by the user on a sixth prompt corresponding to the second fused icon, and the electronic device deletes the second fused icon on the home screen. In this manner, the user can conveniently delete a plurality of fused icons included in the home screen.

In a possible implementation, the home screen further includes an icon of a fifth application and an icon of a sixth application, and the method further includes: The electronic device receives a touch-and-hold operation or a force touch operation performed by the user on the icon of the fifth application. The electronic device displays the plurality of first prompts around the icon or the icons of the one or more second-type applications in response to the touch-and-hold operation or the force touch operation. The electronic device detects a shaking operation performed by the user on the icon of the fifth application, and the electronic device skips displaying the plurality of first prompts in response to the shaking operation. The electronic device detects that the user drags the icon of the fifth application in a preset area of the icon of the sixth application, and the electronic device generates a folder, where the icon of the fifth application and the icon of the sixth application are displayed in the folder. For example, for the touch-and-hold operation, refer to the touch operation performed on the icon 227 in FIG. 4C. The displayed icons of the plurality of second-type applications include the icon 229, the icon 233, the icon 235, and the icon 225. For the shaking operation, refer to the shaking operation in the embodiment shown in FIG. 9E. For the folder, refer to the folder 903 shown in FIG. 9D. For other content, refer to detailed descriptions in the embodiment in FIG. 9B to FIG. 9E, FIG. 9F, and FIG. 9D. Details are not described herein again. In this manner, the electronic device can more accurately determine an intention of the user, thereby improving split-screen display accuracy.

Figure 11:
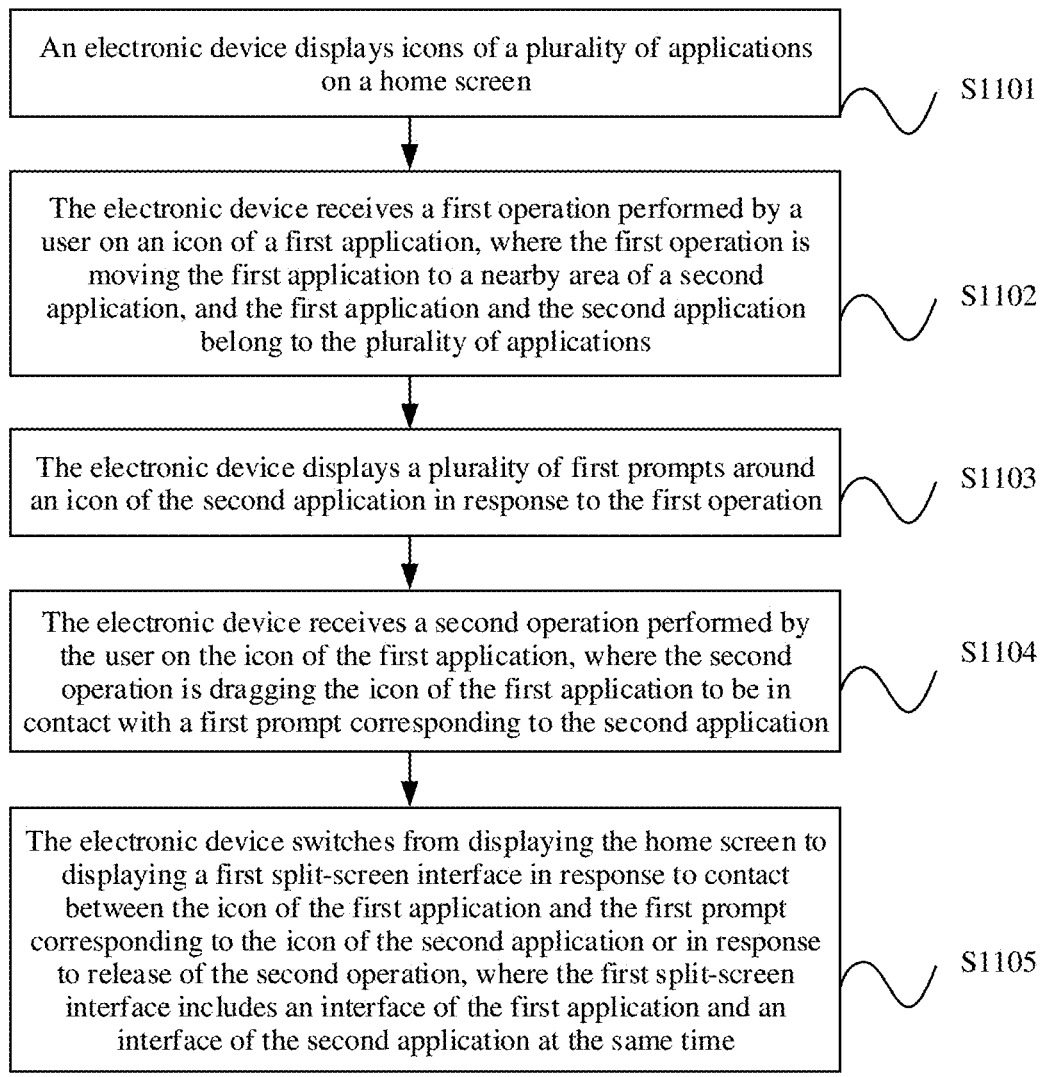
FIG. 11 is a schematic flowchart of another split-screen method according to an embodiment of this application.

FIG. 11 is a schematic flowchart of another split-screen method according to an embodiment of this application. As shown in FIG. 11, the method includes the following steps.

S1101: An electronic device displays icons of a plurality of applications on a home screen.

Specifically, for the home screen on which the electronic device displays the icons of the plurality of applications, refer to the user interface 21 shown in FIG. 2A or the user interface 31 shown in FIG. 2C.

S1102: The electronic device receives a first operation performed by a user on an icon of a first application, where the first operation is moving the first application to a nearby area of a second application, and the first application and the second application belong to the plurality of applications.

For example, the icon of the first application may be the icon 227 in FIG. 3A or FIG. 3B, and an icon of the second application may be the icon 229 in FIG. 3A or FIG. 3B. The first operation may be an operation of moving the "WeChat" icon (the icon 227) to the nearby area of the "QQ" icon (the icon 229).

S1103: The electronic device displays, a plurality of first prompts around the icon of the second application in response to the first operation, where the first prompt is used to indicate that the second application supports split screen.

For example, refer to FIG. 3C. The icon of the second application displayed in FIG. 3C may be the icon 229. Four first prompts are displayed around the icon 229. Specifically, the four prompts are the prompt 228-1 (located on the left side of the icon 229), the prompt 228-2 (located on the top side of the icon 229), the prompt 228-3 (located on the right side of the icon 229), and the prompt 228-4 (located on the bottom side of the icon 229).

S1104: The electronic device receives a second operation performed by the user on the icon of the first application, where the second operation is dragging the icon of the first application to be in contact with a first prompt corresponding to the second application.

For example, for this manner, refer to the embodiment shown in FIG. 3B and FIG. 3C. The second operation is continuously dragging the icon 227, so that the icon 227 is in contact with the prompt 228-1.

S1105: The electronic device switches from displaying the home screen to displaying a first split-screen interface in response to contact between the icon of the first application and the first prompt corresponding to the icon of the second application or in response to release of the second operation, where the first split-screen interface includes an interface of the first application and an interface of the second application at the same time.

For example, for this manner, refer to the embodiment shown in FIG. 3B and FIG. 3C. The icon of the first application is in contact with the first prompt corresponding to the icon of the second application is keeping the icon of the first application in contact with the first prompt and duration of contact is not less than a preset value. The home screen is the user interface 21 shown in FIG. 3B, and the first split-screen interface is the user interface 22 shown in FIG. 3C. The first application is "WeChat", and the second application is "QQ". For other specific content, refer to the description in the embodiment. Details are not described herein again.

In a possible implementation, that the electronic device switches from displaying the home screen to displaying a first split-screen interface in response to release of the second operation includes: Before release of the second operation, the electronic device detects that duration of contact between the icon of the first application and the first prompt corresponding to the icon of the second application is not less than a preset value, and the electronic device switches from displaying the home screen to displaying the first split-screen interface in response to release of the second operation. The second operation may be that shown in the embodiment in FIG. 3B, the icon 227 is continuously dragged, so that the icon 227 is in contact with the prompt 228-1 corresponding to the icon 229. The icon of the first application is 227, and the icon of the second application is 229.

In a possible implementation, the method further includes: The electronic device determines a second location of the interface of the first application relative to the interface of the second application in the first split-screen interface based on a first location of the icon of the second application relative to the first prompt that is in contact with the icon of the first application, where the first location includes one of a left side, a right side, a top side, and a bottom side, and the second location is the same as the first location. For example, the icon of the first application may be the icon 227 in FIG. 3F, the icon of the second application may be the icon 337 in FIG. 3F, and the first split-screen interface may be the user interface 23 in FIG. 3G. For specific content, refer to the embodiment shown in FIG. 3F and FIG. 3G. Details are not described herein again. In this manner, the user can control the location relationship between the icon of the second application and the icon of the first application to determine the location relationship between the interface of the second application and the interface of the first application in the split-screen interface. This further improves split-screen operation efficiency.

In a possible implementation, the method further includes: The electronic device receives a third operation, and the electronic device switches from displaying the first split-screen interface to displaying the home screen in response to the third operation, where the home screen further includes a first fused icon, the home screen does not include the icon of the first application and the icon of the second application, the first fused icon does not belong to the icons of the plurality of applications, and the first fused icon is an icon obtained after the icon of the second application is fused with the first application. The electronic device receives a fourth operation performed on the first fused icon located on the home screen, and the electronic device displays the first split-screen interface in response to the fourth operation. For example, for the first fused icon, refer to the fused icon 250 in FIG. 5A. For the home screen, refer to the user interface 21 shown in FIG. 5A. The third operation may be an operation of tapping the fused icon 250. For specific content, refer to the embodiment shown in FIG. 5A. Details are not described herein again.

In a possible implementation, the method further includes: The electronic device receives a fifth operation performed by the user on the first fused icon, and the electronic device displays the icon of the first application, the icon of the second application, and a second prompt in response to the fifth operation. The electronic device receives a sixth operation performed by the user on the second prompt, and in response to the sixth operation, the electronic device deletes the first fused icon on the home screen, and displays the icon of the first application and the icon of the second application on the home screen. For example, for this manner, refer to the embodiment corresponding to FIG. 7A to FIG. 7C. The fifth operation may be a touch-and-hold operation on the fused icon 250, the icon of the first application may be the icon 227, the icon of the second application may be the icon 229, the second prompt may be the prompt 260, and the sixth operation may be a tap operation on the prompt 260.

In a possible implementation, the home screen further includes an icon of a fifth application and an icon of a sixth application, and the method further includes: The electronic device receives a sixth operation performed by the user on the icon of the fifth application, where the sixth operation is moving the fifth application to a nearby area of the sixth application. The electronic device displays a plurality of third prompts around the icon of the sixth application in response to the sixth operation, where the third prompt is used to indicate that the sixth application supports split screen. The electronic device detects a shaking operation performed by the user on the icon of the fifth application, and the electronic device skips displaying the plurality of third prompts in response to the shaking operation. The electronic device detects that the user drags the icon of the fifth application in a preset area of the icon of the sixth application, and the electronic device generates a folder, where the icon of the fifth application and the icon of the sixth application are displayed in the folder. For example, for the shaking operation, refer to the shaking operation in the embodiment shown in FIG. 9E. For the folder, refer to the folder 903 shown in FIG. 9D. For other content, refer to detailed descriptions in the embodiment in FIG. 9A, FIG. 9B to FIG. 9E, FIG. 9F, and FIG. 9D. Details are not described herein again. In this manner, the electronic device can more accurately determine an intention of the user, thereby improving split-screen display accuracy.

It should be noted that the implementations of this application may be randomly combined to achieve different technical effects. For example, all possible implementations in the embodiment corresponding to FIG. 10 may be applied to the embodiment corresponding to FIG. 11 and the possible implementations corresponding to the embodiment on a premise that they do not conflict with the embodiment corresponding to FIG. 11.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, the procedures or functions according to this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid-State Drive), or the like.

In summary, the foregoing descriptions are merely embodiments of the technical solutions of this application, but are not intended to limit the protection scope of this application. Any modification, equivalent replacement, or improvement made according to the disclosure of this application shall fall within the protection scope of this application.

What is claimed is:

1. An electronic device, comprising:
a display;
one or more processors; and
a non-transitory memory coupled to the one or more processors, the memory storing computer program code for execution by the one or more processors, the computer program code including computer instructions for:
displaying icons of a plurality of applications on a home screen;
receiving at least one of a touch-and-hold operation or a force touch operation performed by a user on an icon of a first application, wherein the first application belongs to the plurality of applications;
displaying a plurality of first prompts around one or more icons of one or more second-type applications in response to the at least one of the touch-and-hold operation or the force touch operation, wherein each of the one or more second-type applications are applications that support split screen in the plurality of applications, and a first prompt indicates that the one or more second-type applications support split screen;
receiving a first operation performed by the user on an icon of the first application, wherein the first operation is dragging the icon of the first application to be in contact with the first prompt corresponding to an icon of a third application, and the third application is one of the one or more second-type applications; and
switching from displaying the home screen to displaying a first split-screen interface in response to at least one of release of the first operation or contact between the icon of the first application and the first prompt corresponding to the icon of the third application and that is created by the dragging, wherein the first split-screen interface comprises an interface of the first application and an interface of the third application being displayed at a same time.

2. The electronic device according to claim 1, wherein the computer program code further includes instructions for:
detecting, before the release of the first operation, that a duration of contact between the icon of the first application and the first prompt corresponding to the icon of the third application is not less than a preset value; and
switching from displaying the home screen to displaying the first split-screen interface in response to release of the first operation.

3. The electronic device according to claim 1, wherein the computer program code further includes instructions for:
determining, in response to the first prompt being in contact with the icon of the first application, a second location of the interface of the first application relative to the interface of the third application in the first split-screen interface based on a first location of the first prompt relative to the icon of the third application, wherein the first location comprises one of a left side, a right side, a top side, and a bottom side, and the second location is the same as the first location.

4. The electronic device according to claim 1, wherein the computer program code further includes instructions for:
detecting that a split-screen direction supported by the electronic device is a left-right direction; and
displaying, separately, one first prompt on a left side and a right side of each of the one or more icons of the one or more second-type applications.

5. The electronic device according to claim 1, wherein the computer program code further includes instructions for:
detecting that a split-screen direction supported by the electronic device is an up-down direction; and
displaying, separately, one first prompt on a top side and a bottom side of each of the one or more icons of the one or more second-type applications.

6. The electronic device according to claim 1, wherein the computer program code further includes instructions for:
detecting that split-screen directions supported by the electronic device are a left-right direction and an up-down direction, and separately displaying one first prompt on a left side, a right side, a top side, and a bottom side of each of the one or more icons of the one or more second-type applications.

7. The electronic device according to claim 1, wherein the computer program code further includes instructions for:

joining the icon of the first application to the icon of the third application, so that one edge of the icon of the first application is in contact with one edge of the icon of the third application.

8. The electronic device according to claim 1, wherein the computer program code further includes instructions for:
receiving a second operation;
switching from displaying the first split-screen interface to displaying the home screen in response to the second operation, wherein the home screen further comprises a first fused icon, wherein the home screen does not comprise the icon of the first application and the icon of the third application, wherein the first fused icon does not belong to the icons of the plurality of applications, and wherein the first fused icon is an icon obtained after the icon of the third application is fused with the first application;
receiving a third operation performed on the first fused icon located on the home screen; and
displaying the first split-screen interface in response to the third operation.

9. The electronic device according to claim 8, wherein a location of the icon of the first application relative to the icon of the third application in the first fused icon is the same as the location of the interface of the first application relative to the interface of the third application in the first split-screen interface.

10. The electronic device according to claim 8, wherein the computer program code further includes instructions for:
receiving a sixth operation performed by the user on the first fused icon;
displaying the icon of the first application, the icon of the third application, and a second prompt in response to the sixth operation;
receiving a seventh operation performed by the user on the second prompt;
deleting the first fused icon on the home screen in response to the seventh operation; and
displaying the icon of the first application and the icon of the third application on the home screen.

11. The electronic device according to claim 8, wherein the home screen further comprises an icon of a fourth application, and wherein the fourth application belongs to the one or more second-type applications; and
wherein the computer program code further includes instructions for:
receiving at least one of a touch-and-hold operation or a force touch operation performed by the user on the icon of the fourth application;
displaying, in response to the at least one of the touch-and-hold operation or the force touch operation, the plurality of first prompts around a remaining icon or remaining icons, other than the icon of the first application and the icon of the third application, of the one or more second-type applications; and
displaying a plurality of fourth prompts around the first fused icon, wherein the fourth prompt indicates that an interface of another application may be added to the split-screen interface corresponding to the first fused icon;
receiving a tenth operation performed by the user on the icon of the fourth application, wherein the tenth operation is dragging the icon of the fourth application to be in contact with a fourth prompt corresponding to the first fused icon; and
switching from displaying the home screen to displaying a second split-screen interface in response to contact between the icon of the fourth application and the fourth prompt corresponding to the first fused icon or in response to release of the tenth operation, wherein the second split-screen interface comprises an interface of the fourth application the interface of the first application and the interface of the third application being displayed at a same time.

12. The electronic device according to claim 11, wherein the computer program code further includes instructions for:
determining a fourth location of the interface of the fourth application in the second split-screen interface based on a third location of the fourth prompt relative to the first fused icon when the fourth prompt is in contact with the icon of the fourth application, wherein the third location comprises one of a left side, a right side, a top side, a bottom side, a top left side, a top right side, a bottom left side, and a bottom right side, and wherein the fourth location is the same as the third location.

13. The electronic device according to claim 1, wherein the computer program code further includes instructions for:
receiving a fourth operation; and
switching from displaying the first split-screen interface to displaying the home screen in response to the fourth operation, wherein the home screen further comprises a first fused icon, wherein the first fused icon does not belong to the icons of the plurality of applications, and wherein the first fused icon is an icon obtained after the icon of the third application is fused with the icon of the first application; and
receiving a fifth operation performed on the first fused icon located on the home screen; and
displaying the first split-screen interface in response to the fifth operation.

14. The electronic device according to claim 13, wherein the computer program code further includes instructions for:
receiving an eighth operation performed by the user on the first fused icon;
displaying a third prompt for the first fused icon in response to the eighth operation;
receiving a ninth operation performed by the user on the third prompt; and
deleting the first fused icon on the home screen.

15. The electronic device according to claim 13, wherein the home screen further comprises an icon of a fourth application, the fourth application belongs to the one or more second-type applications; and
wherein the computer program code further includes instructions for:
receiving at least one of a touch-and-hold operation or a force touch operation performed by the user on the icon of the fourth application;
displaying, in response to the at least one of the touch-and-hold operation or the force touch operation, wherein the plurality of first prompts around the icon or the icons of the one or more second-type applications;
displaying a plurality of fourth prompts around the first fused icon, wherein the fourth prompt indicates that an interface of another application may be added to the split-screen interface corresponding to the first fused icon;
receiving an eleventh operation performed by the user on the icon of the fourth application, wherein the eleventh operation is dragging the icon of the fourth application to be in contact with a fourth prompt corresponding to the first fused icon; and switching from displaying the home screen to displaying a second split-screen interface in response to at least one of contact between the icon of the fourth application and the fourth prompt corresponding to the first fused icon or release of the eleventh operation, wherein the second split-screen interface comprises an interface of the fourth application, the interface of the first application, and the interface of the third application being displayed at a same time.

16. A method, comprising:

displaying, by an electronic device, icons of a plurality of applications on a home screen of the electronic device;

receiving at least one of a touch-and-hold operation or a force touch operation performed by a user on an icon of a first application, wherein the first application belongs to the plurality of applications;

displaying a plurality of first prompts around one or more icons of one or more second-type applications in response to the at least one of the touch-and-hold operation or the force touch operation, wherein each of the one or more second-type applications are applications that support split screen in the plurality of applications, and a first prompt indicates that the one or more second-type applications support split screen;

receiving a first operation performed by the user on an icon of the first application, wherein the first operation is dragging the icon of the first application to be in contact with the first prompt corresponding to an icon of a third application, and the third application is one of the one or more second-type applications; and switching from displaying the home screen to displaying a first split-screen interface in response to at least one of release of the first operation or contact between the icon of the first application and the first prompt corresponding to the icon of the third application and that is created by the dragging, wherein the first split-screen interface comprises an interface of the first application and an interface of the third application being displayed at a same time.

17. The method according to claim 16, further comprising:

detecting that a split-screen direction supported by the electronic device is a left-right direction; and displaying, separately, one first prompt on a left side and a right side of each of the one or more icons of the one or more second-type applications.

18. The method according to claim 16, further comprising:

detecting that a split-screen direction supported by the electronic device is an up-down direction; and displaying, separately, one first prompt on a top side and a bottom side of each of the one or more icons of the one or more second-type applications.

19. The method according to claim 16, further comprising:

receiving a second operation;

switching from displaying the first split-screen interface to displaying the home screen in response to the second operation, wherein the home screen further comprises a first fused icon, wherein the home screen does not comprise the icon of the first application and the icon of the third application, wherein the first fused icon does not belong to the icons of the plurality of applications, and wherein the first fused icon is an icon obtained after the icon of the third application is fused with the first application;

receiving a third operation performed on the first fused icon located on the home screen; and displaying the first split-screen interface in response to the third operation.

20. An electronic device, comprising:

a display;

one or more processors; and a non-transitory computer readable medium storing a program for execution by the one or more processors, the program having instructions for:

displaying icons of a plurality of applications on a first screen shown on the display;

receiving a first operation performed, by a user, on a first icon of a first application of the plurality of applications, wherein the first operation is at least one of a touch-and-hold operation or a force touch operation;

displaying one or more icon prompts around an icons of a second-type application in response to the first operation, wherein the second-type application supports split screen in the plurality of applications, and wherein the one or more icon prompts indicate that the second-type application supports split screen display;

receiving a second operation performed by the user on a second icon of the first application, wherein the second operation is dragging the second icon into contact with a prompt corresponding to an icon of the second-type application; and switching from displaying the first screen to displaying a first split-screen interface in response to at least one of the second operation or release of the first operation, wherein the first split-screen interface comprises an interface of the first application and an interface of the second-type application being displayed at a same time.

* * * * *